(12) United States Patent
Topčagić et al.

(10) Patent No.: US 12,418,175 B2
(45) Date of Patent: Sep. 16, 2025

(54) SURGE PROTECTIVE DEVICES

(71) Applicant: RIPD IP DEVELOPMENT LTD, Nicosia (CY)

(72) Inventors: Zumret Topčagić, Ljubljana (SI); Robert Rozman, Smlednik (SI); Vasileios Kourakos, Athens (GR)

(73) Assignee: RIPD IP DEVELOPMENT LTD, Nicosia (CY)

( * ) Notice: Subject to any disclaimer, the term of this patent is extended or adjusted under 35 U.S.C. 154(b) by 109 days.

(21) Appl. No.: 18/455,697

(22) Filed: Aug. 25, 2023

(65) Prior Publication Data

US 2024/0088652 A1 Mar. 14, 2024

Related U.S. Application Data

(60) Provisional application No. 63/493,026, filed on Mar. 30, 2023, provisional application No. 63/375,588, filed on Sep. 14, 2022, provisional application No. 63/375,591, filed on Sep. 14, 2022.

(51) Int. Cl.
*H01T 4/14* (2006.01)
*H02H 9/06* (2006.01)
*H01T 4/04* (2006.01)

(52) U.S. Cl.
CPC ............... *H02H 9/06* (2013.01); *H01T 4/14* (2013.01); *H01T 4/04* (2013.01)

(58) Field of Classification Search
CPC .... H01T 4/14; H01T 4/10; H01T 4/16; H01T 4/06; H01T 2/02; H01T 1/15
See application file for complete search history.

(56) References Cited

U.S. PATENT DOCUMENTS

| | | | |
|---|---|---|---|
| 5,325,259 A | 6/1994 | Paulsson | |
| 5,754,385 A | 5/1998 | Altmaier et al. | |
| 7,466,528 B2 | 12/2008 | Lafon | |
| 8,743,525 B2 | 6/2014 | Xepapas et al. | |

(Continued)

FOREIGN PATENT DOCUMENTS

| | | |
|---|---|---|
| CZ | 2006166 A3 | 9/2007 |
| DE | 10060426 B4 | 4/2004 |

(Continued)

OTHER PUBLICATIONS

Extended European Search Report corresponding to European Patent Application No. 23194827.4 (6 pages) (dated Jan. 23, 2024).

*Primary Examiner* — Bryan R Perez
(74) *Attorney, Agent, or Firm* — Myers Bigel, P.A.

(57) ABSTRACT

A surge protective device includes a first electrical terminal, a second electrical terminal, and an overvoltage protection circuit connected between the first electrical terminal and the second electrical terminal. The overvoltage protection circuit includes a spark gap assembly between the first electrical terminal and the second electrical terminal. The spark gap assembly includes a first spark gap (SG) electrode and a second SG electrode defining a spark gap therebetween, and a trigger circuit operative to ignite a main electric arc between the first and second SG electrodes across the spark gap. The trigger circuit includes a groove defined in the second SG electrode, and a trigger member disposed in the groove. The trigger member is operative to assist formation of a trigger arc.

24 Claims, 39 Drawing Sheets

(56) References Cited

U.S. PATENT DOCUMENTS

| | | | |
|---|---|---|---|
| 8,873,217 B2 | 10/2014 | Hierl et al. | |
| 9,019,680 B2 | 4/2015 | Hierl et al. | |
| 9,083,153 B2 | 7/2015 | Ehrhardt et al. | |
| 9,111,698 B2 | 8/2015 | Crevenat | |
| 9,184,569 B2 | 11/2015 | Ehrhardt et al. | |
| 9,871,368 B2 | 1/2018 | Bühler et al. | |
| 10,186,842 B2 | 1/2019 | Rozman | |
| 10,340,110 B2 | 7/2019 | Vrhunc et al. | |
| 10,685,805 B2 | 6/2020 | Rozman | |
| 11,114,823 B2 | 9/2021 | Strangfeld et al. | |
| 11,201,464 B2 | 12/2021 | Brocke | |
| 11,223,200 B2 | 1/2022 | Tsovilis et al. | |
| 2008/0037191 A1 | 2/2008 | Gautier | |
| 2008/0087648 A1 | 4/2008 | Lafon | |
| 2013/0100558 A1 | 4/2013 | Crevenat | |
| 2015/0223369 A1* | 8/2015 | Otsubo | H05K 9/0079 361/111 |
| 2016/0035529 A1 | 2/2016 | Durth | |
| 2017/0330719 A1 | 11/2017 | Crevenat et al. | |
| 2018/0138697 A1 | 5/2018 | Crevenat et al. | |
| 2021/0351572 A1 | 11/2021 | Strangfeld et al. | |
| 2022/0013320 A1 | 1/2022 | Ehrhardt et al. | |
| 2022/0084772 A1* | 3/2022 | Ehrhardt | H01H 9/46 |
| 2022/0085577 A1 | 3/2022 | Ehrhardt et al. | |
| 2022/0209530 A1 | 6/2022 | Ehrhardt et al. | |
| 2023/0326701 A1 | 10/2023 | Rozman et al. | |
| 2024/0305087 A1* | 9/2024 | Krauss | H01T 15/00 |

FOREIGN PATENT DOCUMENTS

| | | |
|---|---|---|
| DE | 102016006668 B4 | 9/2018 |
| DE | 202019102722 U1 | 8/2019 |
| DE | 102019210236 A1 | 11/2020 |
| DE | 102021102819 A1 | 8/2021 |
| DE | 102020214136 B3 | 12/2021 |
| DE | 102021101506 A1 | 7/2022 |
| EP | 1458072 A1 | 9/2004 |
| EP | 1810305 A2 | 7/2007 |
| EP | 1829176 B1 | 6/2010 |
| EP | 1870977 B1 | 9/2010 |
| EP | 1961087 B1 | 10/2012 |
| EP | 1914850 B2 | 6/2013 |
| EP | 1887667 B2 | 1/2014 |
| EP | 2279513 B1 | 3/2016 |
| EP | 2532060 B1 | 6/2016 |
| EP | 1542323 B1 | 1/2018 |
| EP | 3331111 A1 | 6/2018 |
| EP | 3561973 A1 | 10/2019 |
| EP | 2631927 B1 | 12/2019 |
| EP | 3622595 A1 | 3/2020 |
| EP | 3375057 B1 | 6/2020 |
| EP | 3673548 B1 | 7/2021 |
| EP | 3644462 B1 | 12/2021 |
| EP | 3931921 A1 | 1/2022 |
| FR | 1052741 A | 1/1954 |
| WO | 2023006355 A1 | 2/2023 |

* cited by examiner

SURGE PROTECTIVE DEVICES

RELATED APPLICATION(S)

The present application claims the benefit of and priority from U.S. Provisional Patent Application No. 63/493,026, filed Mar. 30, 2023, U.S. Provisional Patent Application No. 63/375,591, filed Sep. 14, 2022, and U.S. Provisional Patent Application No. 63/375,588, filed Sep. 14, 2022, the disclosures of which are incorporated herein by reference.

FIELD

The present invention relates to surge protective devices (SPDs).

BACKGROUND

Frequently, excessive voltage or current is applied across or through service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting downtime may be very costly.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically used is a combination of an internal thermal disconnector to protect the SPD from overheating due to increased leakage currents and an external fuse to protect the SPD from higher fault currents. Different SPD technologies may avoid the use of the internal thermal disconnector because, in the event of failure, they change their operation mode to a low ohmic resistance.

SPDs may use one or more active voltage switching/limiting components, such as a varistor or gas discharge tube, to provide overvoltage protection. These active voltage switching/limiting components may degrade at a rapid pace as they approach the end of their operational lifespans, which may result in their exhibiting continuous short circuit behavior.

SUMMARY

According to some embodiments, a surge protective device includes a first electrical terminal, a second electrical terminal, and an overvoltage protection circuit connected between the first electrical terminal and the second electrical terminal. The overvoltage protection circuit includes a spark gap assembly between the first electrical terminal and the second electrical terminal. The spark gap assembly includes a first spark gap (SG) electrode and a second SG electrode defining a spark gap therebetween, and a trigger circuit operative to ignite a main electric arc between the first and second SG electrodes across the spark gap. The trigger circuit includes a groove defined in the second SG electrode, and a trigger member disposed in the groove. The trigger member is operative to assist formation of a trigger arc.

According to some embodiments, the trigger member is a semiconductive trigger member.

In some embodiments, the semiconductive trigger member is formed of a semiconductive ceramic.

In some embodiments, the semiconductive ceramic is selected from the group consisting of zinc oxide, barium titanate, and silicon carbide.

According to some embodiments, the trigger circuit includes a trigger varistor, a trigger gas discharge tube, and/or a trigger resistive element in electrical series with the trigger member and in electrical parallel with the spark gap.

According to some embodiments, the trigger circuit includes a trigger electrode in electrical contact with the trigger member and connecting the trigger member in electrical parallel with first SG electrode.

In some embodiments, the trigger circuit includes a trigger varistor, a trigger gas discharge tube, and/or a trigger resistive element in electrical series with the trigger electrode and in electrical parallel with first SG electrode.

According to some embodiments, the spark gap assembly is a horn spark gap assembly.

In some embodiments, the trigger member is located at a first end of the spark gap, and the spark gap assembly includes an arc chute located at an opposing second end of the spark gap.

According to some embodiments, the surge protective device of claim 1 includes an active voltage-switching/limiting component in electrical series with the spark gap assembly.

In some embodiments, the active voltage-switching/limiting component includes a varistor or a gas discharge tube.

In some embodiments, the trigger circuit has a trigger threshold flashover voltage for initiating electrical flashover between the first and second SG electrodes that is less that a threshold flashover voltage that would initiate electrical flashover between the first and second SG electrodes in the absence of the trigger circuit.

According to some embodiments, the surge protective device is a surge protective device module including a spark gap module housing, and the spark gap assembly is disposed in the spark gap module housing In some embodiments, the trigger member is located at a first end of the spark gap, and the spark gap module housing includes an arc gas recirculation channel configured to direct a flow of arc gas from a second end of the spark gap opposite the first end of the spark gap to an ignition region of the spark gap adjacent the trigger member.

In some embodiments, the spark gap module housing includes an intake port configured to direct a flow ambient air into an ignition region of the spark gap adjacent the trigger member.

According to some embodiments, a surge protective device includes a first electrical terminal, a second electrical terminal, and an overvoltage protection circuit connected between the first electrical terminal and the second electrical terminal. The overvoltage protection circuit includes a spark gap assembly between the first electrical terminal and the second electrical terminal. The spark gap assembly includes a first spark gap (SG) electrode and a second SG electrode defining a spark gap therebetween, and a trigger circuit operative to ignite a main electric arc between the first and second SG electrodes across the spark gap. The trigger circuit includes a semiconductive trigger member operative to assist formation of a trigger arc. The semiconductive trigger member is formed of a semiconductive ceramic.

In some embodiments, the semiconductive ceramic is selected from the group consisting of zinc oxide, barium titanate, and silicon carbide.

In some embodiments, the trigger circuit includes a trigger varistor, a trigger gas discharge tube, and/or a trigger resistive element in electrical series with the trigger member and in electrical parallel with the spark gap.

According to some embodiments, the trigger circuit includes a trigger electrode in electrical contact with the trigger member and connecting the trigger member in electrical parallel with first SG electrode.

In some embodiments, the trigger circuit includes a trigger varistor, a trigger gas discharge tube, and/or a trigger resistive element in electrical series with the trigger electrode and in electrical parallel with first SG electrode.

According to some embodiments, the spark gap assembly is a horn spark gap assembly.

In some embodiments, the trigger member is located at a first end of the spark gap, and the spark gap assembly includes an arc chute located at an opposing second end of the spark gap.

According to some embodiments, the surge protective device includes an active voltage-switching/limiting component in electrical series with the spark gap assembly.

In some embodiments, the active voltage-switching/limiting component includes a varistor or a gas discharge tube.

In some embodiments, the trigger circuit has a trigger threshold flashover voltage for initiating electrical flashover between the first and second SG electrodes that is less that a threshold flashover voltage that would initiate electrical flashover between the first and second SG electrodes in the absence of the trigger circuit.

According to some embodiments, the surge protective device is a surge protective device module including a spark gap module housing, and the spark gap assembly is disposed in the spark gap module housing In some embodiments, the trigger member is located at a first end of the spark gap, and the spark gap module housing includes an arc gas recirculation channel configured to direct a flow of arc gas from a second end of the spark gap opposite the first end of the spark gap to an ignition region of the spark gap adjacent the trigger member.

In some embodiments, the spark gap module housing includes an intake port configured to direct a flow ambient air into an ignition region of the spark gap adjacent the trigger member.

In some embodiments, the spark gap assembly is a horn spark gap assembly and the spark gap assembly includes an arc chute. The arc chute includes a set of deion plates including: a plurality of first deion plates each having a first slot having a first profile; and a plurality of second deion plates each having a second slot having a second profile different than the first profile. The first and second deion plates are arranged in spaced apart relation and in alternating series along a chute axis such that the first and second deion plates define a series of arc chute spark gaps extending along the chute axis.

In some embodiments, the overvoltage protection circuit includes an active voltage-switching/limiting component, the spark gap assembly is in electrical series with the active voltage-switching/limiting component between the first electrical terminal and the second electrical terminal, the spark gap assembly is a horn spark gap assembly, and the spark gap assembly includes an arc chute.

According to some embodiments, a surge protective device includes a first electrical terminal, a second electrical terminal, and an overvoltage protection circuit connected between the first electrical terminal and the second electrical terminal. The overvoltage protection circuit includes a spark gap assembly including a horn spark gap assembly, and an arc chute. The arc chute includes a set of deion plates including a plurality of first deion plates each having a first slot having a first profile, and a plurality of second deion plates each having a second slot having a second profile different than the first profile. The first and second deion plates are arranged in spaced apart relation and in alternating series along a chute axis such that the first and second deion plates define a series of arc chute spark gaps extending along the chute axis.

In some embodiments, the first and second slots cross one another along the chute axis.

According to some embodiments, a surge protective device includes a first electrical terminal, and a second electrical terminal, an overvoltage protection circuit connected between the first electrical terminal and the second electrical terminal. The overvoltage protection circuit includes an active voltage-switching/limiting component, and a spark gap assembly in electrical series with the active voltage-switching/limiting component between the first electrical terminal and the second electrical terminal. The spark gap assembly includes a horn spark gap assembly, an arc chute, and a spark gap trigger circuit operative to ignite the horn spark gap assembly.

BRIEF DESCRIPTION OF THE DRAWINGS

The accompanying drawings, which form a part of the specification, illustrate embodiments of the present invention.

DETAILED DESCRIPTION OF EMBODIMENTS

Figure 1:
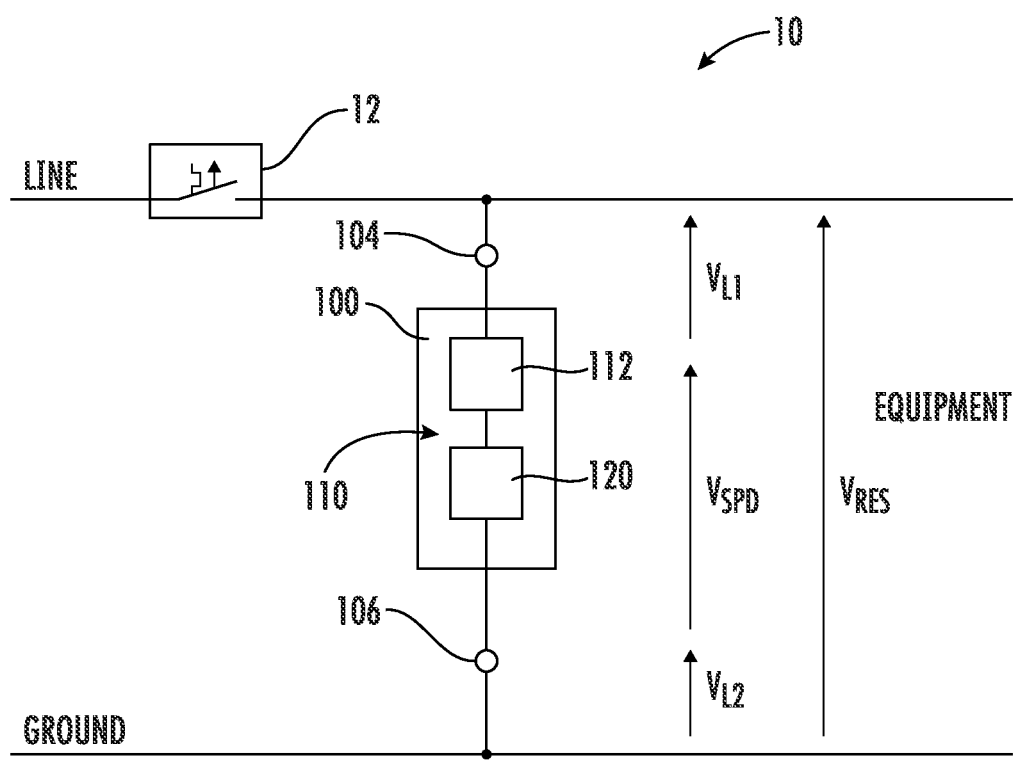
FIG. 1 is a block diagram that illustrates an electrical power supply circuit including a surge protective device (SPD) module in accordance with some embodiments.
Figure 2:
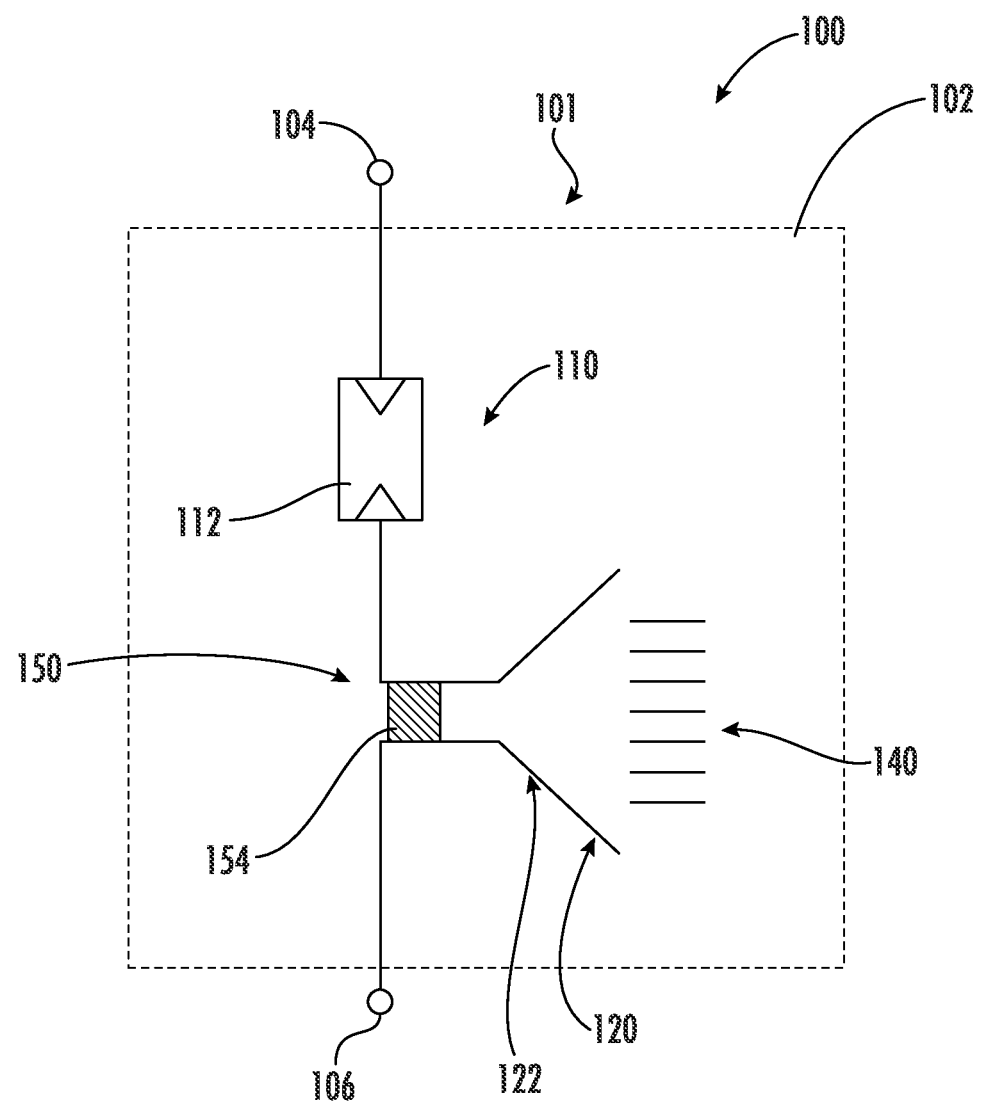
FIG. 2 is a schematic view of an SPD circuit and module in accordance with some embodiments.
Figure 3:
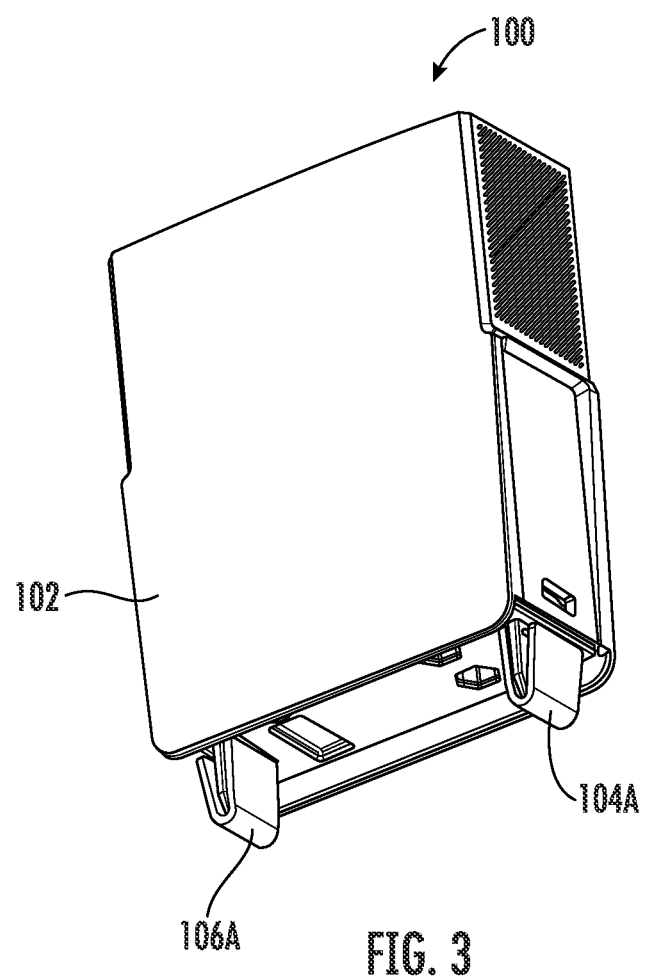
FIG. 3 is a perspective view of the SPD module in accordance with the schematic view of FIG. 2.
Figure 4:
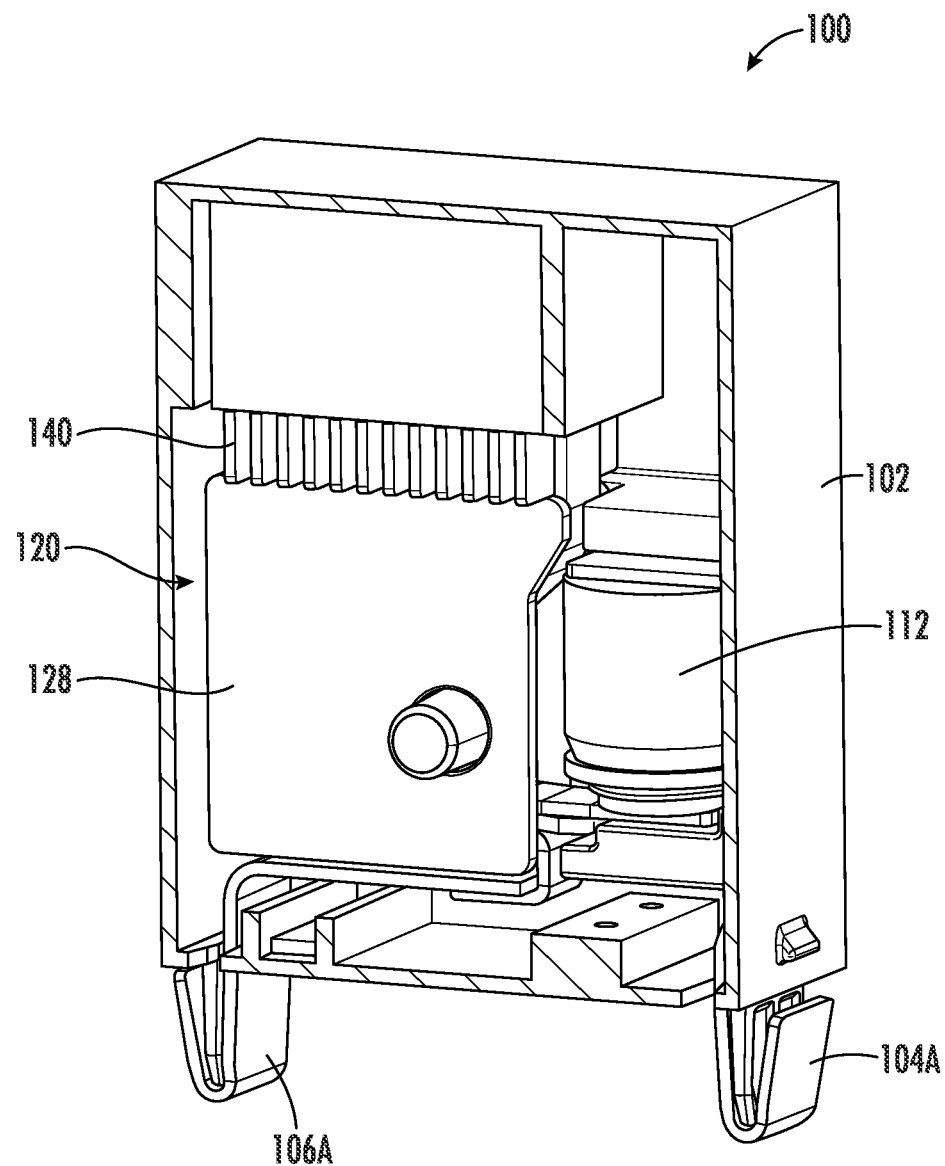
FIG. 4 is a perspective view of the SPD module of FIG. 3 with a portion of the housing removed.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It is noted that aspects described with respect to one embodiment may be incorporated in different embodiments although not specifically described relative thereto. That is, all embodiments and/or features of any embodiments can be implemented separately or combined in any way and/or combination. Moreover, other apparatus, methods, and systems according to embodiments of the inventive concept will be or become apparent to one with skill in the art upon review of the following drawings and detailed description. It is intended that all such additional apparatus, methods, and/or systems be included within this description, be within the scope of the present inventive subject matter, and be protected by the accompanying claims.

As used herein, "monolithic" means an object that is a single, unitary piece formed or composed of a material without joints or seams. Alternatively, a unitary object can be a composition composed of multiple parts or components secured together at joints or seams.

With reference to FIGS. 2-9, a surge protective device (SPD) in the form of an SPD unit or SPD module 100 according to some embodiments is shown therein. The SPD module 100 includes an SPD electrical circuit 101 according to some embodiments.

In some embodiments, the SPD electrical circuit 101 or the SPD module 100 is provided, installed and used as a component in a protection circuit of a power supply circuit 10 as shown in FIG. 1, for example. In the power supply circuit 10, the SPD electrical circuit 101 is in electrical parallel across sensitive equipment. The SPD module 100 is designed to protect the sensitive equipment from overvoltages and current surges. The SPD module 100 may also be connected to the power source via an upstream second fuse or circuit breaker 12.

The SPD module 100 includes a module housing 102, a first or phase electrical terminal electrode 104, a second or ground electrical terminal electrode 106, and an overvoltage protection circuit (OPC) 110. The OPC 110 is disposed in the housing 102, and is electrically connected between the terminals 104 and 106 to form the SPD electrical circuit 101.

The housing 102 may be formed of any suitable electrically insulating material (e.g., an insulating polymer).

The first terminal electrode 104 includes a terminal contact or terminal 104A and a GDT contact 104B. The second terminal electrode 106 includes a terminal contact or terminal 106A and an electrode contact 106B.

The OPC 110 includes an active voltage-switching or active voltage limiting component 112 (referred to herein as a "voltage-switching/limiting component) and a spark gap assembly 120. In some embodiments and as illustrated in the figures, the voltage-switching/limiting component 112 is a gas discharge tube (GDT).

In some embodiments, the GDT 112 has a rating of at least 12.5 kA of lightning impulse current.

In other embodiments, the OPC 110 may include an active voltage-switching or active voltage limiting component (referred to herein as a "voltage-switching/limiting component) other than a GDT in place of the GDT 112 or in addition to the GDT 112.

In some embodiments, the OPC 110 is a varistor-based overvoltage protection circuit and the voltage-switching/limiting component 112 is a varistor. In some embodiments, the voltage-switching/limiting component 112 is a metal oxide varistor (MOV)). For example, in some embodiments the OPC 110 is a varistor-based SPD as disclosed in U.S.

Pat. No. 8,743,525 to Xepapas et al., the disclosure of which is incorporated herein by reference.

The voltage-switching/limiting component 112 may also be another type of voltage-switching/limiting surge protective device. Other types of voltage-switching/limiting component 112 that may form, or form a part of, the OPC 110 may include spark gap devices, multi-cell GDTs (e.g., as disclosed in U.S. Pat. No. 10,685,805 to Rozman and U.S. Pat. No. 10,186,842 to Rozman, the disclosures of which are incorporated herein by reference), diodes, or thyristors.

In some embodiments, only a single voltage-switching/limiting component 112 is included in OPC 110. In some embodiments, the OPC 110 includes or consists of only the active voltage-switching/limiting component(s) 112, the spark gap assembly 120 and associated electrical connections, if any.

The OPC 110 may include a plurality of voltage-switching/limiting components 112. The OPC 110 may include one or more voltage-switching/limiting components 110 in combination with other electrical components. In some embodiments, the OPC 110 includes multiple varistors (connected in electrical parallel or series between the module terminals), multiple GDTs (e.g., connected in electrical series), and/or both varistor(s) and GDT(s) (e.g., connected in electrical series with the varistor(s)), and/or other circuit elements, such as resistors, inductors, or capacitors.

The GDT 112 includes opposed electrical contact terminals 112A, 112B.

The spark gap assembly 120 includes a spark gap subassembly or horn spark gap assembly 122, a spark gap (SG) trigger circuit 150, and a deion chamber or arc chute 140. The SG trigger circuit 150 is located at an inner end 120A of the spark gap assembly 120 and the arc chute 140 is located at an opposing outer end 120B of the spark gap assembly 120.

The horn spark gap assembly 122 includes a first spark gap (SG) electrode 124, a second spark gap (SG) electrode 126, a spark gap 130, and laterally opposed side or containment walls 128. The spark gap 130 is defined between the electrodes 124, 126.

The first SG electrode 124 (FIG. 8) has an inner end 124A and an opposing outer end 124B. The first SG electrode 124 includes (extending sequentially from the inner end 124A to the outer end 124B) a contact section 124C, a trigger section 124T, an ignition section 124I, a running section 124R, and an extinguishing section 124E.

The second SG electrode 126 (FIG. 8) has an inner end 126A and an opposing outer end 124B. The second SG electrode 124 includes (extending sequentially from the inner end 126A to the outer end 126B) a contact section 126C, a trigger section 126T, an ignition section 126I, a running section 126R, and an extinguishing section 126E.

The spark gap 130 extends from an inner end 130A and to an opposing outer end 130B. With reference to (FIGS. 6 and 9), the spark gap 130 includes (extending sequentially from the inner end 130A to the outer end 130B) an ignition region 132I, a running region 132R, and an extinguishing region 132E. The spark gap 130 expands, widens or flares outward in a direction DA from the end 130A to the end 130B. As a result, the spark gap 130 has a first width WI in the ignition region 132I, a second width WR in the running region 132R, and a third width WE in the extinguishing region 132E. Width WR is great than width WI, and width WE is greater than width WR. Width WR varies and expands along the length of the running region 132R. In some embodiments, the spark gap 130 expands smoothly from the ignition region 132I to the extinguishing region 132E. In some embodiments, the SG electrodes 124, 126 each have a curved profile.

In some embodiments, the spark gap width WI (FIG. 9; i.e., the separation distance between the SG electrodes 124, 126) is at least 0.5 mm and, in some embodiments, is at least 1 mm. In some embodiments, the spark gap width WI is in the range of from about 0.5 mm to 2 mm.

In some embodiments, the spark gap width WE (FIG. 9) is in the range of from about 20 mm to 40 mm. In some embodiments, the spark gap width WE is in the range of from about 1000 to 4000 percent greater than the spark gap width WI.

The SG electrodes 124, 126 may be formed of any suitable electrically conductive metal. In some embodiments, the SG electrodes 124, 126 are formed of copper, copper-steel bimetal, or any other combination of metals in bimetal composition.

The containment walls 128 may be formed of any suitable material. In some embodiments, the containment walls 128 are formed of ceramic, polymer or plastic, insulating paper, ferromagnetic material insulated by paper, plastic or ceramic, or ferromagnetic material coated with a polymer or plastic.

Figure 5:
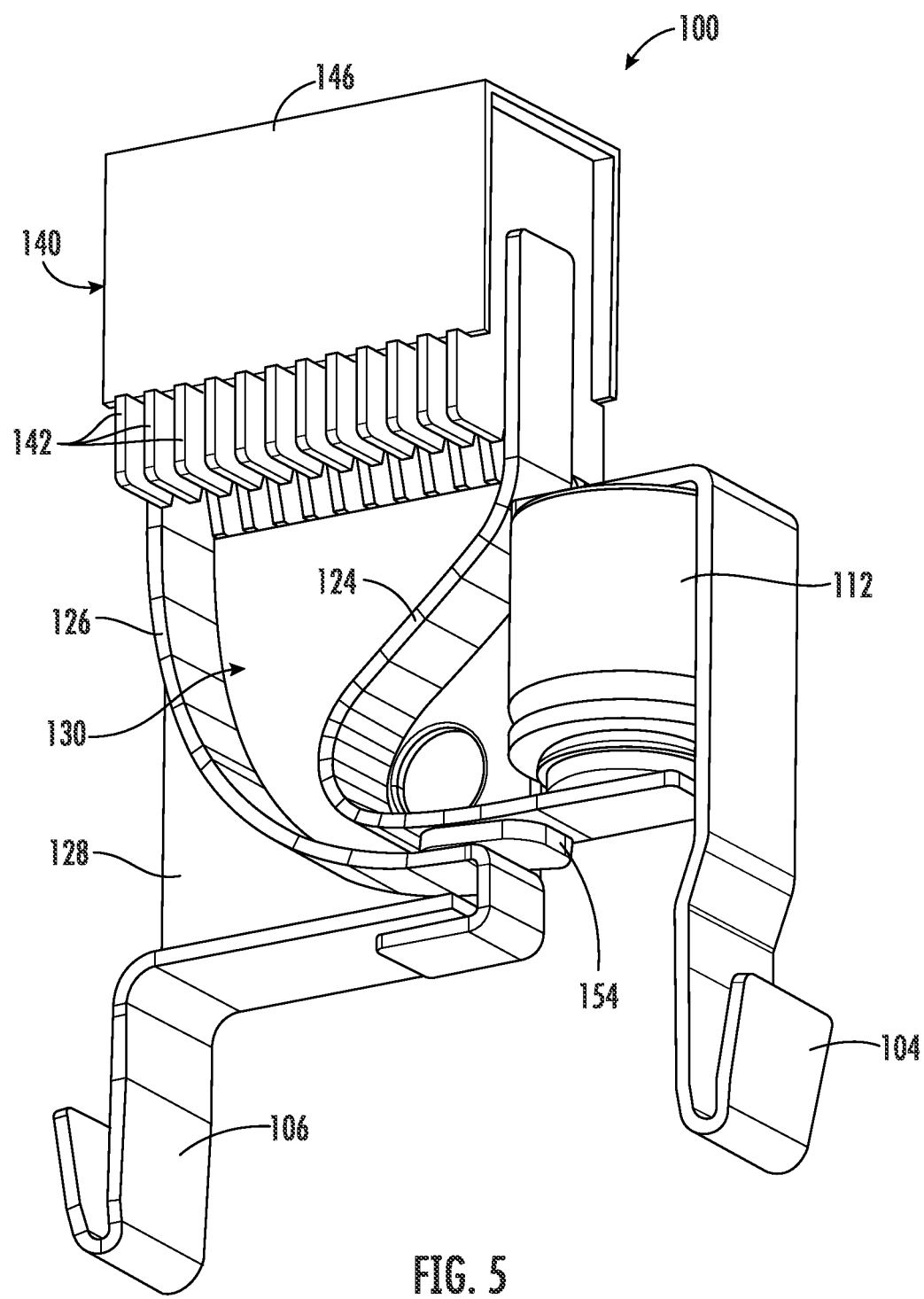
FIG. 5 is a fragmentary, perspective view of the SPD module of FIG. 3.
Figure 9:
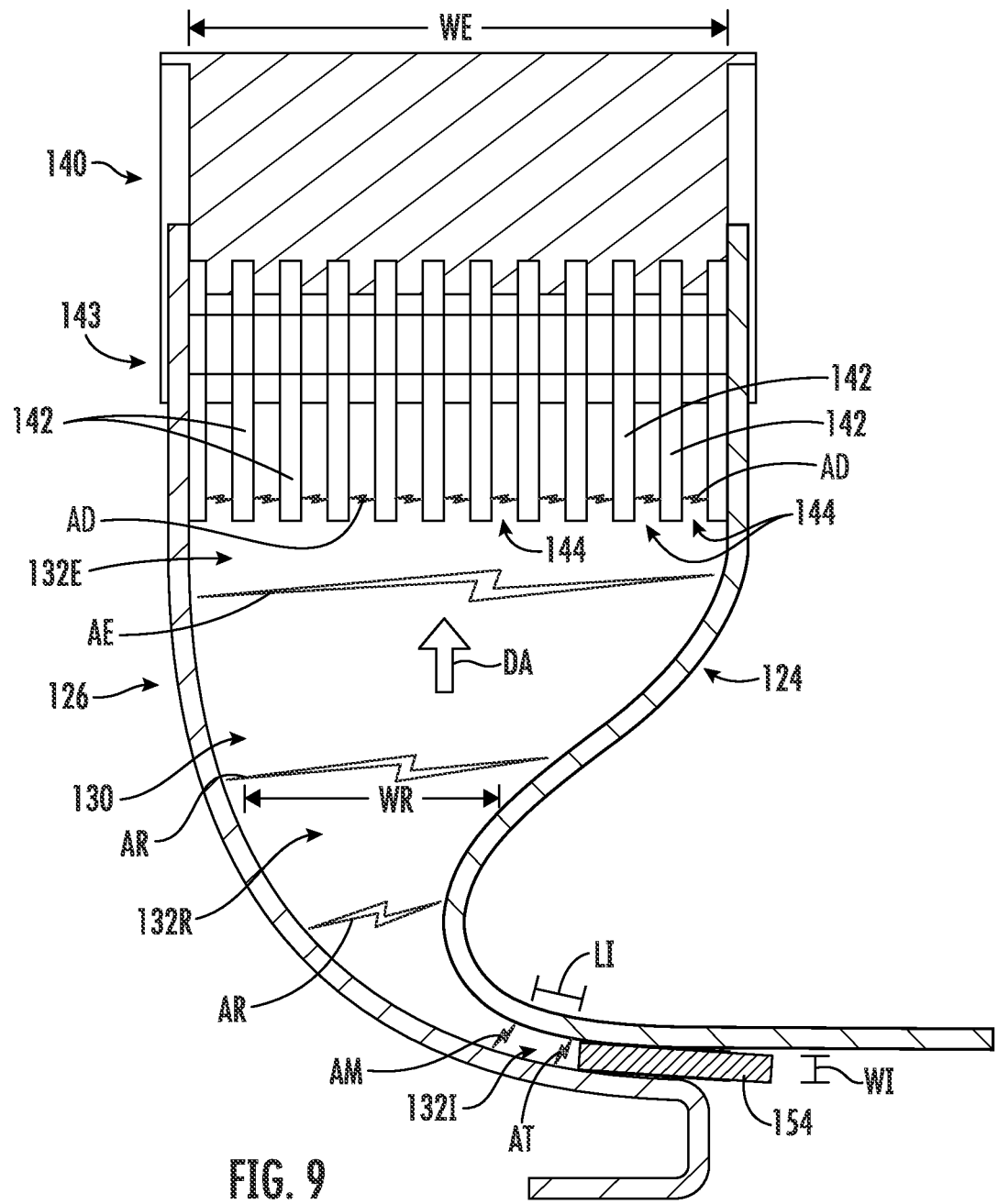
FIG. 9 is a fragmentary, cross-sectional view of the SPD module of FIG. 3 taken along the line 9-9 of FIG. 7.

With reference to FIGS. 5 and 9, the arc chute 140 is located at the outer end 130B of the horn spark gap assembly 122 at, in or proximate the extinguishing region 132E. The arc chute 140 includes a set 143 or series of electrically conductive arc, chute or deion electrodes or plates 142 supported by electrically insulating supports 146. The deion plates 142 are separated by deion plate arc gaps 144.

The SG trigger circuit 150 includes the ignition region 132I of the spark gap 130 and a semiconductive trigger member 154. The semiconductive member 154 is positioned in or adjacent the gap 132I and interposed between the gap electrode trigger sections 124T and 126T. The semiconductive trigger member 154 is connected in electrical series between the SG electrodes 124, 126.

The semiconductive trigger member 154 extends from a first end face 154A to an opposing second end face 154B. The first end face 154A electrically engages or contacts the electrode trigger section 124T. The second end face 154B electrically engages or contacts the electrode trigger section 126T.

The semiconductive trigger member 154 may be formed of any suitable semiconductive material.

In some embodiments, the semiconductive trigger member 154 is formed of a composition including a mixture of a polymeric material (e.g., a rubber or a plastic) as a nonconductive matrix and an electrically conductive filler. In some embodiments, the nonconductive matrix includes silicone. In some embodiments, the conductive filler is graphite powder. In some embodiments, the conductive filler is expanded graphite powder.

The conductive filler may be a material other than graphite powder having a relatively high secondary emission, such as beryllium oxide (BeO), magnesium oxide (MgO), or gallium phosphide (GaP).

In some embodiments, the semiconductive member 154 is formed of a semiconductive ceramic. In some embodiments, the semiconductive member 1254 is formed of ZnO (zinc oxide) or BaTiO3 (Barium titanate) or SiC (silicon carbide), with different dopants (oxides, metals).

The semiconductive member 154 can be rigid or flexible depending on the polymer matrix. In some embodiments, the semiconductive member 154 has a porous structure. In some embodiments, the semiconductive member 154 has an amorphous structure.

In some embodiments, the semiconductive material of the semiconductive member 154 has a specific electrical resistance in the range of from 1 to 10,000 Ωcm, and a dielectric constant in the range of from 1 to 10,000. The semiconductive material may have a positive or negative temperature coefficient.

In some embodiments, the semiconductive trigger member 154 has a thickness T3 (FIG. 7) of at least 0.5 mm and, in some embodiments, of at least 1 mm. In some embodiments, the thickness T3 is in the range of from about 0.5 mm to 2 mm.

Figure 6:
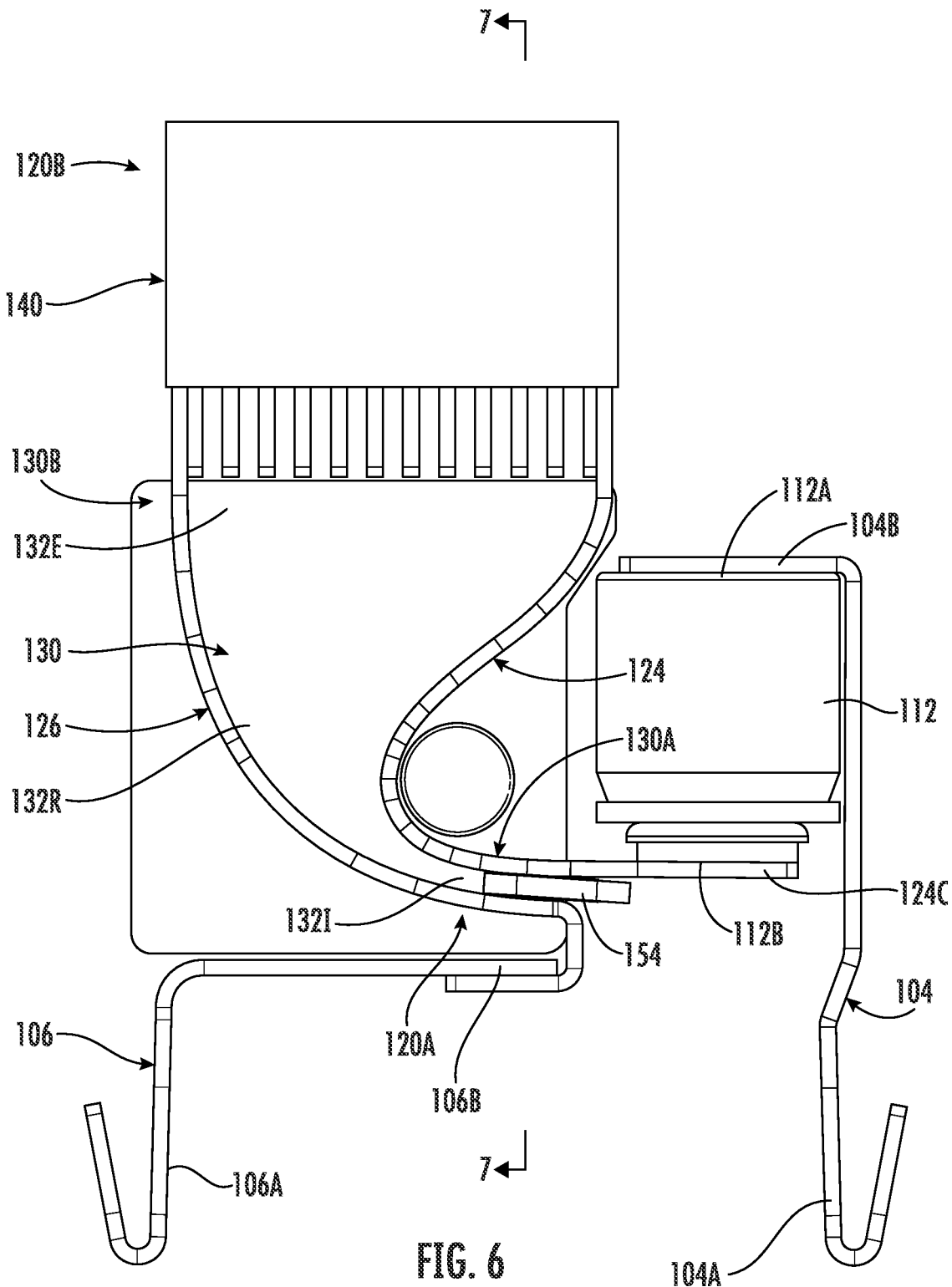
FIG. 6 is a fragmentary, side view of the SPD module of FIG. 3.

With reference to FIG. 6, the terminal 104A is electrically connected to the GDT terminal 112A by the GDT contact 104B. The SG electrode 124 is electrically connected to the GDT terminal 112B by the contact section 124C. The terminal 106A is electrically connected to the SG electrode 126 by the contact section 126C. Under some conditions, as discussed below, the SG electrode 124 is electrically connected to the SG electrode 126 by electric arcing to complete the electrical circuit from the terminal 104 to the terminal 106.

The SG electrodes 124, 126 and the semiconductive member 154 define gap open regions or volumes in the ignition region 132I adjacent or around the semiconductive member 154 (i.e., around the volume of the gap ignition region 132I filled or occupied by the semiconductive member 154). Opposed regions of the SG electrodes 124, 126 in the ignition region 132I are exposed (i.e., are not covered by the semiconductive member 154). The ignition region 132I serves as a trigger gap.

The spark gap 130 at the gap ignition region 132I has a prescribed threshold flashover voltage. In some embodiments, the prescribed threshold flashover voltage is less than 1500V. In some embodiments, the prescribed threshold flashover voltage is in the range of from about 300V to 1500V. When a voltage is applied across the SG electrodes 124, 126 that is less than the threshold flashover voltage, the applied voltage will not ignite or initiate arc flashover between the SG electrodes 124, 126. As discussed below, when a voltage is applied across the SG electrodes 124, 126 that is greater than or equal to the threshold flashover voltage, the applied voltage will ignite or initiate arc flashover between the SG electrodes 124, 126.

In some embodiments, the length LI (FIG. 9) of the ignition region 132I is in the range of from about 1 mm to 5 mm.

In some embodiments, the height DI (FIG. 7; i.e., the lateral dimension of the spark gap 130 and the width of the SG electrodes 124, 126) of the ignition region 132I is in the range of from about 3 mm to 8 mm.

The SPD module 100 may operate as follows in service.

As described, the SPD circuit 101 includes a high surge current rated GDT 112 in electrical series with a horn spark gap assembly 122. The horn spark gap assembly 122 is provided with a trigger element 154.

According to some embodiments of the inventive concept, the SPD module 100 is configured to operate under two different conditions: 1) normal (stand by) operation; and 2) an overvoltage or current surge event in which the SPD module 100 is designed to shunt an SPD surge impulse current to ground.

The SPD module 100 is designed to shunt an SPD surge impulse current to ground in response to an overvoltage or current surge event.

The SPD module 100 is configured to operate in three alternative modes: 1) a standby mode; 2) a surge current mode; and 3) a follow current extinguishing mode.

The terminal 104 is electrically connected to the Line (L) of the circuit 10, and the terminal 106 is electrically connected to the Ground (G) of the circuit 10 (FIG. 1).

During normal operation, the OPC 110 practically acts as an insulator. The voltage applied across the GDT 112 and across the spark gap 130 is insufficient to initiate current through the GDT 112 or to initiate a spark across the spark gap 130.

When an overvoltage or current surge event (e.g., a transient power surge) applies a surge impulse current to the SPD circuit 101, the OPC 110 will temporarily go to a low impedance state (e.g., effectively becoming a short circuit). The voltage-switching/limiting component 112 (e.g., GDT) of the OPC 110 is designed to shunt the surge impulse current associated with such events to ground to protect sensitive equipment. The SPD surge impulse current may be on the order of tens of kA, but will typically last only a short duration (in the range of from about tens of microseconds to a few milliseconds).

During the surge event, the voltage applied across the ignition region 132I of the spark gap 130 by the surge event exceeds the prescribed threshold flashover voltage of the ignition region 132I. In response, the voltage across the ignition region 132I initiates electrical arc flashover or trigger arc AT (FIG. 9) across the spark gap 130 in the ignition region 132I. That is, electrical arcing AT is generated between the SG electrode ignition sections 124I and 126I.

The initiation of the trigger arc AT is assisted by the semiconductive trigger member 154 in response to the overvoltage developed across the ignition section 124I and the ignition section 126I. At the beginning of the surge current, current conduction occurs through the bulk of the semiconductive member body and along the exterior surface 154C of the semiconductive trigger member 154. Very quickly thereafter (e.g., within less than 1 microsecond), the flashover of the trigger arc AT occurs so that most of the surge current is bypassed through the arc column(s) established between the SG electrodes 124, 126. By diverting the current around the semiconductive trigger member 154, degradation of the semiconductive trigger member 154 is prevented or reduced.

Shortly after the start of the trigger arc AT (e.g., within microseconds), the current flow triggers an electric arc flashover or surge arc AM (as illustrated in FIG. 9) across the spark gap 130. The SG trigger circuit 150 thereby ignites the horn spark gap assembly 122 and the full surge current is thereby conducted through the spark gap assembly 122 via the surge arc AM.

The GDT 112 and the spark gap assembly 120 are thereby each triggered changing their states to low impedance. The surge current flows from the terminal 104A to the terminal 106A through the GDT 112 and the spark gap 130, thereby diverting the surge current to ground. During the surge event, the arcing or arc column AM across the spark gap 130 may be located entirely or mainly in the arc ignition region 132I or partially in the running region 132R.

The SPD 100 then enters its follow current mode. Once the surge current is diverted to the ground, the GDT 112 and the spark gap 122 remain electrically conductive, causing additional follow current from the system to flow into the SPD 100. This causes the arc column to move in an arc migration direction DA (from the end 130A toward the end 130B) along the arc running region 132R of the spark gap 122 to the arc extinguishing region 132E. FIG. 9 illustrates the arc column in the arc running region 132R as an electric arc AR, and the arc column in the arc extinguishing region 132E as an electric arc AE.

In the arc extinguishing region 132E, the follow current is redirected to (is conducted to, or flashes over to or arcs to) the deion plates 142 from the SG electrode 124. The current then flows through the set 143 of deion plates to the SG electrode 126 by arcing AD between the deion plates 143.

Each deion plate arc AD creates a voltage drop between the SG electrodes 124, 126 and the terminals 104, 106. These voltage drops add together increasing the voltage between the SG electrodes 124, 126 to relatively high values, until the voltage across the arc chute 140 is higher than the power system voltage. The voltage drop developed on the arc chute 140 opposes the mains voltage thus the follow current is rapidly reduced and eventually extinguished.

These voltage drops also reduce the voltage across the spark gap 122 to relatively low values, until the voltage across the spark gap 122 is less than the ignition voltage necessary to sustain the arcing between the SG electrodes 124, 126. The voltage across the spark gap 122 is then also less than necessary to trigger flashover between the ignition sections 124I, 126I or to conduct current through or along the surface of the semiconductive trigger member 154. That is, at this lower voltage, the semiconductive trigger member 154 operates as an electrical insulator between the SG electrodes 124, 126. The spark gap assembly 122 is thereby opened at the spark gap 130 and the follow current through the spark gap assembly 122 and the SPD module 100 is cut off or interrupted. The SPD module 100 returns to its standby mode.

Thus, it will be appreciated that the electrical arc flashover AT triggers the electric arc flashover AM, which during follow current expands and propagates to the arc chute 140. The expansion and propagation are driven by electromagnetic and acoustical forces. Once the arc AE enters the arc chute 140, it is divided or split into a plurality of smaller arcs in the arc chute 140 and cooled down until the arc is eventually extinguished. This causes the SPD module 100 to returns to its high impedance (standby) mode.

The semiconductive trigger member 154 functions as a spark gap trigger that assists in initiating the flashover between the SG electrodes 124, 126. The spark gap initiation region 132I is the closest distance between the SG electrodes 124, 126 and creates a small chamber that serves as the arc initiation area. In this chamber, the spark gap 130 has the dimensions WI, DI, and LI. The minimum separation distance WI between the electrodes 124, 126 at the trigger member 154 can prevent melting and soldering of the electrodes 124, 126 during surges. Because the semiconductive trigger member 154 is provided, the threshold flashover voltage of the gap 130 is less than the voltage that would be required to initiate the flashover across the gap 130 in the absence of the semiconductive trigger member 154. By reducing the minimum required flashover voltage, the semiconductive trigger member 154 lowers the protection level of the SPD electrical circuit 101.

Figure 7:
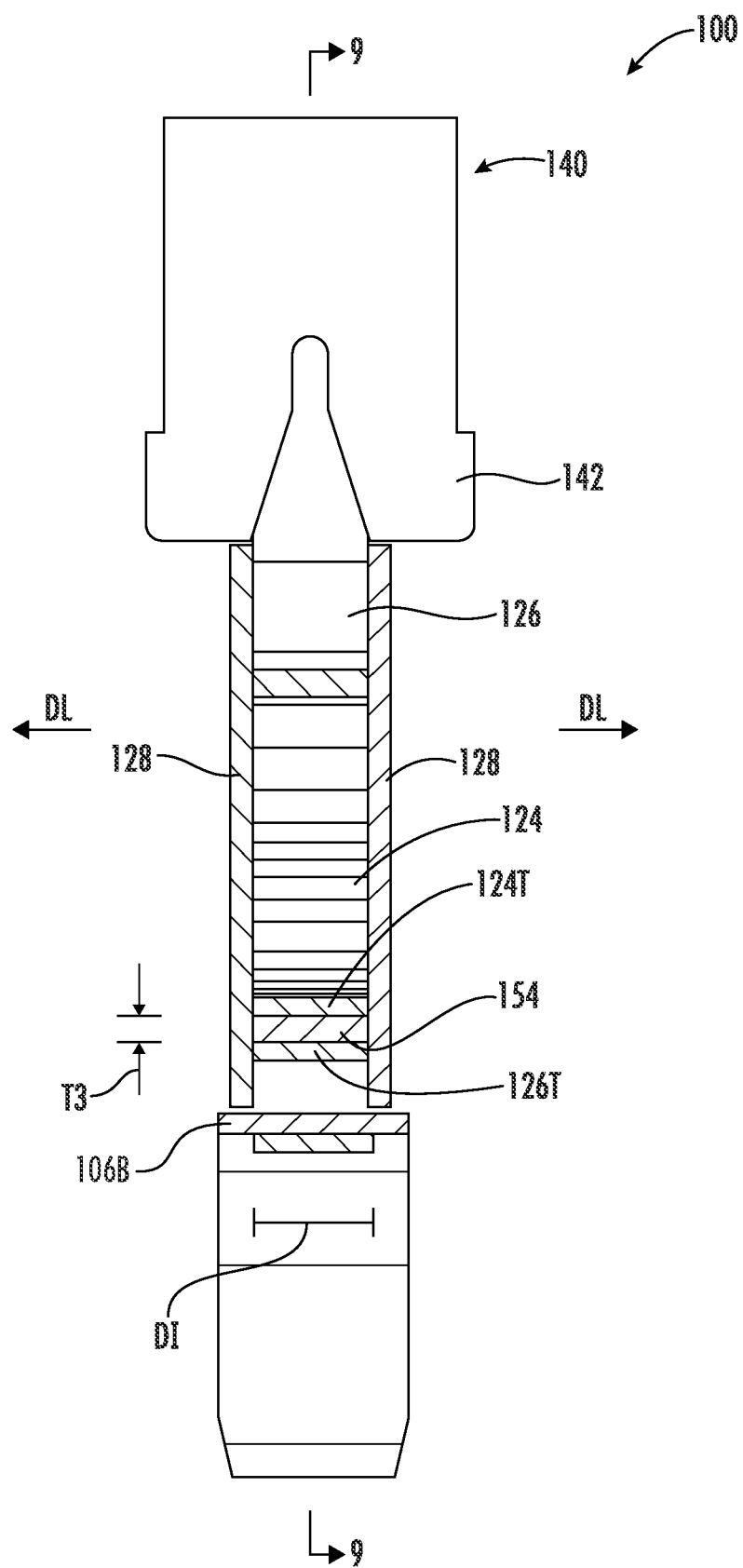
FIG. 7 is a fragmentary, cross-sectional view of the SPD module of FIG. 3 taken along the line 7-7 of FIG. 6.
Figure 8:
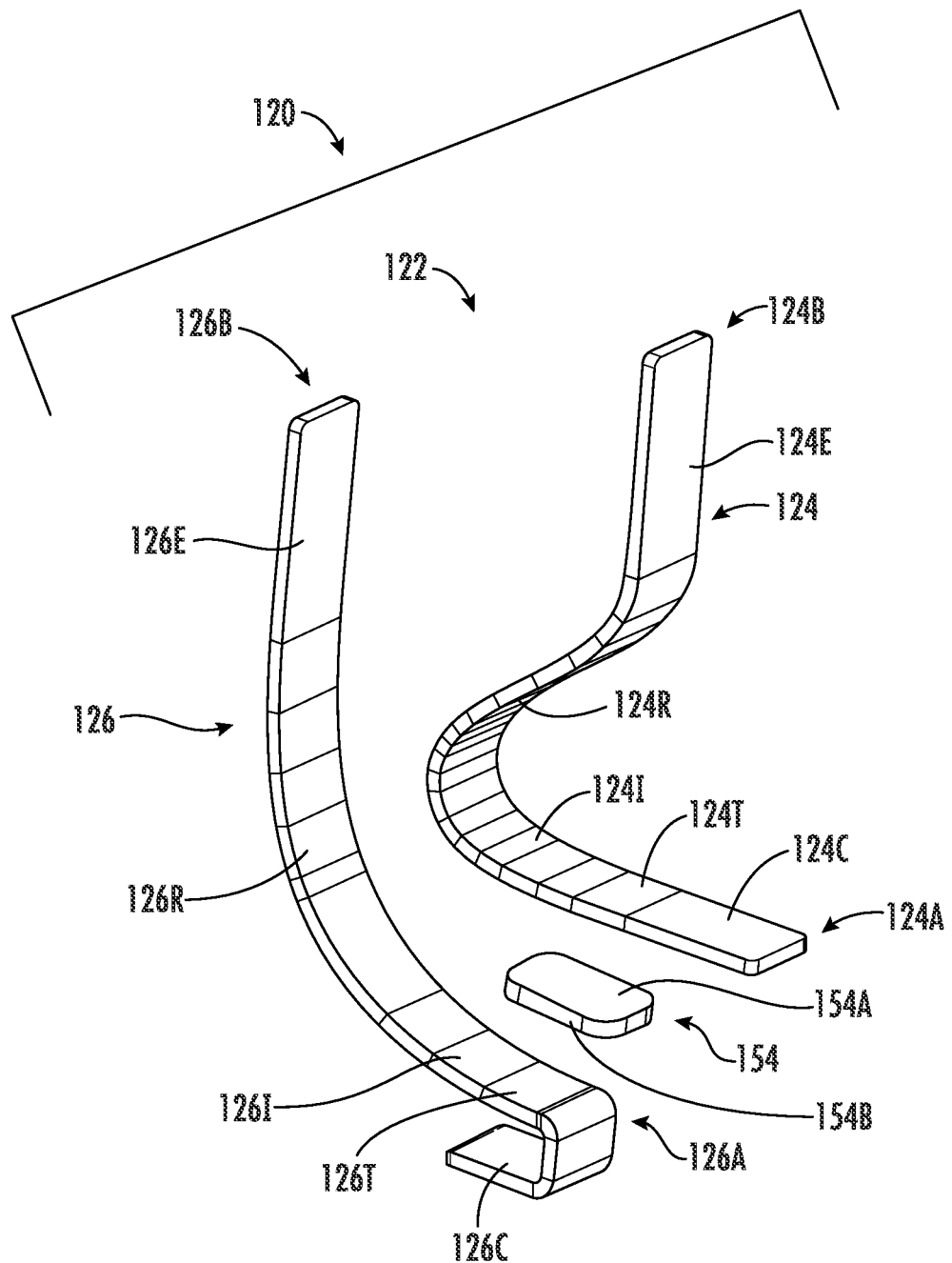
FIG. 8 is an exploded, fragmentary, perspective view of a spark gap assembly of the SPD module of FIG. 3.

The horn shape of the spark gap 130 facilitates the path of the arc AM. The geometry of the SG electrodes guides the arc AM from the ignition region 132I to the extinguishing region 132E. The containment walls 128 firmly restrict or contain the path of the arcing in the lateral directions DL (FIG. 7).

The GDT 112 is provided in front of the trigger member 154 because the trigger member 154 has some resistance and thus will conduct the current on nominal voltage. By including the GDT 112, the OPC 110 is made leakage current free (and, thus, the SPD module 100 is leakage free). Additionally, the GDT 112 takes or absorbs some of the energy from surges and helps the trigger circuit 150 to operate more effectively.

Figure 10:
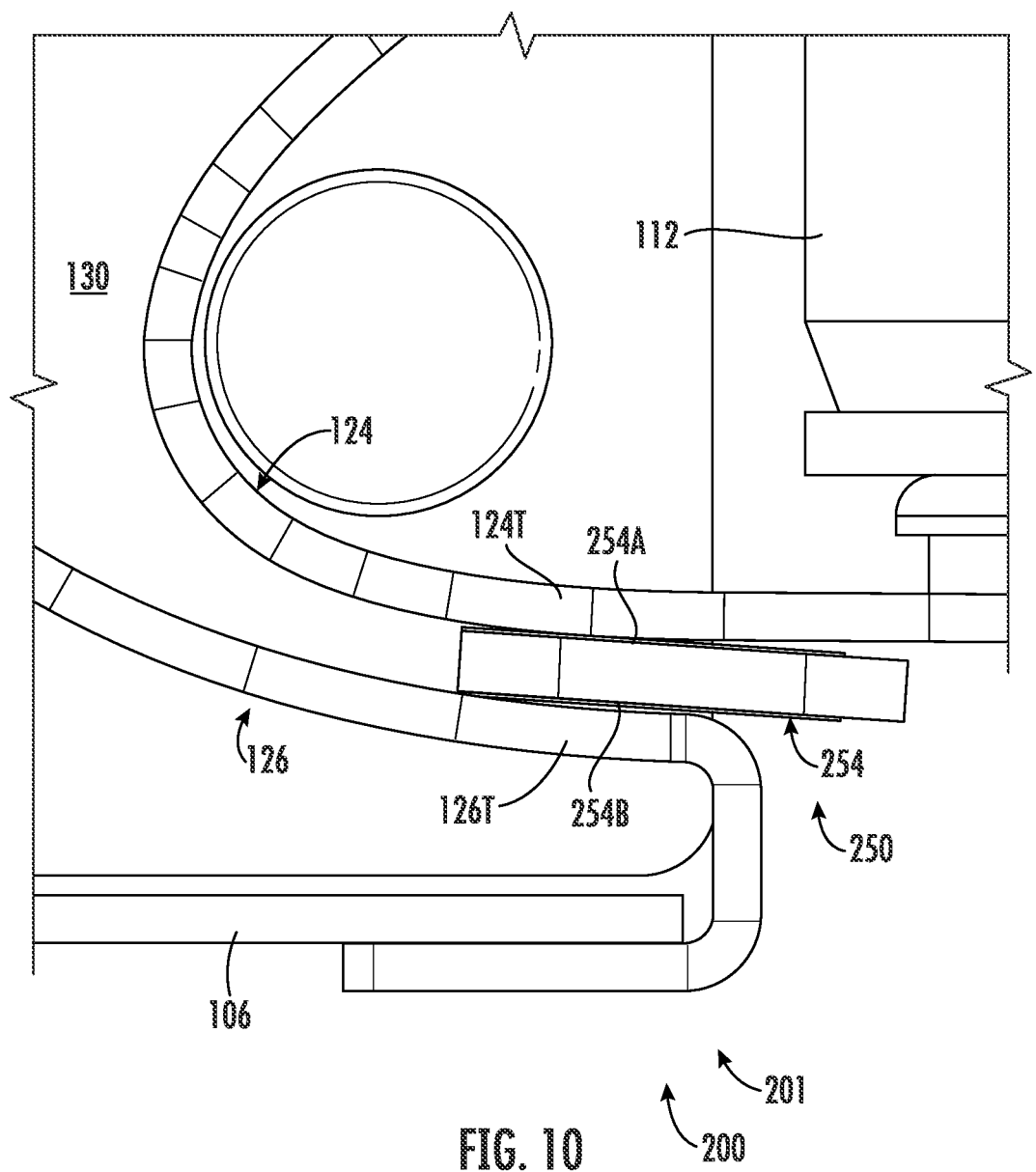
FIG. 10 is an enlarged, fragmentary, side view of an SPD module according to further embodiments including an electrically resistive trigger member.

With reference to FIG. 10, an SPD module 200 and SPD circuit 201 according to further embodiments in shown therein. The SPD module 200 and circuit 201 are constructed in the same manner as the SPD module 100 and circuit 101, except as follows. For the purpose of explanation, the numerals used to reference parts of the SPD module 100 in FIGS. 2-9 are likewise used to designate the same parts in FIG. 10.

The SPD module 200 includes an SG trigger circuit 250 constructed in the same manner as the SG trigger circuit 150, except that an electrically resistive trigger member 254 is provided in place of the semiconductive trigger member 154.

The end faces 254A, 254B of the resistive trigger member 254 may be in direct contact with the trigger sections 124T, 126T of the SG electrodes 124, 126. Alternatively, the end faces 254A, 254B may be directly electrically connected to the trigger sections 124T, 126T by intervening metal layers.

The trigger member 254 may be formed of any suitable material. In some embodiments, the trigger member 254 is formed of a mixture including metal oxide powder, glass powder and/or graphite powder that is sintered. In some embodiments, the resistive material forming the trigger member 254 is a sintered body of ZnO, MgO with the addition of $Al_2O_3$ in a suitable percentage, or a sintered mixture of metal powder with $SiO_2$.

The SPD module 200 can be used and may operate in the manner described for the SPD module 100. In this case, the resistive trigger member 254 serves in place of the semiconductive member 154 to trigger the flashover AT.

Figure 11:
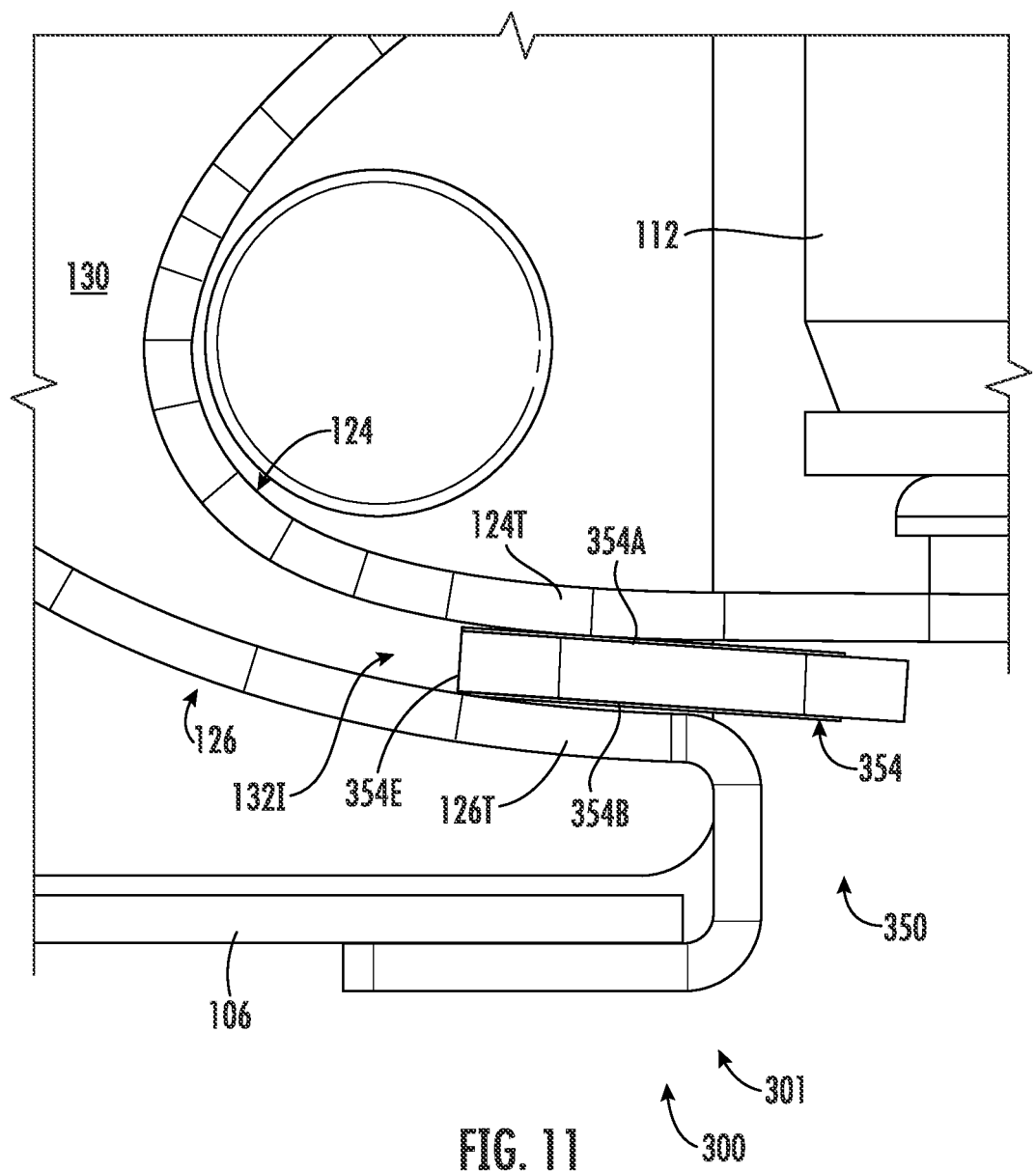
FIG. 11 is an enlarged, fragmentary, side view of an SPD module according to further embodiments including an MOV trigger member.
Figure 12:
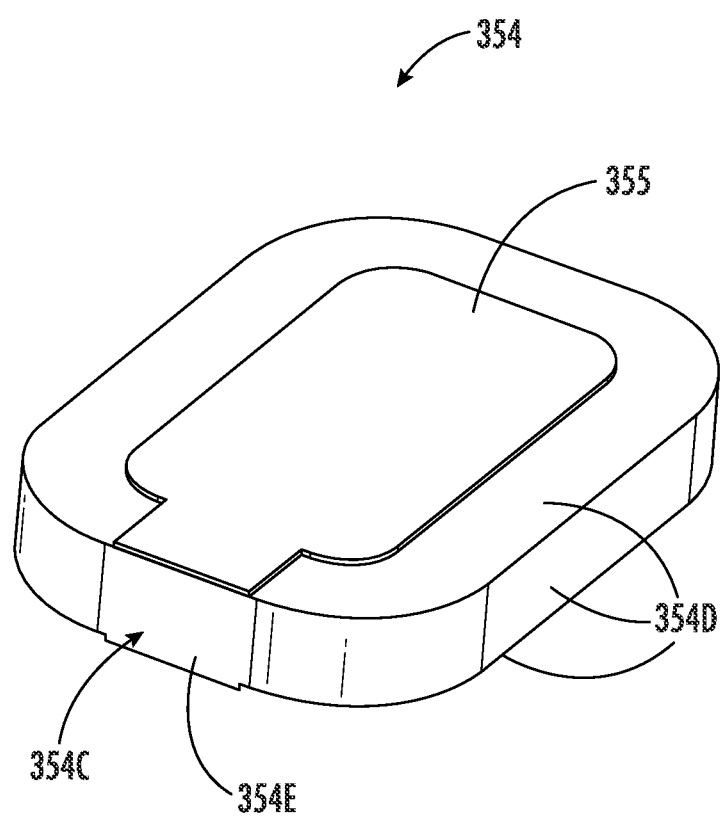
FIG. 12 is perspective view of the MOV trigger member of the SPD module of FIG. 11.

With reference to FIGS. 11 and 12, an SPD module 300 and SPD circuit 301 according to further embodiments in shown therein. The SPD module 300 and circuit 301 are constructed in the same manner as the SPD module 100 and circuit 101, except as follows. For the purpose of explanation, the numerals used to reference parts of the SPD module 100 in FIGS. 2-9 are likewise used to designate the same parts in FIG. 11.

The SPD module 300 includes an SG trigger circuit 350 constructed in the same manner as the SG trigger circuit 150, except that a metal oxide varistor (MOV) trigger member 354 (FIG. 12) is provided in place of the semiconductive trigger member 154.

The end faces 354A, 354B of the MOV trigger member 354 may be in direct contact with the trigger sections 124T, 126T of the SG electrodes 124, 126. Alternatively, the end faces 354A, 354B may be directly electrically connected to the trigger sections 124T, 126T by intervening metal layers 355 (e.g., thin metallization layers).

The MOV trigger member 354 may be formed of any suitable material. The MOV trigger member material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The SPD module 300 can be used and may operate in the manner described for the SPD module 100. In this case, the MOV trigger member 354 serves in place of the semiconductive member 154 to trigger the flashover AT.

In some embodiments, the MOV trigger member 354 includes an MOV body 354C (formed of a varistor material as described above) and an electrically insulating passivation layer 354D surrounding portions of the MOV body 354C. A surface region 354E of the MOV body 354C is not covered by the passivation layer 354D. The surface region 354E provides a surface region for flashover of the trigger arc AT. In some embodiments, the surface region 354E is a relatively narrow region on a side wall of the MOV body 354C and the remainder of the side wall is covered by the passivation layer 354D. The passivation layer 354D may be formed of glass, for example.

Figure 13:
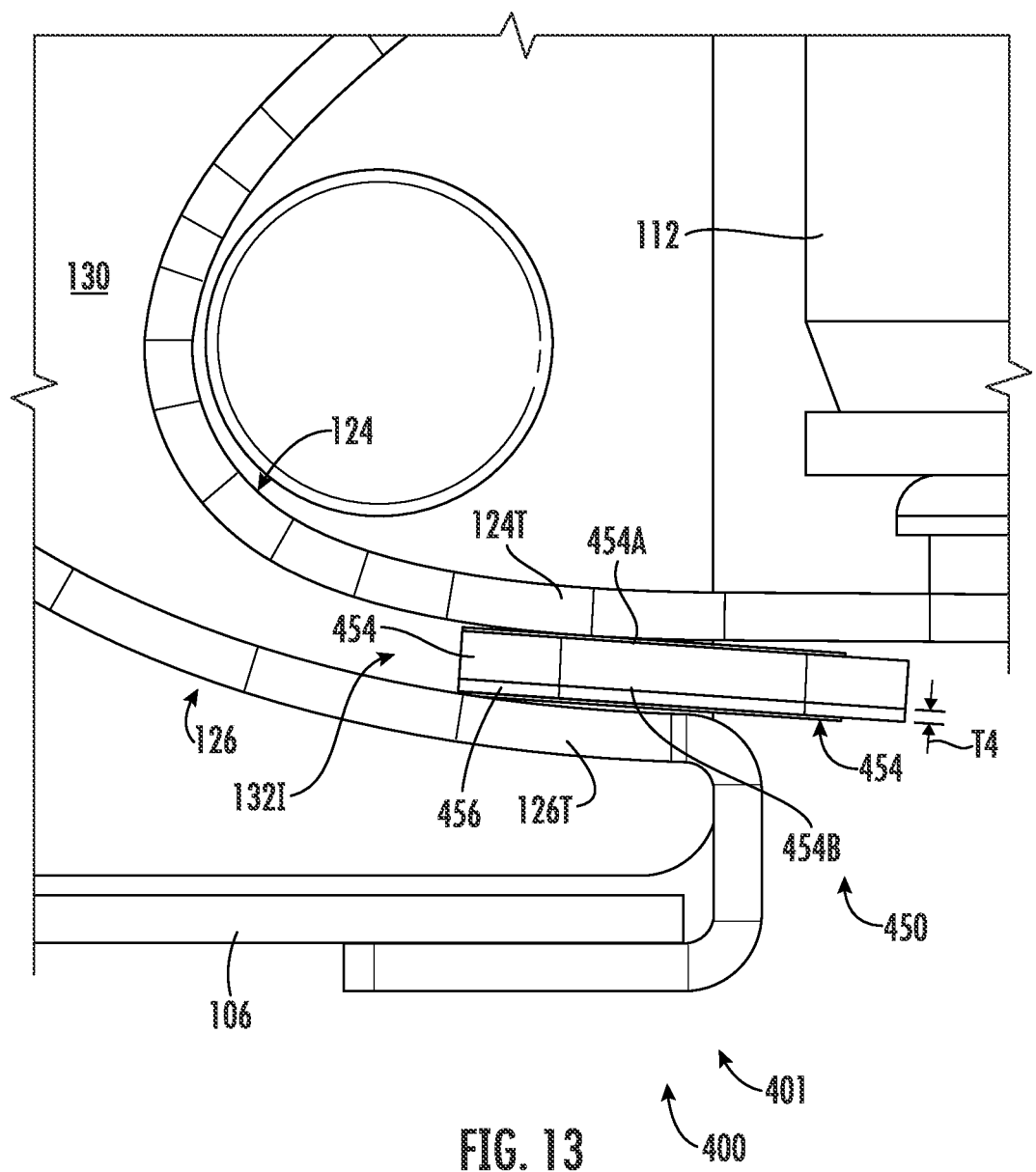
FIG. 13 is an enlarged, fragmentary, side view of an SPD module according to further embodiments including a semiconductive trigger member.

With reference to FIG. 13, an SPD module 400 and SPD circuit 401 according to further embodiments in shown therein. The SPD module 400 and circuit 401 are constructed in the same manner as the SPD module 100 and circuit 101, except as follows. For the purpose of explanation, the numerals used to reference parts of the SPD module 100 in FIGS. 2-9 are likewise used to designate the same parts in FIG. 13.

The SPD module 400 includes an SG trigger circuit 450 including a semiconductive trigger member 454 constructed in the same manner as the semiconductive trigger member 154. The SG trigger circuit 450 is constructed in the same manner as the SG trigger circuit 150, except that an electrical insulator layer or film 456 contacts the electrode trigger section 126T and is interposed between the semiconductive trigger member 454 and the SG electrode 126. The first end face 454A of the trigger member 454 electrically engages the electrode trigger section 124T. The second end face 454A of the trigger member 454 engages the insulator layer 456. The trigger member 454 is electrically insulated from the electrode 126 by the insulator layer 456.

The insulator layer 456 may be formed of any suitable electrically insulating material. In some embodiments, the insulator layer 456 is formed of a polymeric material (e.g., a rubber or a plastic). In some embodiments, the insulator layer 456 is formed of polyimide (e.g., KAPTON film) or ceramic.

In some embodiments, the insulator layer 456 has a thickness T4 in the range of from about 0.1 mm to 0.3 mm.

The SPD module 400 can be used and may operate in the manner described for the SPD module 100. In this case, the MOV trigger member 454 serves in place of the semiconductive member 154 to trigger the flashover AT.

Figure 14:
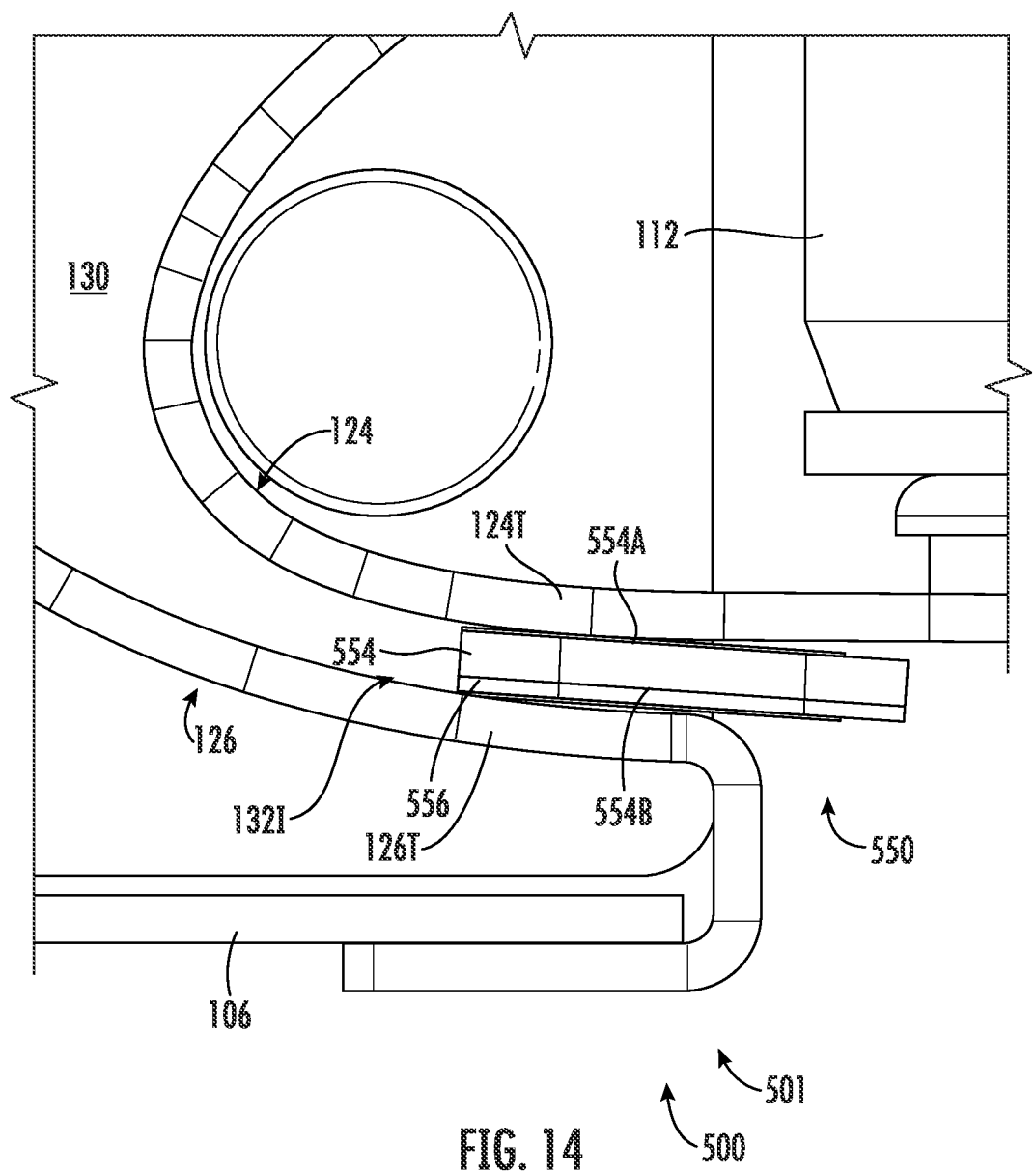
FIG. 14 is an enlarged, fragmentary, side view of an SPD module according to further embodiments including an electrically resistive trigger member.

With reference to FIG. 14, an SPD module 500 and SPD circuit 501 according to further embodiments in shown therein. The SPD module 500 and circuit 501 are constructed in the same manner as the SPD module 200 and circuit 201, except as follows. For the purpose of explanation, the numerals used to reference parts of the SPD module 100 in FIGS. 2-9 are likewise used to designate the same parts in FIG. 14.

The SPD module 500 includes an SG trigger circuit 550 including a resistive trigger member 554 constructed as described for the resistive trigger member 254. The SG trigger circuit 550 is constructed in the same manner as the SG trigger circuit 250, except that an electrical insulator layer or film 556 contacts the electrode trigger section 126T and is interposed between the trigger member 554 and the SG electrode 126. The first end face 554A of the trigger member 554 electrically engages the electrode trigger section 124T. The second end face 554A of the trigger member 554 engages the insulator layer 556. The trigger member 554 is electrically insulated from the electrode 126 by the insulator layer 556.

Figure 15:
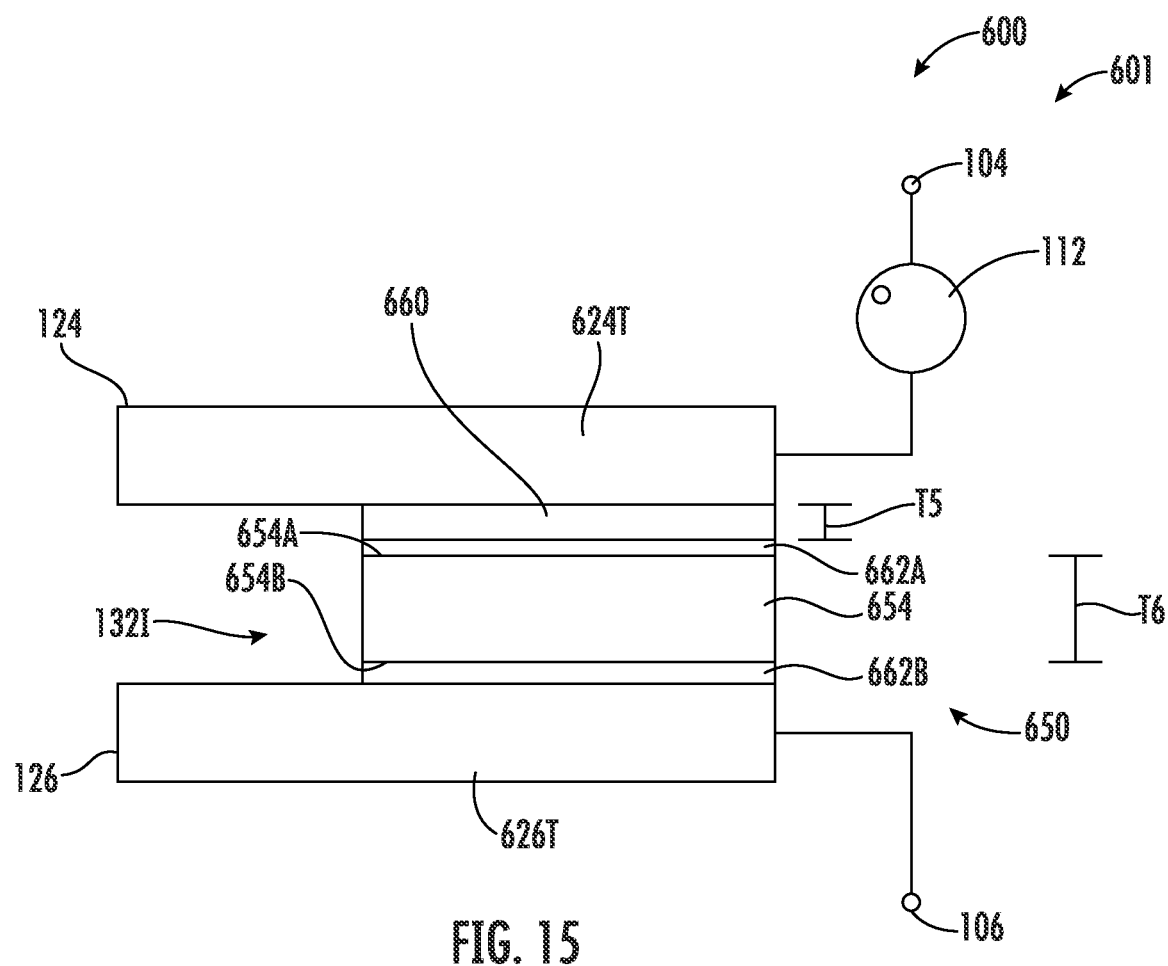
FIG. 15 is an enlarged, fragmentary, side view of an SPD module according to further embodiments including a MOV trigger member.

With reference to FIG. 15, an SPD module 600 and SPD circuit 601 according to further embodiments in shown therein. The SPD module 600 and circuit 601 are constructed in the same manner as the SPD module 300 and circuit 301, except as follows. For the purpose of explanation, the numerals used to reference parts of the SPD module 100 in FIGS. 2-9 are likewise used to designate the same parts in FIG. 15.

The SPD module 600 includes an SG trigger circuit 650 including an MOV trigger member 654 constructed in the same manner as the MOV trigger member 354. The SG trigger circuit 650 is constructed in the same manner as the SG trigger circuit 350, except that the SG trigger circuit 650 further includes a resistive material layer 660 and metal MOV electrodes 662A and 662B.

The end faces 654A and 654B of the MOV trigger member 654 are in contact with respective ones of the metal MOV electrodes 662A and 662B. The MOV electrodes 362A, 362B may be discrete metal films or thin metallization layers, for example.

The resistive material layer 660 is formed of an electrically resistive material as described above for the resistive trigger member 254. The resistive material layer 660 may be formed of a hard material or a polymer. In some embodiments, the resistive material layer 660 is porous.

The resistive material layer 660 is interposed between and electrically connects the MOV end face 654A and the electrode trigger section 624T. The MOV electrode 662B is interposed between the MOV end face 654B is electrically connected to the electrode trigger section 626T by the MOV electrode 662B.

In some embodiments, the resistive material layer 660 has a thickness T5 in the range of from about 0.1 mm to 0.5 mm.

In some embodiments, the MOV trigger member 654 has a thickness T6 in the range of from about 0.5 mm to 1.5 mm.

The SPD module 600 can be used and may operate in the manner described for the SPD module 100. In this case, the MOV trigger member 654 serves to trigger the flashover AT as described for the MOV trigger member 354. The resistive material layer 660 enables low triggering or flashover current and voltage levels, while the MOV trigger member 654 prevents and cuts off any continuation currents through the resistive film 660 after the surge arc AM is initiated.

Figure 16:
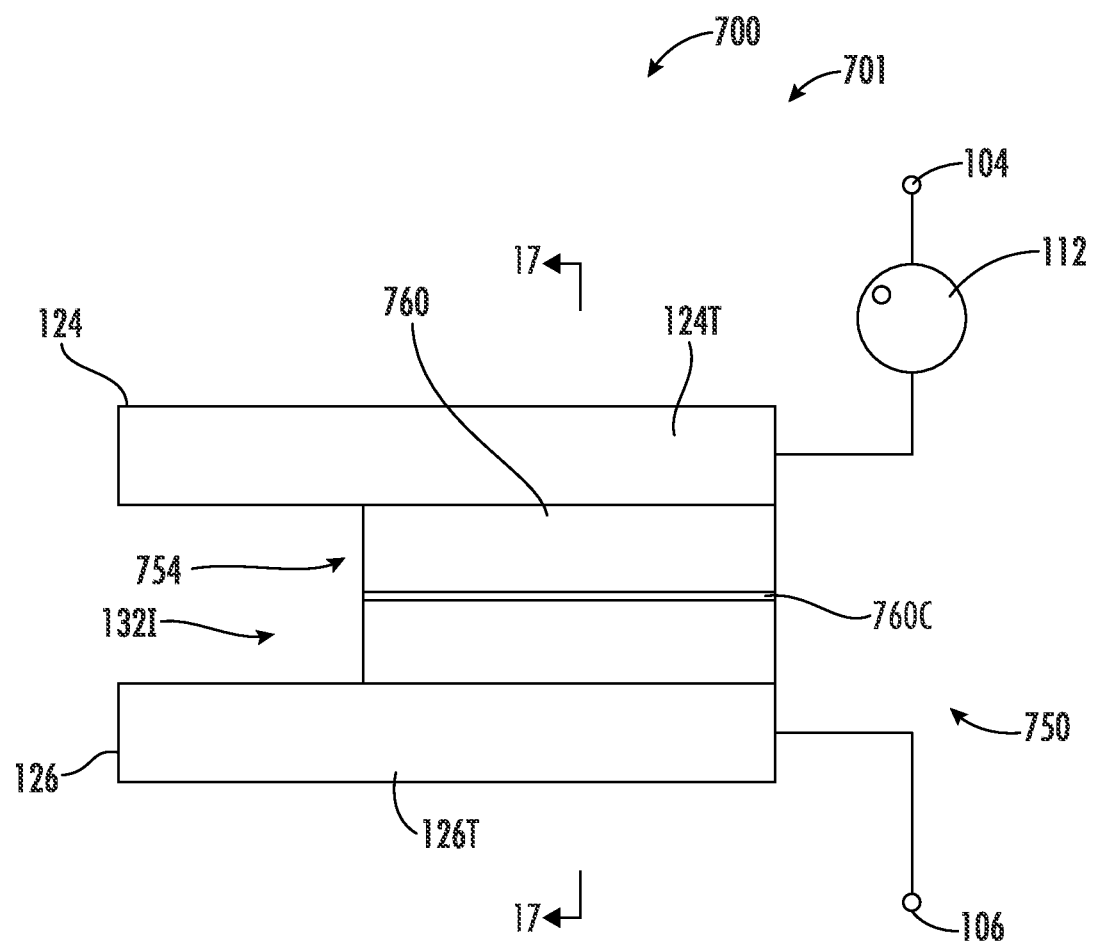
FIG. 16 is an enlarged, fragmentary, side view of an SPD module according to further embodiments including an electrically resistive trigger member.

With reference to FIG. 16, an SPD module 700 and SPD circuit 701 according to further embodiments in shown therein. The SPD module 700 and circuit 701 are constructed in the same manner as the SPD module 200 and circuit 201, except as follows. For the purpose of explanation, the numerals used to reference parts of the SPD module 100 in FIGS. 2-9 are likewise used to designate the same parts in FIG. 16.

The SPD module 700 includes an SG trigger circuit 750 constructed in the same manner as the SG trigger circuit 150, except that an electrically resistive trigger member 754 is provided in place of the resistive trigger member 254.

The resistive trigger member 754 includes an electrically nonconducting substrate 764 (e.g., ceramic) and a layer 760 of an electrical resistive material bonded to a face of the substrate 764 extending between the SG electrode trigger sections 124T, 126T. The resistive material layer 760 contacts each of the SG trigger sections 124T, 126T.

The resistive material layer 760 may be formed of an electrically resistive material as described above for the resistive trigger member 200. In some embodiments, the resistive material layer 760 may be porous. The resistive material layer 760 may be applied as a coating to the substrate 764.

A discontinuity or gap 760C is defined in the resistive material layer 760. The gap 760C may be formed by cutting or etching the resistive material layer 760, for example.

Figure 17:
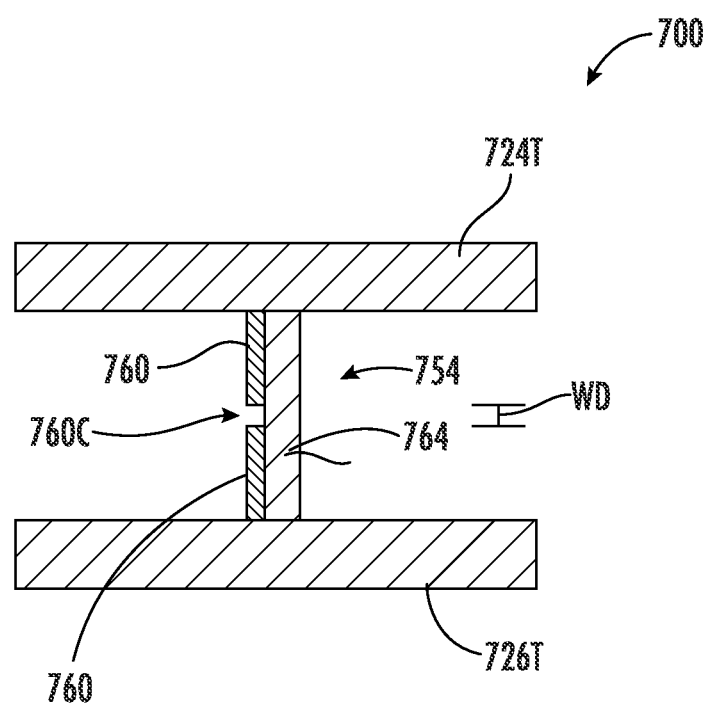
FIG. 17 is a fragmentary, cross-sectional view of the SPD module of FIG. 16 taken along the line 17-17 of FIG. 16.

In some embodiments and as illustrated in FIG. 17, the gap 760C is a slot or gap that extends fully through the thickness of the resistive material layer 760 to the substrate 764. In other embodiments, the gap 760C is a groove, slot or gap that extends only partially through the thickness of the resistive material layer 760 (i.e., the thickness of the resistive material layer 760 is reduced).

While only one gap 760C is shown in the embodiment of FIGS. 16 and 17, in other embodiments the resistive material layer 760 may be provided with multiple gaps 760C.

In some embodiments, each gap 760C has a width W7 (FIG. 17) of less than 0.2 mm.

The SPD module 700 can be used and may operate in the manner described for the SPD module 100. In this case, the resistive trigger member 754 serves to trigger the flashover AT as described for the resistive trigger member 254. The resistive material layer 760 enables low triggering or flashover current and voltage levels.

Figure 18:
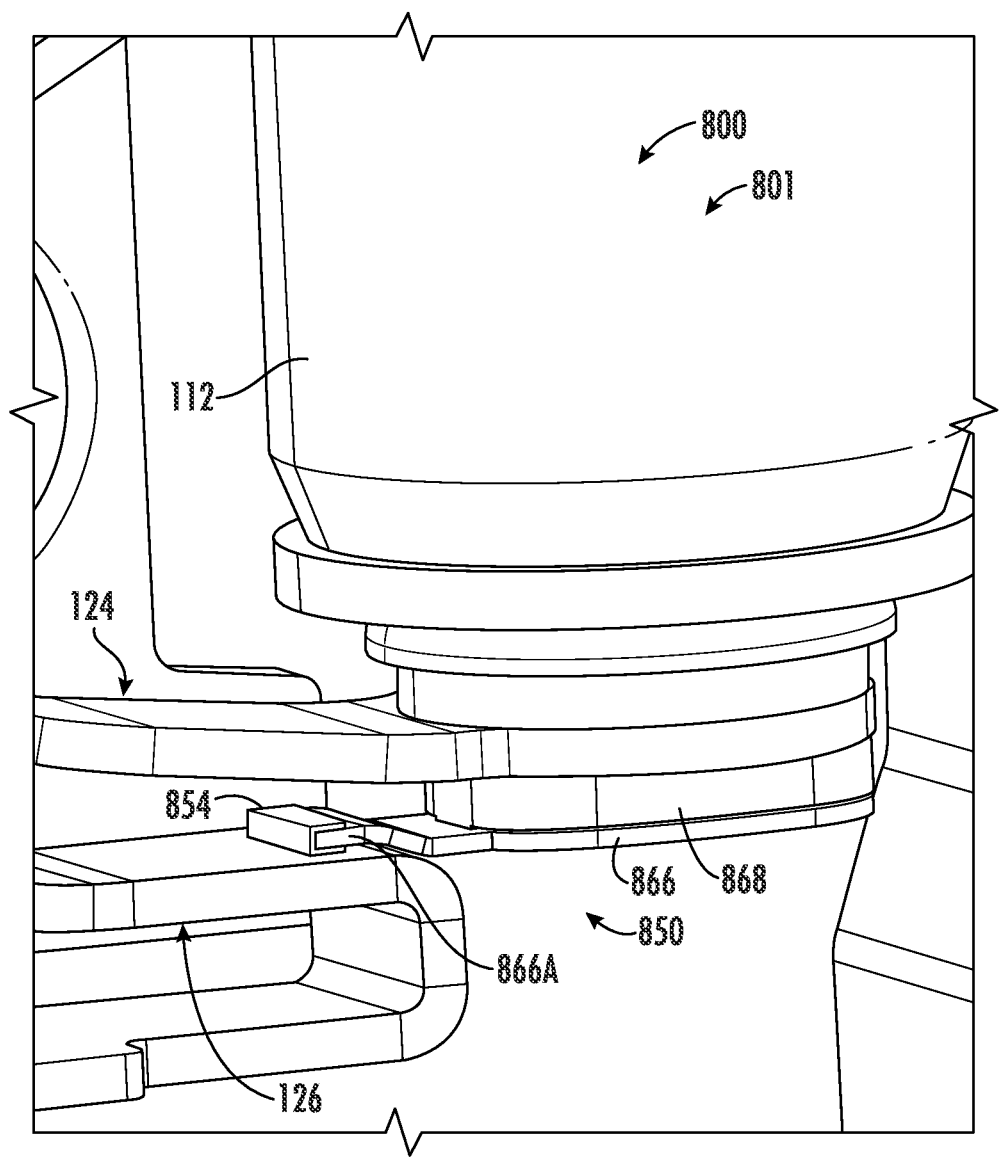
FIG. 18 is an enlarged, fragmentary, perspective view of an SPD module according to further embodiments.
Figure 19:
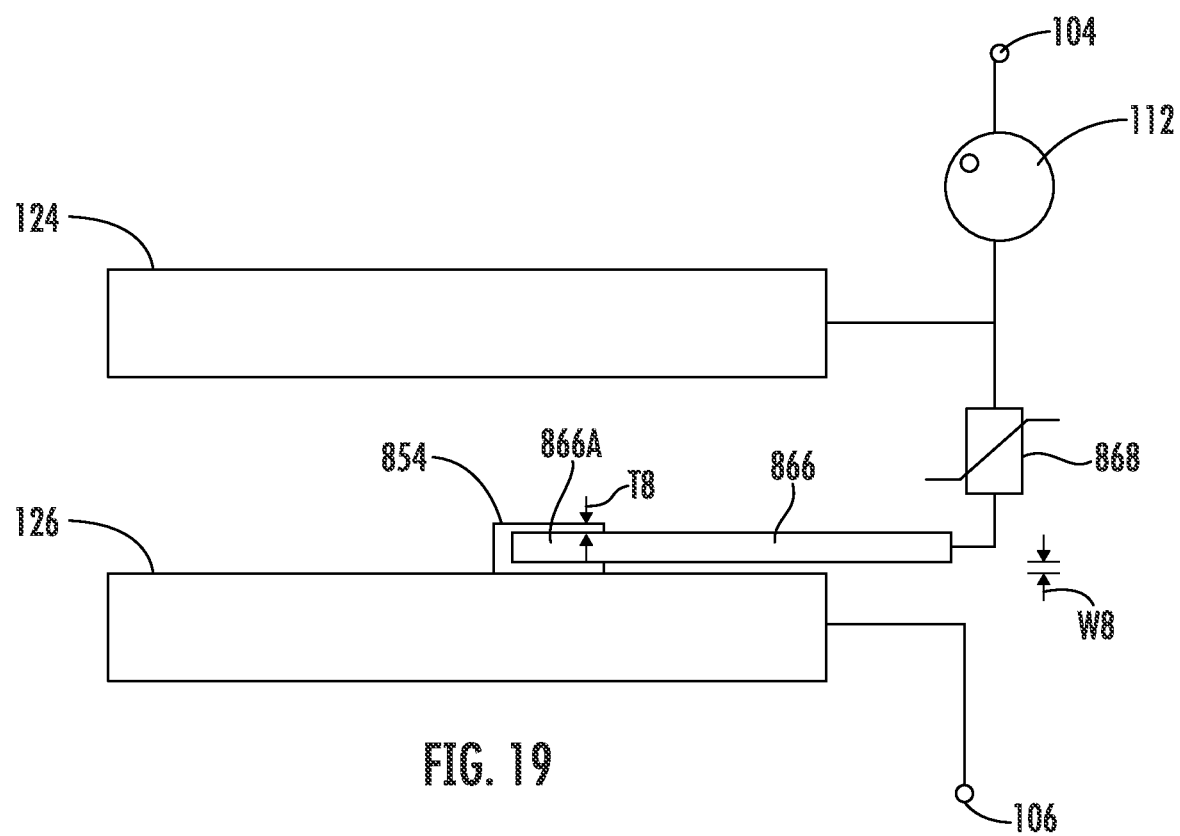
FIG. 19 is a fragmentary, side view of the SPD module of FIG. 18

With reference to FIGS. 18 and 19, an SPD module 800 and SPD circuit 801 according to further embodiments in shown therein. The SPD module 800 and circuit 801 are constructed in the same manner as the SPD module 100 and circuit 101, except as follows. For the purpose of explanation, the numerals used to reference parts of the SPD module 100 in FIGS. 2-9 are likewise used to designate the same parts in FIGS. 18 and 19.

The SPD module 800 includes an SG trigger circuit 850 provided in place of the SG trigger circuit 150. The SG trigger circuit 850 includes a trigger MOV member 868, a trigger electrode 866, and an electrically resistive film or layer 854.

The resistive layer 854 surrounds a tip portion 866A of the trigger electrode 866. The resistive material layer 854 may be applied as a coating to the trigger electrode 866. In some embodiments, the resistive material layer 854 fully surrounds the tip portion 866A. In other embodiments, a portion or portions of the tip portion 866A are not covered be the resistive material layer 854.

The resistive layer 854 separates the tip portion 866A from the SG electrodes 124, 126. The resistive layer 854 also spaces the trigger electrode 866 away from the SG electrode 126.

In some embodiments, the resistive material layer 854 has a thickness T8 in the range of from about 0.1 mm to 0.5 mm.

In some embodiments, the spacing distance W8 between the trigger electrode 866 and the SG electrode 126 is in the range of from about 0.1 mm to 0.5 mm.

The SPD module 800 can be used and may operate in the manner described for the SPD module 100. In this case, the resistive material layer 854 enables low triggering or flashover current and voltage levels, while the trigger MOV member 868 prevents and cuts off any continuation currents through the resistive film 854 after the surge arc AM is initiated.

Figure 20:
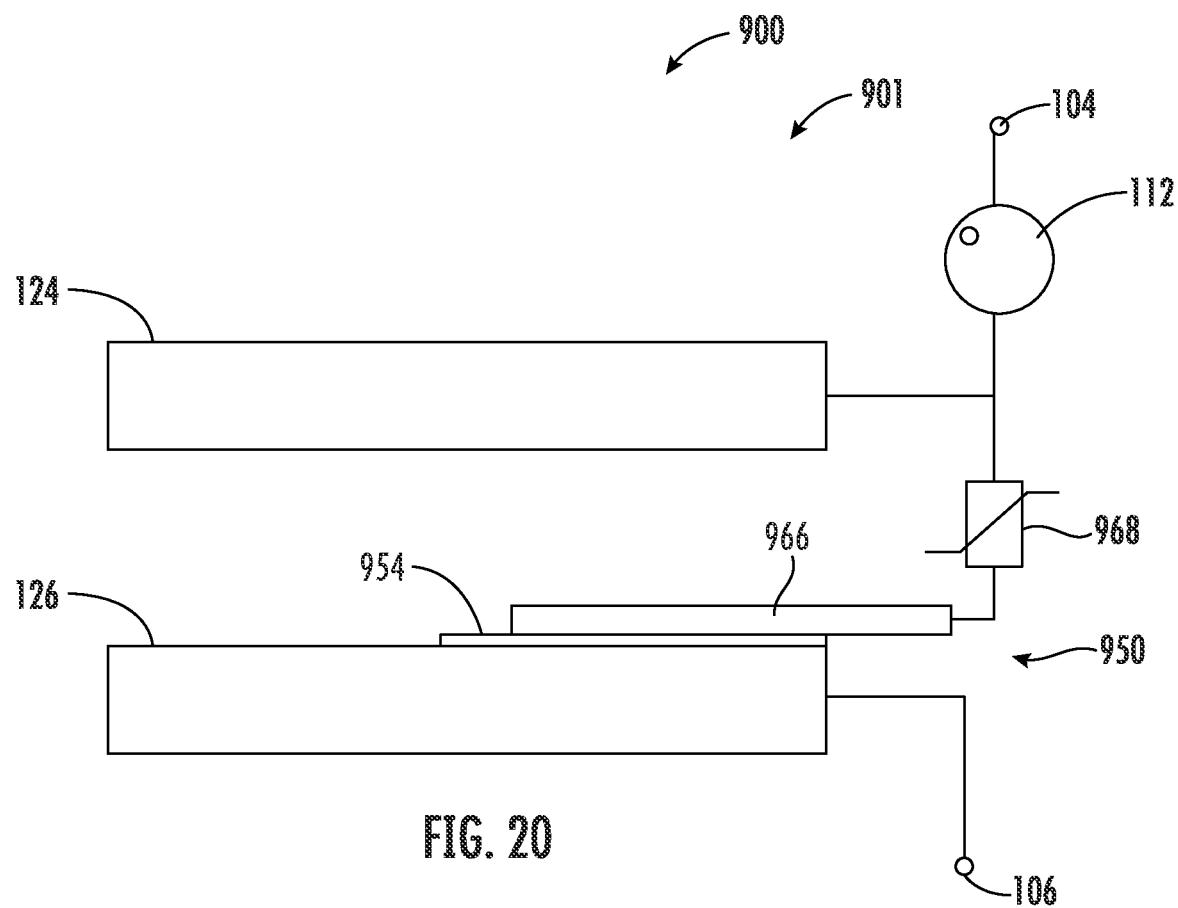
FIG. 20 is an enlarged, fragmentary, side view of an SPD module according to further embodiments.

With reference to FIG. 20, an SPD module 900 and SPD circuit 901 according to further embodiments in shown therein. The SPD module 900 and circuit 901 are constructed in the same manner as the SPD module 800 and circuit 801, except as follows. For the purpose of explanation, the numerals used to reference parts of the SPD module 100 in FIGS. 2-9 are likewise used to designate the same parts in FIG. 20.

The SPD module 900 includes an SG trigger circuit 950. The SG trigger circuit 950 includes a trigger MOV member 968, a trigger electrode 966, and an electrically resistive film or layer 954.

The SPD module 900 is constructed in the same manner as the SG trigger circuit 850 except that the resistive layer 954 is interposed between the trigger electrode 966 and the SG electrode 126 but does not surround a tip portion of the trigger electrode 966. In some embodiments, the resistive layer 954 is a coated onto the SG electrode 126 and the trigger electrode 966 is placed against the resistive layer 954.

The SPD module 900 can be used and may operate in the manner described for the SPD module 800. The resistive material layer 954 enables low triggering or flashover current and voltage levels, while the trigger MOV member 968 prevents and cuts off any continuation currents through the resistive film 954 after the surge arc AM is initiated.

Figure 21:
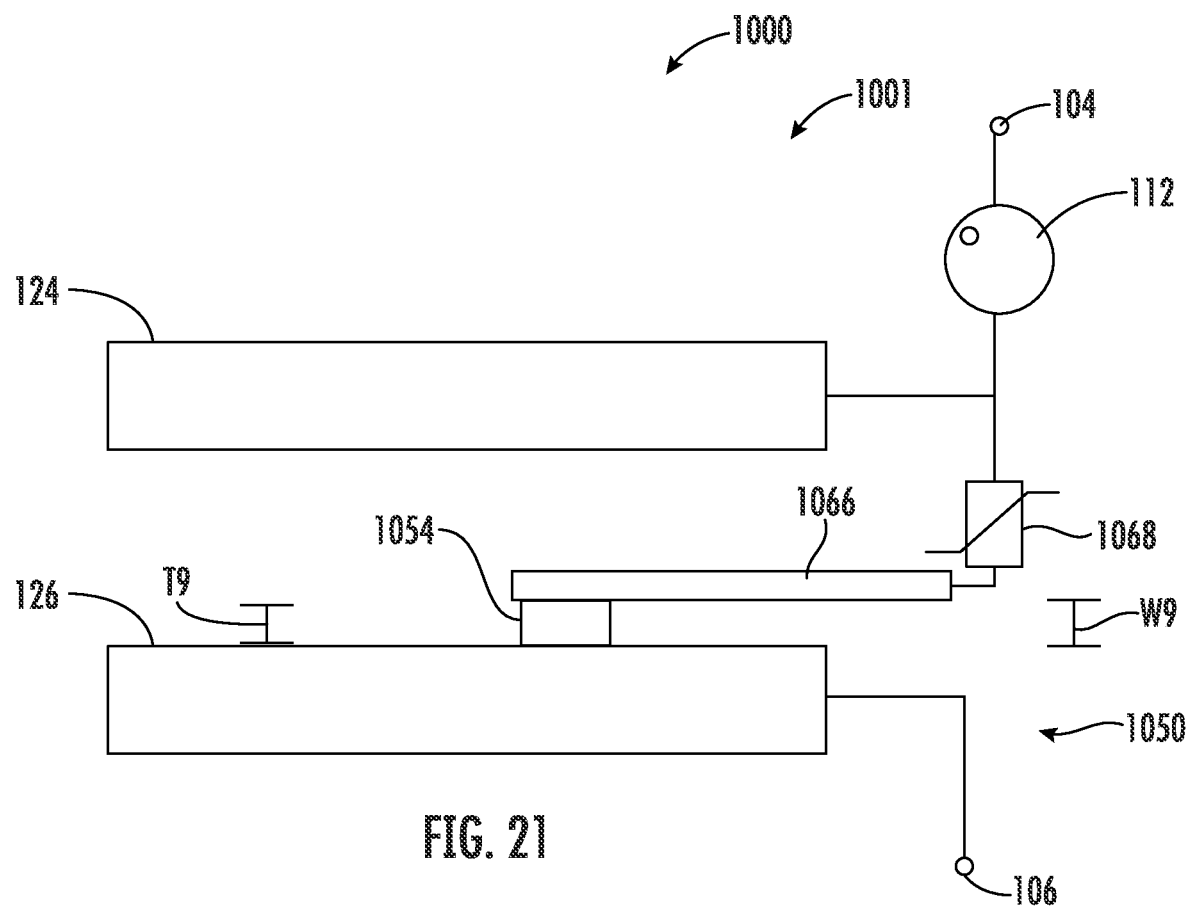
FIG. 21 is an enlarged, fragmentary, side view of an SPD module according to further embodiments.

With reference to FIG. 21, an SPD module 1000 and SPD circuit 1001 according to further embodiments in shown therein. The SPD module 1000 and circuit 1001 are constructed in the same manner as the SPD module 800 and circuit 801, except as follows. For the purpose of explanation, the numerals used to reference parts of the SPD module 100 in FIGS. 2-9 are likewise used to designate the same parts in FIG. 21.

The SPD module 1000 includes an SG trigger circuit 1050. The SG trigger circuit 1050 includes a trigger MOV member 1068, a trigger electrode 1066, and an electrically resistive trigger member 1054.

The resistive trigger member 1054 can be formed of a material as described for the resistive trigger member 254.

In some embodiments, the resistive trigger member 1054 has a thickness T9 in the range of from about 0.1 mm to 0.5 mm.

In some embodiments, the spacing distance W9 between the trigger electrode 1066 and the SG electrode 126 is in the range of from about 0.1 mm to 0.5 mm.

The SPD module 1000 can be used and may operate in the manner described for the SPD module 800. The resistive trigger member 1054 operates as described for the resistive trigger member 254. The resistive trigger member 1054 enables low triggering or flashover current and voltage levels, while the trigger MOV member 1068 prevents and cuts off any continuation currents through or along the resistive trigger member 1054 after the surge arc AM is initiated.

Figure 22:
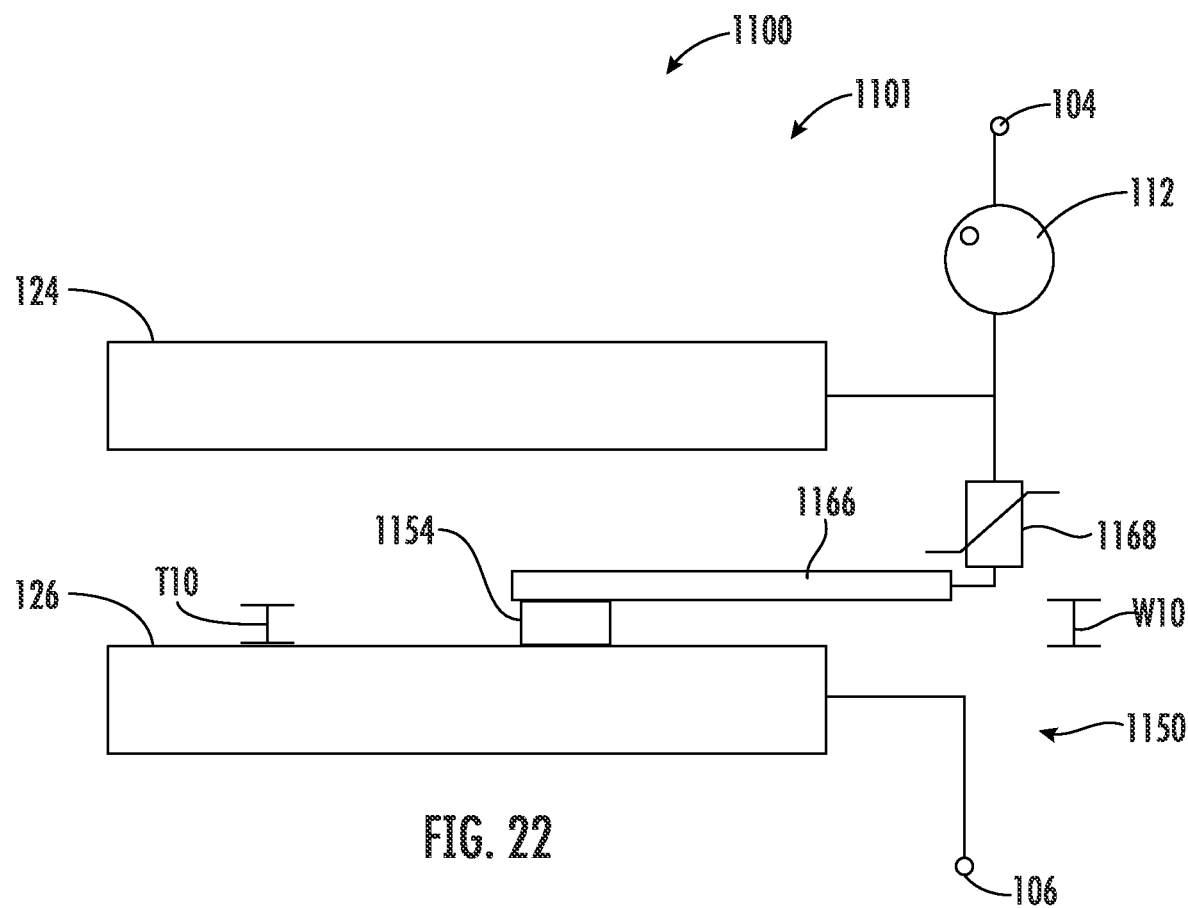
FIG. 22 is an enlarged, fragmentary, side view of an SPD module according to further embodiments.
Figure 23:
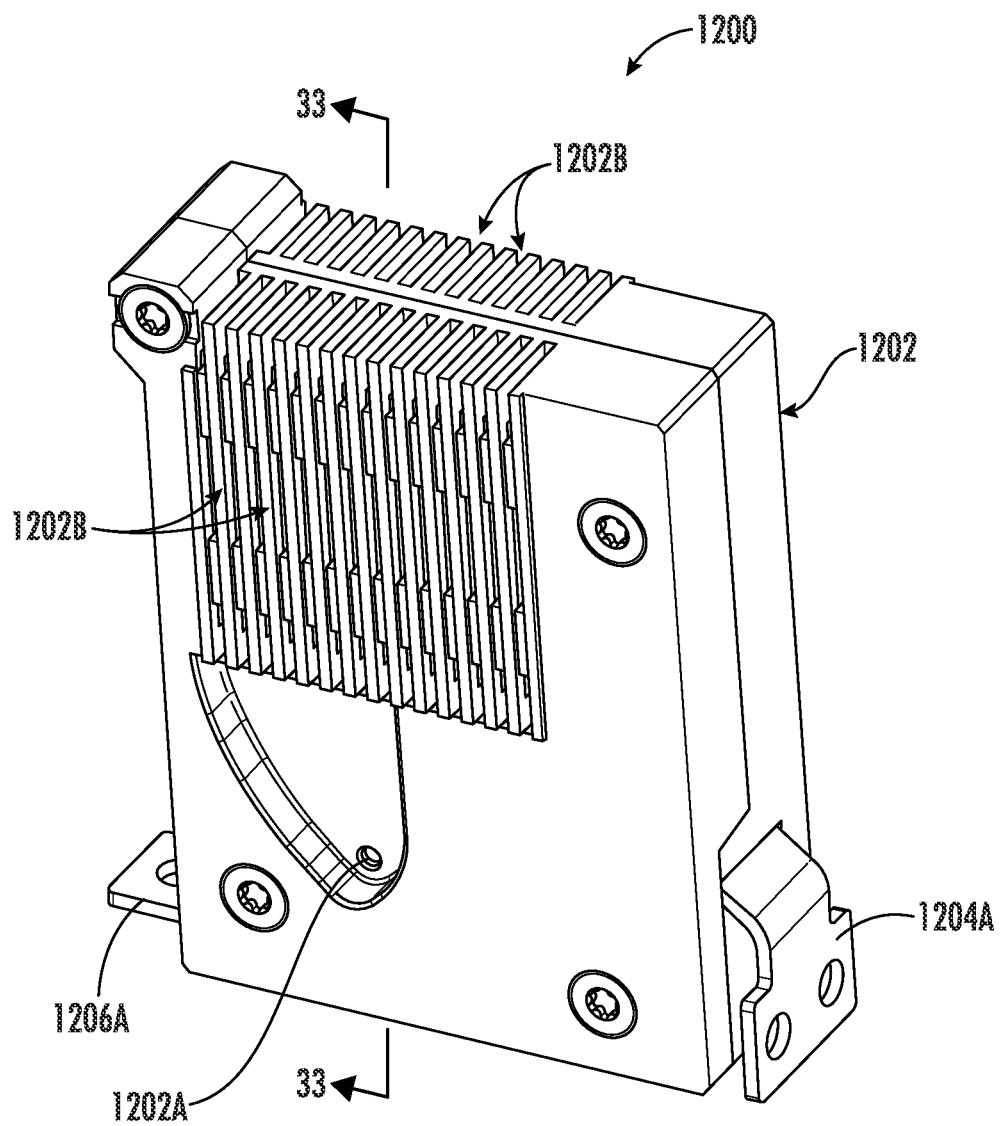
FIG. 23 is a perspective view of an SPD module according to further embodiments.

With reference to FIG. 22, an SPD module 1100 and SPD circuit 1101 according to further embodiments in shown therein. The SPD module 1100 and circuit 1101 are constructed in the same manner as the SPD module 100 and circuit 101, except as follows. For the purpose of explanation, the numerals used to reference parts of the SPD module 100 in FIGS. 2-9 are likewise used to designate the same parts in FIG. 22.

The SPD module 1100 includes an SG trigger circuit 1150. The SG trigger circuit 1150 includes a trigger MOV member 1168, a trigger electrode 1066, and an electrically semiconductive trigger member 1154.

The semiconductive trigger member 1154 can be formed of a material as described for the semiconductive trigger member 154 (e.g., a polymeric semiconductive material).

In some embodiments, the semiconductive trigger member 1154 has a thickness T10 in the range of from about 0.1 mm to 0.5 mm.

In some embodiments, the spacing distance W10 between the trigger electrode 1166 and the SG electrode 126 is in the range of from about 0.1 mm to 0.5 mm.

The SPD module 1100 can be used and may operate in the manner described for the SPD module 800. The semiconductive trigger member 1154 operates as described for the resistive trigger member 154. The semiconductive trigger member 1154 enables low triggering or flashover current and voltage levels, while the trigger MOV member 1154 prevents and cuts off any continuation currents through or along the semiconductive trigger member 1154 after the surge arc AM is initiated.

While the trigger circuits 850, 950, 1050 and 1150 have been described including trigger MOV members 868, 968, 1068, 1168, in other embodiments the trigger circuit may include other voltage-switching/limiting components in addition to or in place of the MOV member. For example, the trigger circuit may include a trigger GDT in place of the trigger MOV or in electrical series with the trigger MOV and in electrical parallel with the SG electrode 124.

With reference to FIGS. 23-33, an SPD module 1200 and SPD electrical circuit 1201 (FIG. 24) according to further embodiments in shown therein. The SPD module 1200 and circuit 1201 are constructed in the same manner as the SPD module 100 and circuit 101, except as follows. The SPD module 1200 and circuit 1201 may be installed and used as a component in a protection circuit of a power supply circuit 10 as shown in FIG. 1, for example.

The SPD module 1200 includes a module housing 1202 and an overvoltage protection circuit (OPC) 1210. The OPC 1210 is disposed in the housing 1202, and is electrically connected between electrical terminals 1204A and 1206A to form the SPD electrical circuit 1201.

The OPC 1210 includes a spark gap assembly 1220, a first electrode member 1204, and a second electrode member 1206. Portions of the electrode members 1204, 1206 form parts of the spark gap assembly 1220.

The first electrode member 1204 includes the terminal 1204A, a bridge portion 1204B, and a first main or spark gap (SG) electrode 1224. The second electrode member 1206 includes the terminal 1206A and a second main or SG electrode 1226.

The spark gap assembly 1220 includes a spark gap subassembly or horn spark gap assembly 1222, a spark gap (SG) trigger circuit 1250, and a deion chamber or arc chute 1240. The SG trigger circuit 1250 is located at an inner end 1220A of the spark gap assembly 1220 and the arc chute 1240 is located at an opposing outer end 1220B of the spark gap assembly 1220.

The horn spark gap assembly 1222 includes the first SG electrode 1224, the second SG electrode 1226, a spark gap 1230, and laterally opposed side or containment walls 1228. The spark gap 1230 is defined between the electrodes 1224, 1226.

The first SG electrode 1224 (FIG. 26) has an inner end 1224A and an opposing outer end 1224B. The first SG electrode 1224 includes (extending sequentially from the inner end 1224A to the outer end 1224B) a trigger section 1224T, an ignition section 1224I, a running section 1224R, and an extinguishing section 1224E.

The second SG electrode 1226 (FIG. 28) has an inner end 1226A and an opposing outer end 1226B. The second SG electrode 1226 includes (extending sequentially from the inner end 1226A to the outer end 1226B), a trigger section 1226T, an ignition section 1226I, a running section 1226R, and an extinguishing section 1226E.

The second SG electrode 1226 further includes a channel or groove 1229 defined therein. The groove 1229 defines and extends along a groove longitudinal axis LG-LG and along a groove lateral axis WG-WG transverse or perpendicular to the groove longitudinal axis LG-LG. The groove longitudinal axis LG-LG is parallel to the lengthwise axis L-L of the second SG electrode 1226 and the ignition region 1232I.

The groove 1229 includes a base wall 1229A and an end wall 1229E at the distal end of the base wall 1229A.

In some embodiments and as illustrated, the base wall 1229A slopes or angles an angle A12 (FIG. 31) relative to the inner surface 1226C of the second SG electrode 1226 in the direction toward the ignition region 1232I. That is, the base wall 1229A slopes outwardly relative to the spark gap 1230 (or inwardly with respect to the thickness of the second SG electrode 1226). In some embodiments, the angle A12 is at least 5 degrees. In some embodiments, the angle A12 is in the range of 1 to 10 degrees.

The groove 1229 extends laterally across the width of the trigger section 1226T (i.e., transverse or perpendicular to the length of the second SG electrode 1226). In some embodiments, the groove 1229 extends across the full width of the trigger section 1226T.

In some embodiments, the groove 1229 has a depth D12 (FIG. 31) at the end wall 1229E in the range of from 0.1 times the trigger member thickness T15 to 1 times the trigger member thickness T15.

In some embodiments, the groove 1229 has a width W12 (FIG. 29) at the end wall 1229E in the range of from 2 mm to 10 mm. The width W12 can be the same as the width of the electrode 1226 or less.

Figure 27:
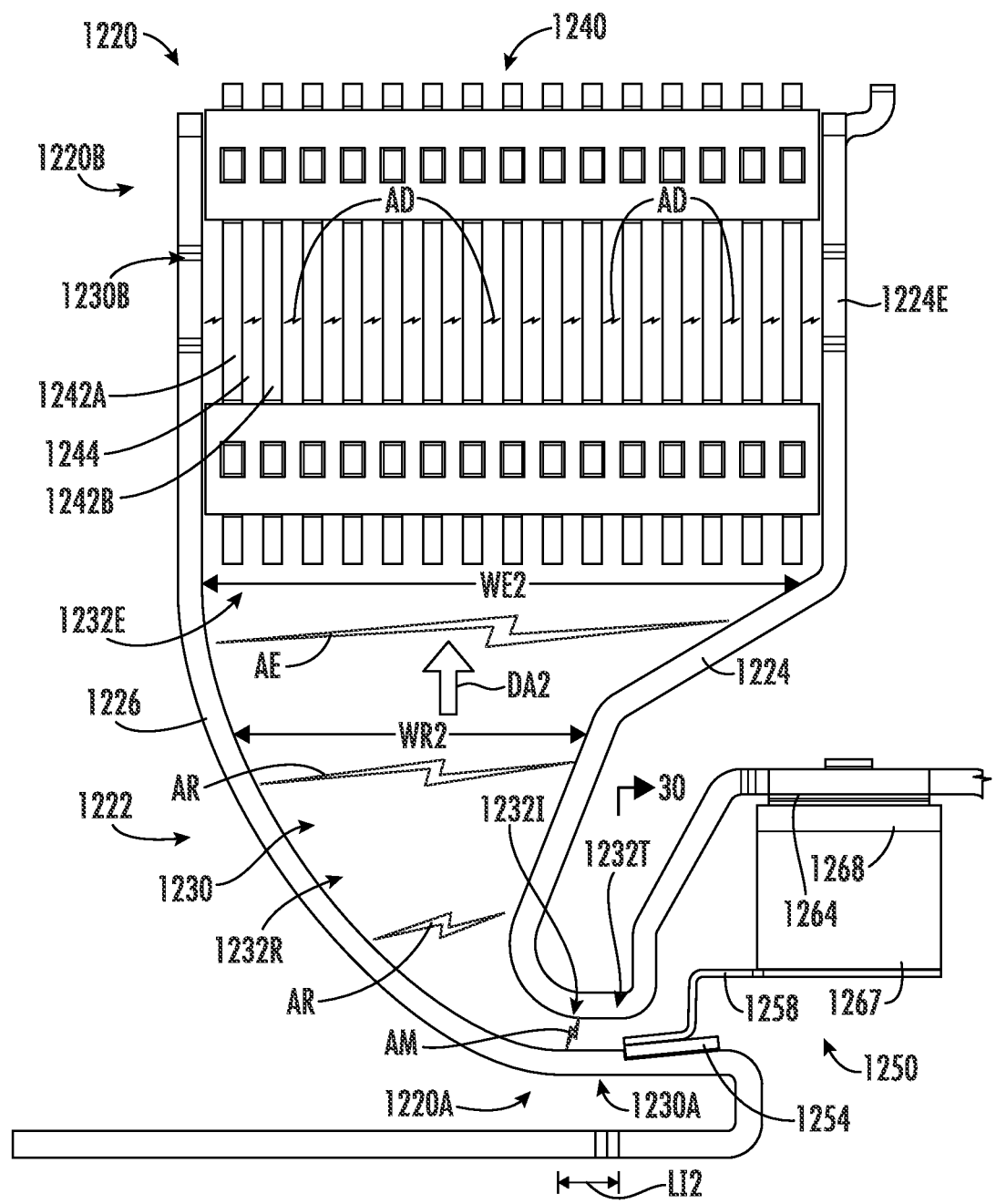
FIG. 27 is a fragmentary, side view of the spark gap assembly of FIG. 26.
Figure 28:
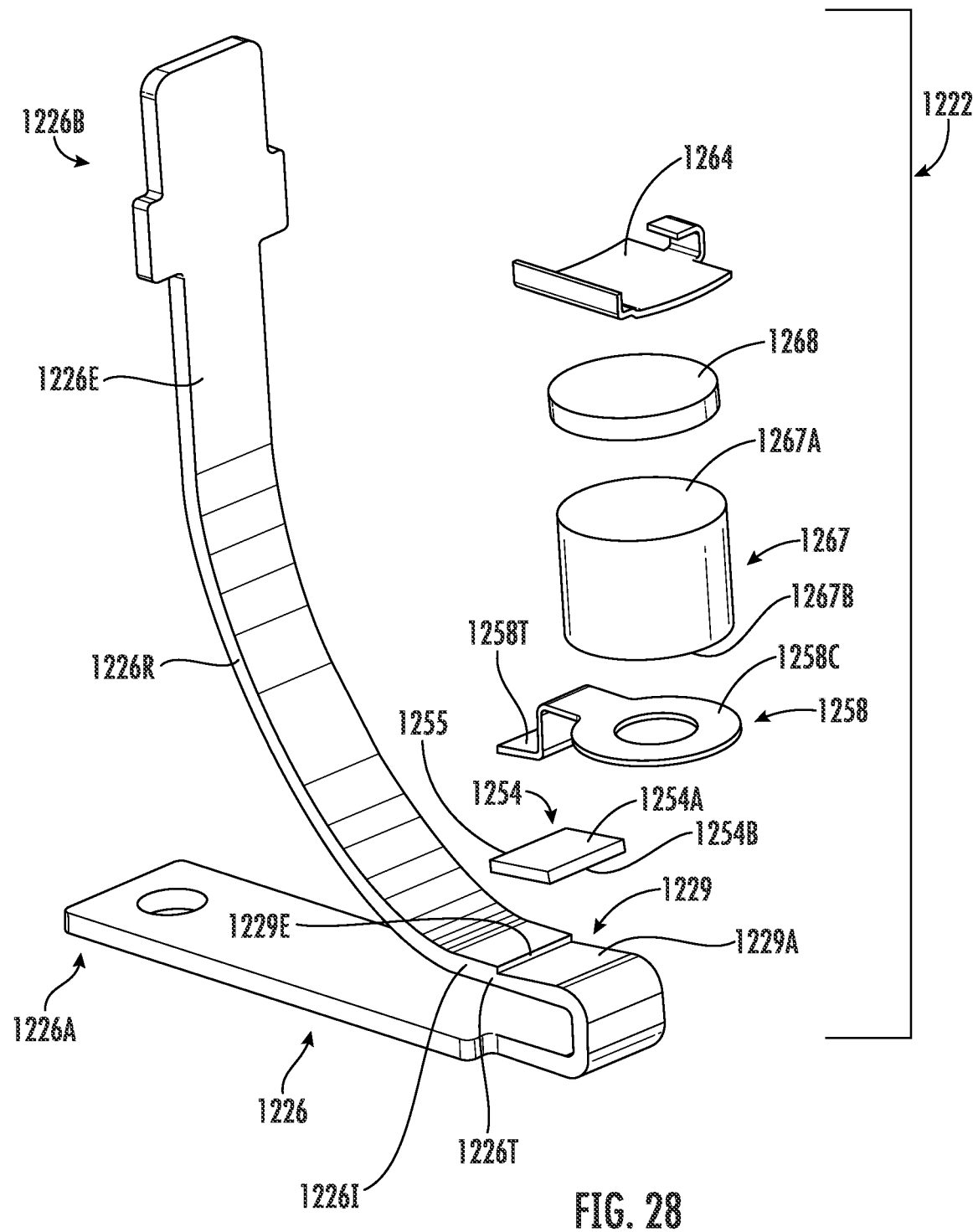
FIG. 28 is an exploded, fragmentary, perspective view of the spark gap assembly of FIG. 26.
Figure 29:
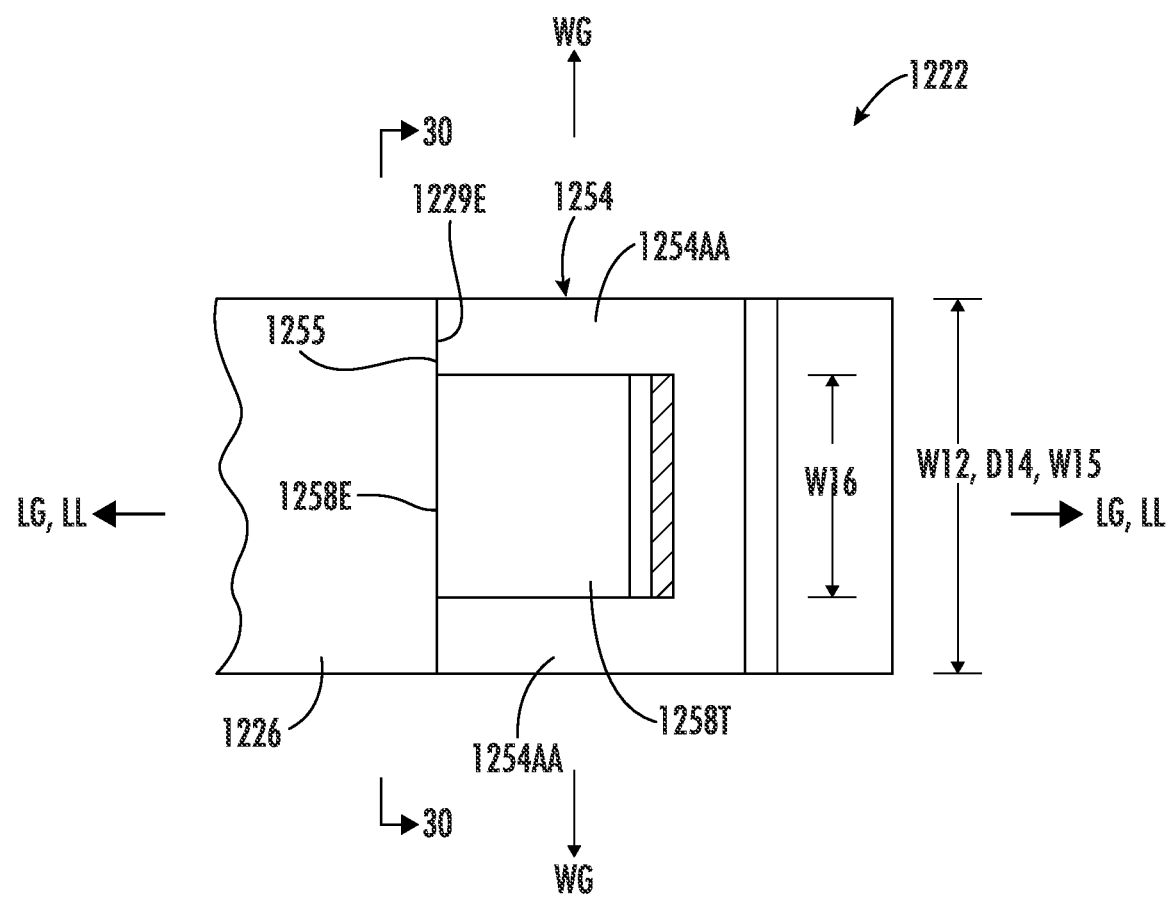
FIG. 29 is a fragmentary, cross-sectional view of the spark gap assembly of FIG. 26 taken along the line 29-29 of FIG. 25.

The spark gap 1230 is an air gap. The spark gap 1230 extends from an inner end 1230A and to an opposing outer end 1230B. With reference to FIG. 27, the spark gap 1230 includes (extending sequentially from the inner end 1230A to the outer end 1230B) a trigger region 1232T, an ignition region 1232I, a running region 1232R, and an extinguishing region 1232E. The spark gap 1230 expands, widens or flares outward in a direction DA2 from the end 1230A to the end 1230B. As a result, the spark gap 1230 has a first width WI2 (FIG. 31) in the ignition region 1232I and the trigger region 1232T, a second width WR2 (FIG. 27) in the running region 1232R, and a third width WE2 (FIG. 27) in the extinguishing region 1232E. Width WR2 is great than width WI2, and width WE2 is greater than width WR2. Width WR2 varies and expands along the length of the running region 1232R. In some embodiments, the spark gap 1230 expands smoothly from the ignition region 1232I to the extinguishing region 1232E. In some embodiments, the SG electrodes 1224, 1226 each have a curved profile.

In some embodiments, the ignition region spark gap width WI2 (FIG. 31; i.e., the separation distance between the SG electrodes 1224, 1226) is at least 1 mm and, in some embodiments, is at least 0.5 mm. In some embodiments, the spark gap width WI2 is in the range of from about 0.5 mm to 3 mm.

In some embodiments, the length LI2 (FIG. 27) of the ignition region 1232I is in the range of from about 0 mm to 7 mm.

In some embodiments, the depth D14 (FIG. 29; i.e., the lateral dimension of the spark gap 1230 and the width of the SG electrodes 1224, 1226) of the ignition region 1232I is in the range of from about 2 mm to 10 mm.

In some embodiments, the extinguishing region spark gap width WE2 (FIG. 27) is in the range of from about 15 mm to 50 mm. In some embodiments, the spark gap width WE2 is in the range of from about 500 to 5000 percent greater than the spark gap width WI2.

The SG electrodes 1224, 1226 may be formed of any suitable electrically conductive metal. In some embodiments, the SG electrodes 1224, 1226 are formed of copper, copper-steel bimetal, or any other combination of metals in bimetal composition.

Figure 30:
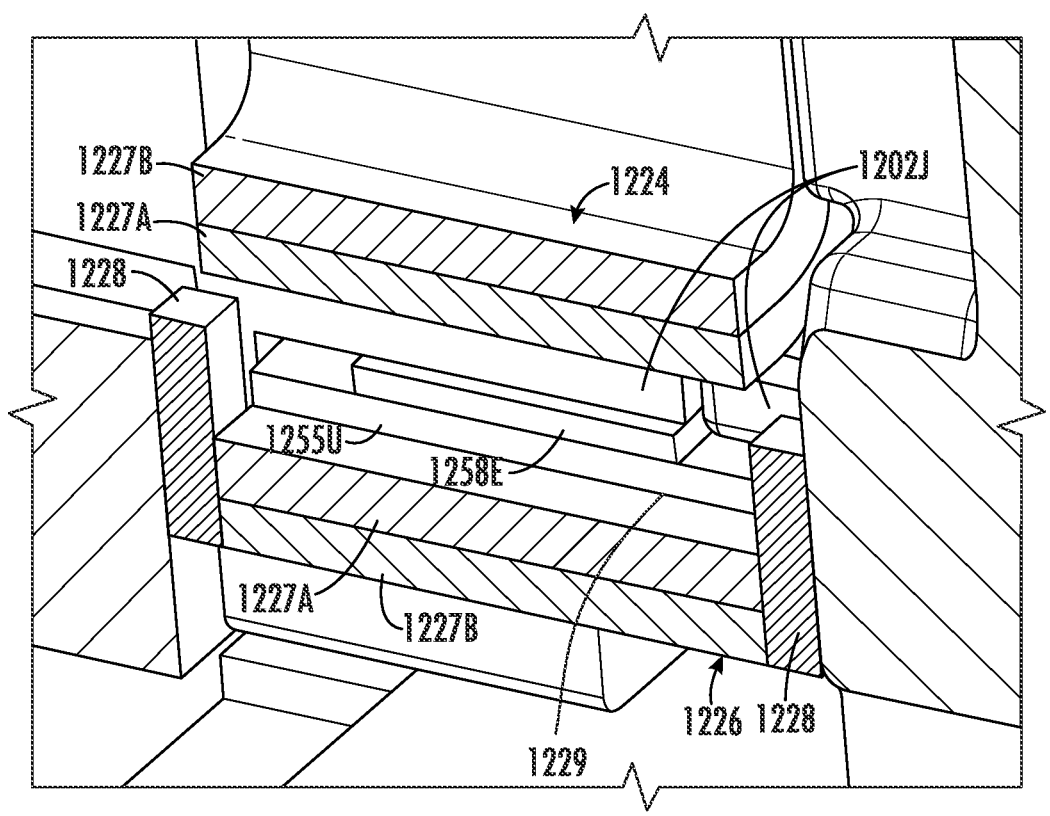
FIG. 30 is a fragmentary, cross-sectional view of the SPD module of FIG. 23 taken along the line 30-30 of FIG. 29.

In some embodiments and as illustrated in FIG. 30, each of the SG electrodes 1224, 1226 has a bimetal construction including an inner layer 1227A of a first metal and an outer layer 1227B of a second metal different than the first metal. In some embodiments, the inner layers 1227A are formed of copper and the outer layers 1227B are formed of steel. In some embodiments, each layer 1227A, 1227B runs the full length of the electrode 1224, 1226.

The containment walls 1228 may be formed of any suitable material. In some embodiments, the containment walls 1228 are formed of ceramic, polymer or plastic, insulating paper, ferromagnetic material insulated by paper, plastic or ceramic, or ferromagnetic material coated with a polymer or plastic.

Figure 32:
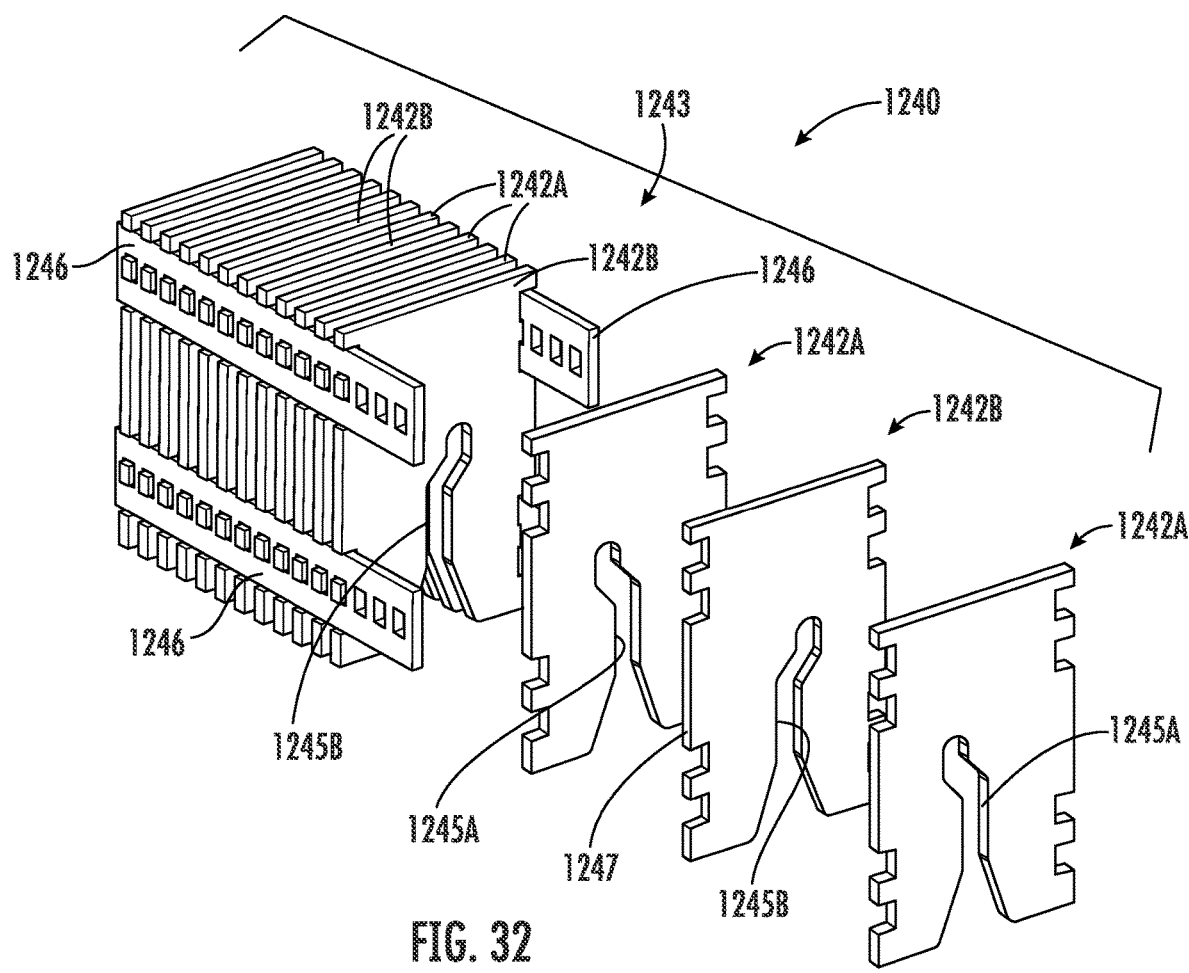
FIG. 32 is an exploded, perspective view of a deion chamber of the SPD module of FIG. 23.
Figure 33:
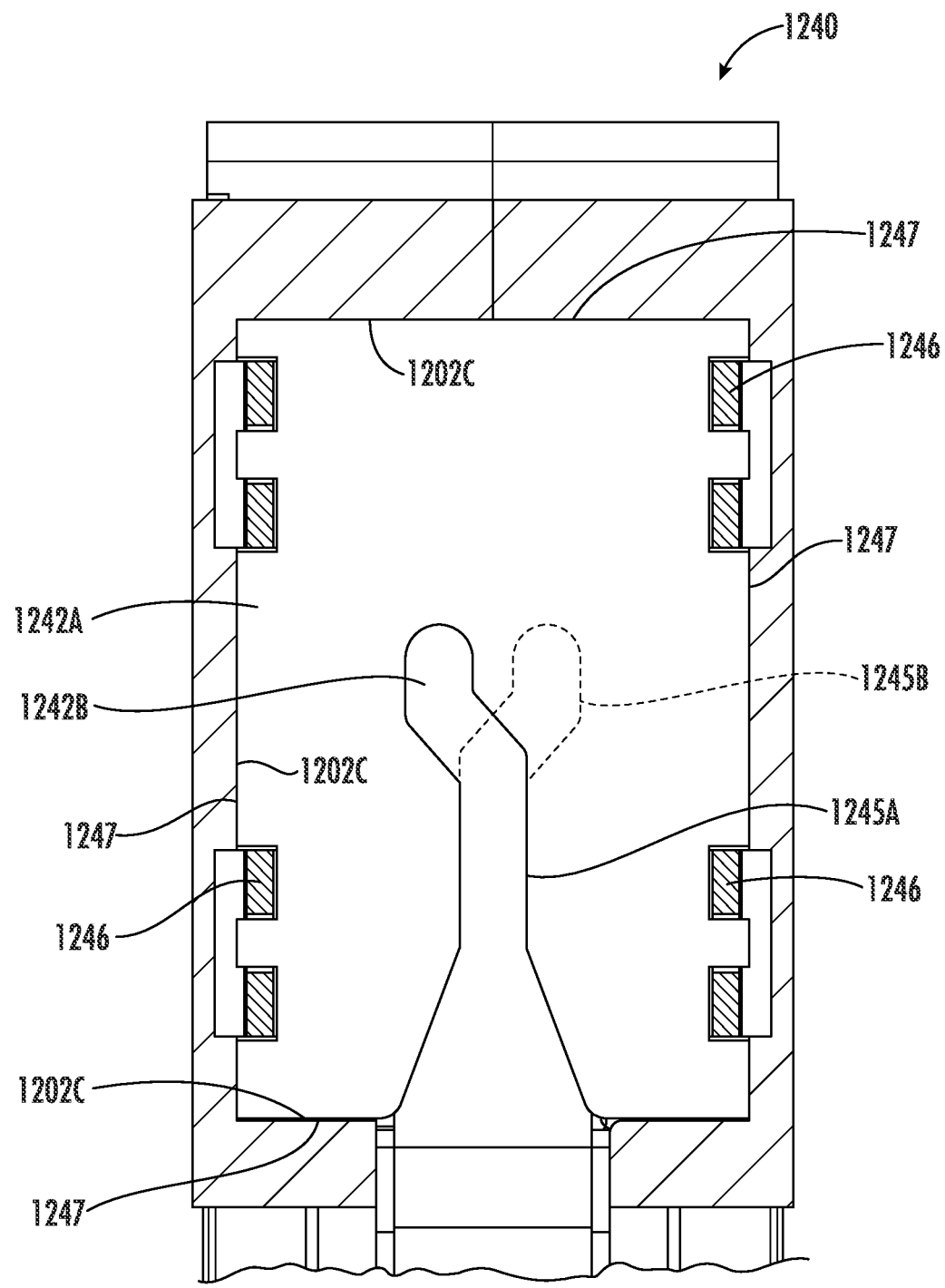
FIG. 33 is a fragmentary, cross-sectional view of the SPD module of FIG. 23 taken along the line 33-33 of FIG. 23.
Figure 34:
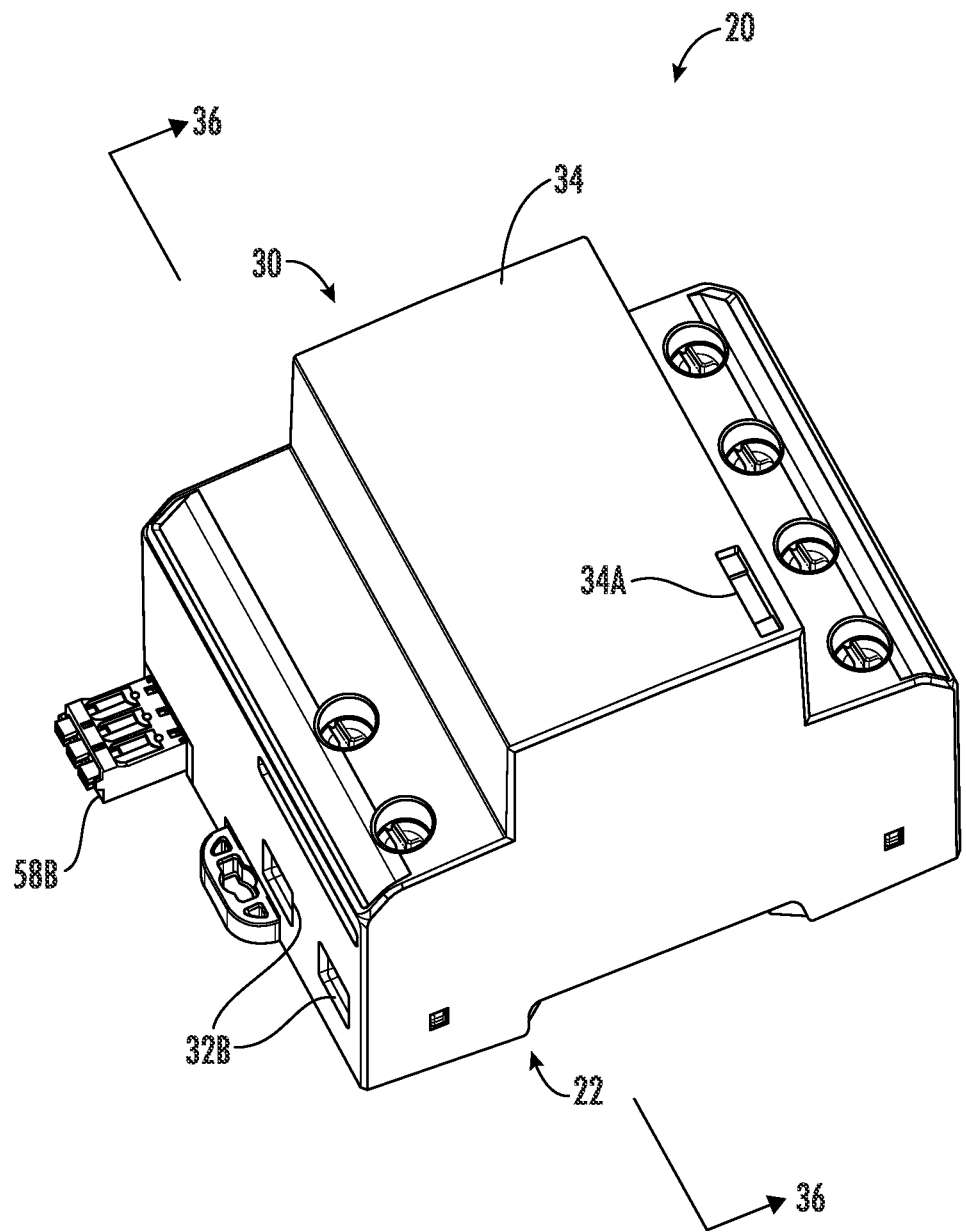
FIG. 34 is a perspective view of an SPD assembly according to further embodiments, wherein the SPD module includes the SPD module of FIG. 23.

With reference to FIGS. 27, 32 and 33, the arc chute 1240 is located at the outer end 1230B of the horn spark gap assembly 1222 at, in or proximate the extinguishing region 1232E. The arc chute 1240 includes a set 1243 or series of electrically conductive arc, chute or deion electrodes or plates 1242A, 1242B supported by electrically insulating supports 1246. The deion plates 1242A, 1242B are separated by deion plate arc gaps 1244. The deion plates 1242A, 1242B exposed side and end faces 1247.

The arc chute 1240 differs from the arc chute 140 in that the arc chute 1240 includes alternating first deion plates 1242A and second deion plates 1242B having different configurations from one another, as shown in FIGS. 32 and 33. More particularly, the plates 1242A each have a slot 1245A defined therein having a first shape or profile. The plates 1242B each have a slot 1245B defined therein having a second shape or profile that is different from the first profile.

The housing 1202 may be formed of any suitable electrically insulating material (e.g., an insulating polymer). The module housing 1202 includes a series of vent slots 1202B defined therein. The module housing 1202 further includes a first arc gas recirculation port 1202E, a second arc gas recirculation port 1202F, an arc gas recirculation channel 1202G, and opposed intake ports 1202H defined therein.

The supports 1246 hold the deion plates 1242A, 1242B together as a single unit, and the unit is seated in the housing 1202 such that features of the housing 1202 positively position the unit and the plates 1242A, 1242B relative to the housing 1202. The deion plates 1242A, 1242B are thereby positioned such that each deion plate arc gap 1244 is aligned with a respective set of the vent slots 1202B (i.e., a front vent slot and a pair of opposed side vent slots).

In some embodiments, the deion plate side and end edges 1247 are positioned substantially flush with the mating or facing surfaces 1202C of the module housing 1202.

The SG trigger circuit 1250 includes the spark gap trigger region 1232T, the ignition region 1232I, a semiconductive trigger member 1254, a trigger electrode 1258, a trigger varistor (e.g., MOV) 1268, a trigger GDT 1267, and an electrically conductive (e.g., copper) contact spring 1264. In alternative embodiments, a resistor is used in place of the MOV 1268.

The trigger electrode 1258 (FIG. 28) may be formed of any suitable electrically conductive metal (e.g., copper). The trigger electrode 1258 includes a contact portion 1258C, a trigger portion 1258T, and a terminal end 1258E.

The trigger GDT 1267 has opposed contact terminals 1267A, 1267B.

The semiconductive member 1254 is positioned in the groove 1229 adjacent the trigger gap 1232T and interposed between the SG electrodes 1224, 1226.

Figure 24:
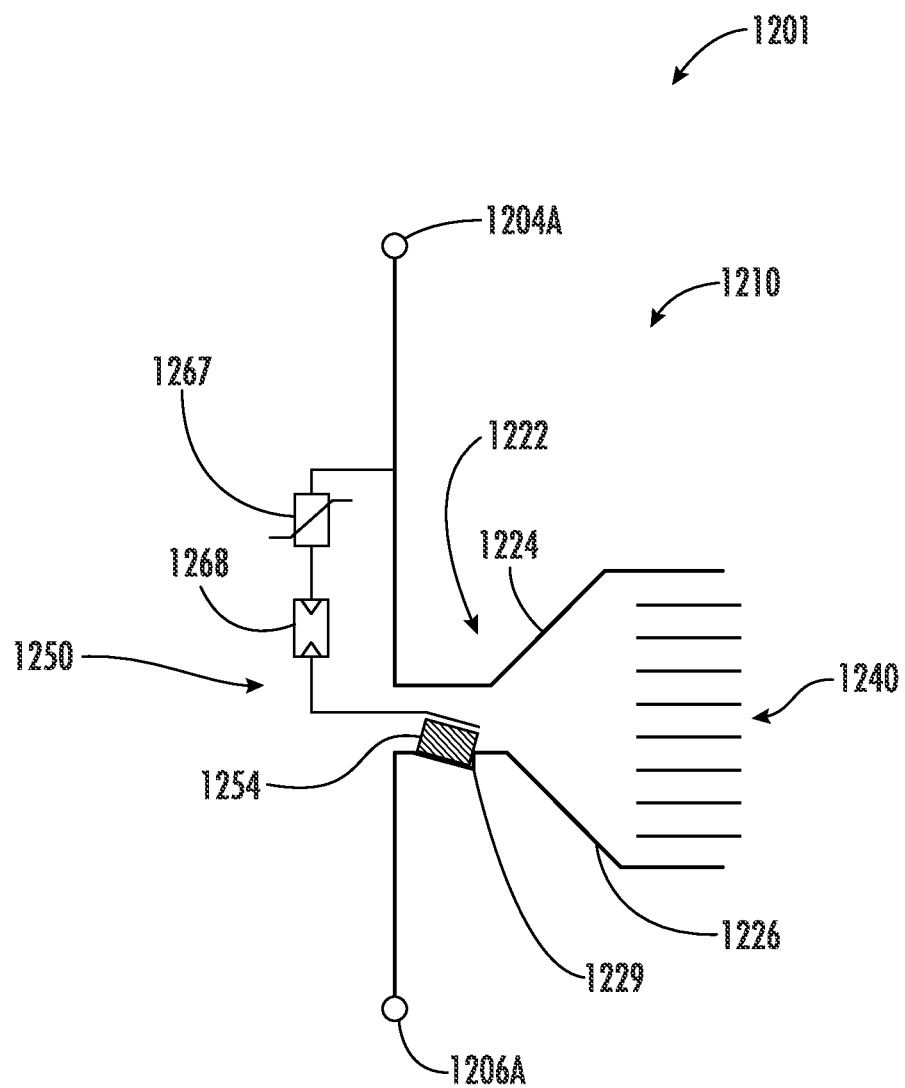
FIG. 24 is a schematic view of an SPD circuit of the SPD module of FIG. 23.

The MOV 1268, the GDT 1267, the trigger electrode 1258, and the semiconductive member 1254 are connected in electrical series between the electrode 1224 and the electrode 1226 as represented schematically in FIG. 24. The contact spring 1264 serves to take up manufacturing tolerances.

The semiconductive trigger member 1254 (FIGS. 28-31) extends from a first end face 1254A to an opposing second end face 1254B. The first end face 1254A electrically engages or contacts the trigger electrode 1258T. The second end face 1254B electrically engages or contacts the electrode trigger section 1226T.

The semiconductive trigger member 1254 may be formed of any suitable semiconductive material. In some embodiments, the semiconductive member 1254 is formed of a material as described herein for the semiconductive member 154.

In some embodiments, the semiconductive member 1254 is formed of a semiconductive ceramic. In some embodiments, the semiconductive member 1254 is formed of ZnO (zinc oxide) or BaTiO3 (Barium titanate) or SiC (silicon carbide), with different dopants (oxides, metals).

In some embodiments, the semiconductive material of the semiconductive member 1254 has a specific electrical resistance in the range of from 1 to 10,000 $\Omega$cm, and a dielectric constant in the range of from 1 to 10,000. The semiconductive material may have a positive or negative temperature coefficient.

In some embodiments, the semiconductive trigger member 1254 has a thickness T15 (FIG. 31) of at least 0.2 mm and, in some embodiments, of at least 0.5 mm. In some embodiments, the thickness T15 is in the range of from about 0.2 mm to 1.5 mm.

The width W16 (FIG. 29) of the trigger portion 1258T is less than the width W15 (FIG. 29) of the trigger member 1254 so that lateral strips of portions 1254AA of the first end face 1254A are exposed and face opposing surfaces of the SG electrode 1224.

Figure 31:
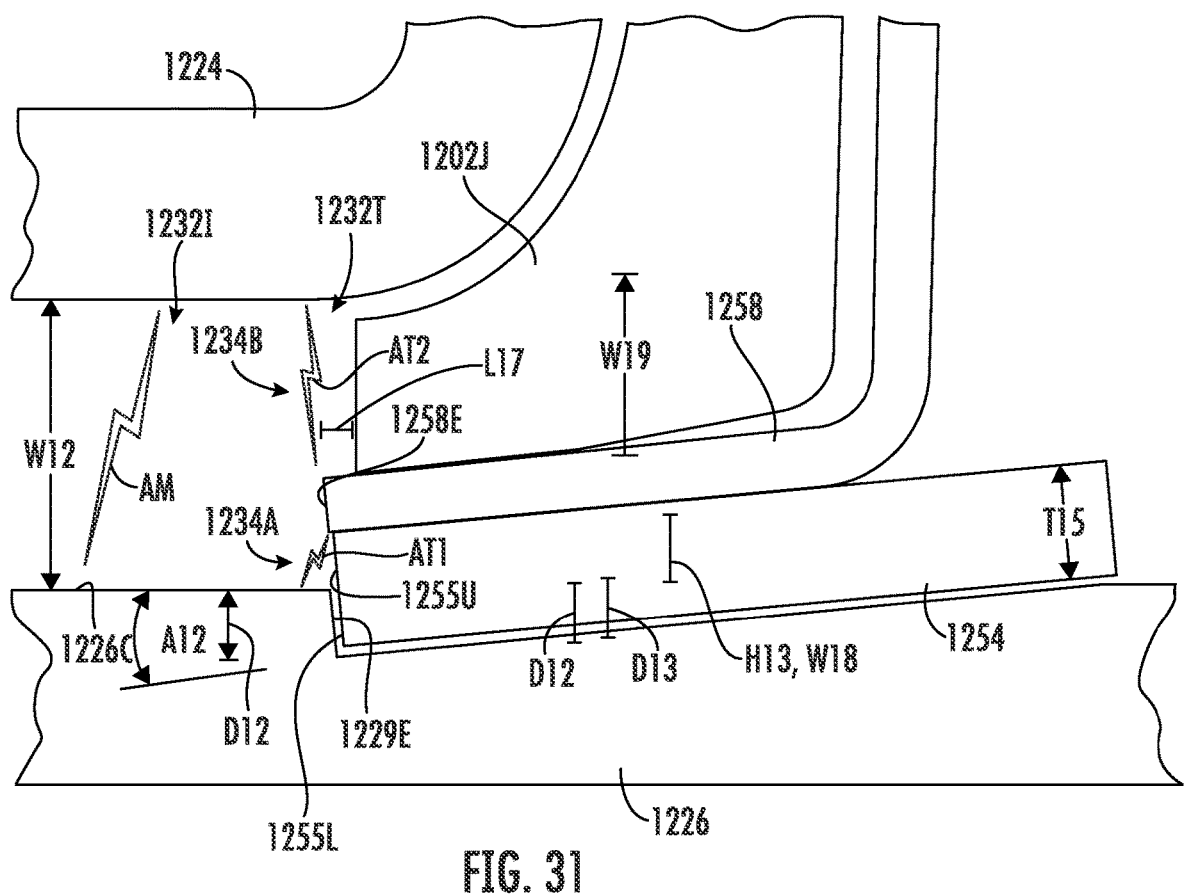
FIG. 31 is a fragmentary, side view of the SPD module of FIG. 23.

The semiconductive trigger member 1254 is seated in the angled groove 1229. The trigger member 1254 has a terminal side face 1255 adjacent the end wall 1229E of the groove 1229. As shown in FIG. 31, a first portion 1255L of the terminal side face 1255 is embedded in the groove 1229 and second portion 1255U of the terminal side face 1255 projects inwardly beyond the inner surface 1226A of the electrode 1226 toward the electrode 1224. In some embodiments, the terminal end 1258E of the trigger electrode 1258 is coterminous with the terminal side face 1255.

In some embodiments, the height H13 (FIG. 31) of the second portion 1255U above the inner surface 1226A is at least 0.05 mm or 0.1 times the thickness T15 of the trigger member 1254. In some embodiments, the height H13 is in the range of from about 0 to 1 mm or 1 times the thickness T15.

In some embodiments, the depth D13 (FIG. 31) of the first portion 1255L into the electrode 1226 is at least 0.3 mm. In some embodiments, the depth D13 is at least 0.5 times the thickness T15 of the trigger member 1254. In some embodiments, the depth D13 is in the range of from about 0 to the thickness T15 of the trigger member 1254.

Figure 25:
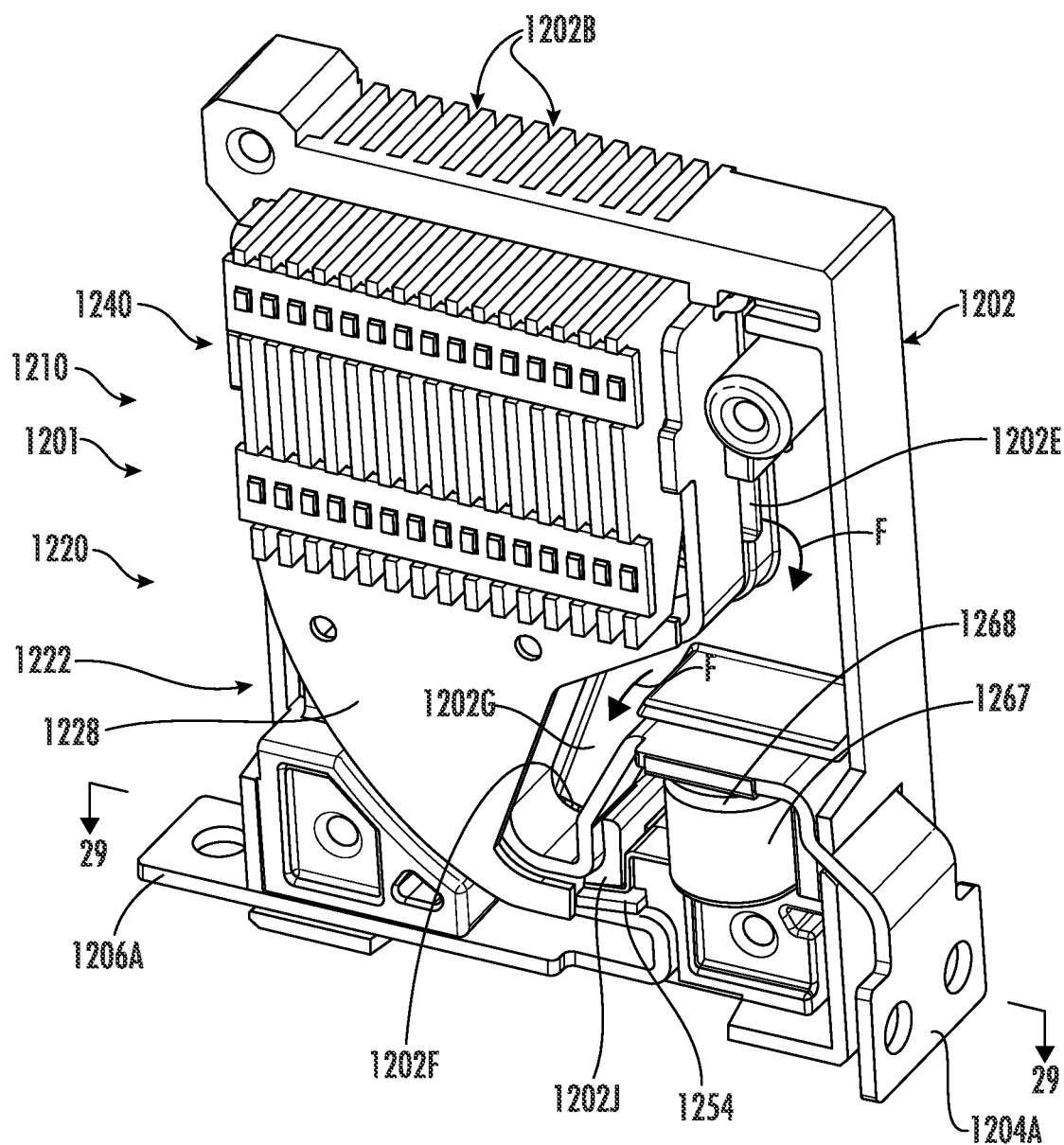
FIG. 25 is a fragmentary, perspective view of the SPD module of FIG. 23.
Figure 26:
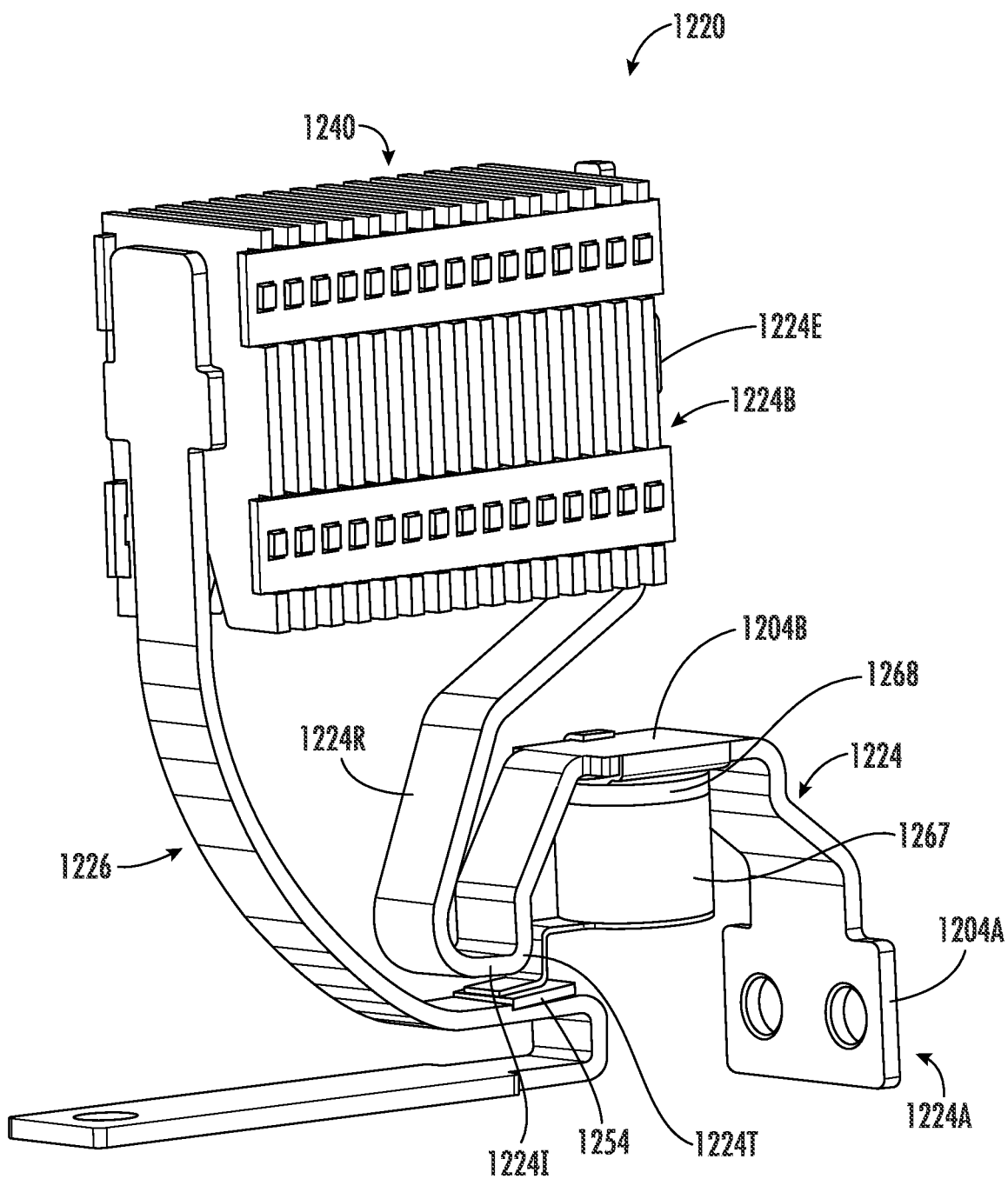
FIG. 26 is a fragmentary, perspective view of a spark gap assembly of the SPD module of FIG. 23.

With reference to FIGS. 25 and 30, the housing 1202 includes electrically insulating features 1202J interposed between the trigger electrode 1258 and the first SG electrode 1224. In some embodiments and as illustrated, the semiconductive trigger member 1254 and the trigger electrode 1258 project forwardly beyond the housing features 1202J so that an exposed portion of the trigger electrode 1258 faces the first SG electrode 1224 and the end faces 1254E, 1258E are located a projection distance L17 from the features 1202J.

With reference to FIG. 31, the trigger region 1232T of the spark gap 1230 includes a first trigger spark gap 1234A and a second trigger spark gap 1234B. The first trigger spark gap 1234A is defined between the second SG electrode 1226 and the terminal end 1258E of the trigger electrode 1258. The second trigger spark gap 1234B (i.e., an air gap) is defined between the first SG electrode 1224 and the terminal end 1258E of the trigger electrode 1258.

In some embodiments, the first trigger spark gap 1234A has a width W18 (FIG. 31) of at least 0.1 mm and, in some embodiments, of at least 1 mm. In some embodiments, the width W18 is in the range of from about 0 mm to 1 mm. In some embodiments, the width W18 is in the range of from 0 mm to the thickness T15.

In some embodiments, the second trigger spark gap 1234B has a width W19 (FIG. 31) of at least 0.5 mm and, in some embodiments, of at least 1 mm. In some embodiments, the width W19 is in the range of from about 0.5 mm to 1.5 mm. In some embodiments, the width W19 is in the range of 0.2 times the width WI2 of the spark gap 1230 in the ignition region 1232I to 0.8 times the width WI2.

The widths W18, W19 are each less than the width WI2 of the ignition region 1232I.

The spark gap 1230 has a prescribed threshold flashover voltage. The prescribed threshold flashover voltage is the minimum voltage that will cause a flashover between the first SG electrode 1224 and the second SG electrode 1226, wherein this flashover between the SG electrodes 1224,1226 is initiated by the trigger circuit 1250 at the trigger region 1232T (as discussed in more detail below). In some embodiments, the prescribed trigger threshold flashover voltage is less than 1500V. In some embodiments, the prescribed threshold flashover voltage is in the range of from about 300V to 1500V. When a voltage is applied across the terminals 1204A, 1206A that is less than the threshold flashover voltage, the applied voltage will not ignite or initiate arc flashover between the SG electrodes 1224, 1226. As discussed below, when a voltage is applied across the terminals 1204A, 1206A that is greater than or equal to the threshold flashover voltage, the applied voltage will ignite or initiate arc flashover between the SG electrodes 1224, 1226.

The SPD module 1200 may operate as follows in service.

According to some embodiments of the inventive concept, the SPD module 1200 is configured to operate under two different conditions: 1) normal (stand by) operation; and 2) an overvoltage or current surge event in which the SPD module 1200 is designed to shunt an SPD surge impulse current to ground.

The SPD module 1200 is designed to shunt an SPD surge impulse current to ground in response to an overvoltage or current surge event.

The SPD module 1200 is configured to operate in three alternative modes: 1) a standby mode; 2) a surge current mode; and 3) a follow current extinguishing mode.

The terminal 1204A is electrically connected to the Line (L) of the circuit 10, and the terminal 1206A is electrically connected to the Ground (G) of the circuit 10 (FIG. 1).

During normal operation, the OPC 1210 practically acts as an insulator. The voltage applied across the spark gap 1230 is insufficient to initiate a spark across the spark gap 1230. Also, the voltage applied is insufficient to initiate current through the trigger MOV 1268 and the trigger GDT 1267 of the trigger circuit.

When an overvoltage or current surge event (e.g., a transient power surge) applies a surge impulse current to the SPD circuit 1201, the OPC 1210 will temporarily go to a low impedance state (e.g., effectively becoming a short circuit). The OPC 1210 is designed to shunt the surge impulse current associated with such events to ground to protect sensitive equipment. The SPD surge impulse current may be on the order of tens of kA, but will typically last only a short duration (in the range of from about tens of microseconds to a few milliseconds).

During the surge event, the voltage applied across the trigger region 1232T of the spark gap 1230 and the trigger components/member (trigger GDT 1268, trigger MOV 1267 and semiconductive member 1254) by the surge event exceeds the prescribed threshold flashover voltage of the trigger region 1232T assisted by the trigger circuit 1250. In response, the voltage across the trigger region 1232T initiates a first electrical arc flashover or trigger arc AT1 (FIG. 31) across the first trigger spark gap 1234A. That is, first arcing AT1 is generated between the trigger electrode 1258 and the second SG electrode 1226 at section 1226T.

The initiation of the first trigger arc AT1 is assisted by the semiconductive trigger member 1254 in response to the overvoltage developed across the first trigger spark gap 1234A. At the beginning of the surge current, the trigger MOV 1268 and the trigger GDT 1267 change their states to low impedance and current conduction occurs therethrough. At the beginning of the surge current, current conduction occurs through the bulk of the semiconductive member body and along the exterior surface (including the terminal side face 1255) of the semiconductive trigger member 1254. Very quickly thereafter (e.g., within less than 1 microsecond), the flashover of the first trigger arc AT1 occurs so that most of the surge current is bypassed through the arc column(s) established between the second SG electrode 1226 and the trigger electrode 1258. By diverting the current around the semiconductive trigger member 1254, degradation of the semiconductive trigger member 1254 is prevented or reduced.

Once formed, the first trigger arc AT1 quickly (e.g., within less than 1 microsecond) propagates to generate a second electrical arc flashover or trigger arc AT2 (FIG. 31) across the second trigger spark gap 1234B. That is, second arcing AT2 is generated between the trigger electrode 1258 and the first SG electrode 1224 at section 1224T.

Shortly after the start of the second trigger arc AT2 (e.g., within microseconds), the current flow triggers an electric arc flashover or surge arc AM (as illustrated in FIGS. 27 and 31) across the spark gap 1230 in the ignition region 1232I. The SG trigger circuit 1250 thereby ignites the horn spark gap assembly 1222 and the full surge current is thereby conducted through the spark gap assembly 1222 via the surge arc AM.

Once the surge arc AM is established, the voltage drop of the surge arc AM is less than knee voltage of the trigger MOV 1267. Thus, the trigger MOV 1267 reduces current through the trigger member 1254 below the level necessary to sustain the trigger GDT 1268 in conduction. Thus, any remaining current through the trigger member 1254 is cutoff.

The spark gap assembly 1220 is thereby triggered changing its state to low impedance. The surge current flows from the terminal 1204A to the terminal 1206A through the spark gap 1230, thereby diverting the surge current to ground. During the surge event, the arcing or arc column AM across the spark gap 1230 may be located entirely or mainly in the arc ignition region 1232I or partially in the running region 1232R.

Once the surge arc AM is active, the current no longer flows through the trigger MOV 1268 and the trigger GDT 1267.

The SPD 1200 then enters its follow current mode. Once the surge current is diverted to the ground, the spark gap 1222 remains electrically conductive, causing additional follow current from the system to flow into the SPD 1200. This causes the arc column to move in an arc migration direction DA (from the end 1230A toward the end 1230B) along the arc running region 1232R of the spark gap 1222 to the arc extinguishing region 1232E. FIG. 27 illustrates the arc column in the arc running region 1232R as an electric arc AR, and the arc column in the arc extinguishing region 1232E as an electric arc AE.

In the arc extinguishing region 1232E, the follow current is redirected to (is conducted to, or flashes over to or arcs to) the deion plates 1242 from the SG electrode 1224. The current then flows through the set 1243 of deion plates 1242A, 1242B to the SG electrode 1226 by arcing AD between the deion plates 1242A, 1242B (FIG. 27).

Each deion plate arc creates a voltage drop between the SG electrodes 1224, 1226 and the terminals 1204A, 1206A. These voltage drops add together increasing the voltage between the SG electrodes 1224, 1226 to relatively high values, until the voltage across the arc chute 1240 is higher than the power system voltage. The voltage drop developed on the arc chute 1240 opposes the mains voltage thus the follow current is rapidly reduced and eventually extinguished.

These voltage drops also reduce the voltage across the spark gap 1222 to relatively low values, until the voltage across the spark gap 1222 is less than the ignition voltage necessary to sustain the arcing between the SG electrodes 1224, 1226. The voltage across the spark gap 1222 is then also less than necessary to trigger flashover in the trigger region 1232T and the ignition region 1232I. The spark gap assembly 1222 is thereby opened at the spark gap 1230 and the follow current through the spark gap assembly 1222 and the SPD module 1200 is cut off or interrupted. The SPD module 1200 returns to its standby mode.

Thus, it will be appreciated that the electrical arc flashover AT1, AT2 triggers the electric arc flashover AM, which during follow current expands and propagates to the arc chute 1240. The expansion and propagation are driven by electromagnetic and acoustical forces. Once the arc AE enters the arc chute 1240, it is divided or split into a plurality of smaller arcs in the arc chute 1240 and cooled down until the arc is eventually extinguished. This causes the SPD module 1200 to returns to its high impedance (standby) mode.

The trigger circuit 1250 (including the semiconductive trigger member 1254) functions as a spark gap trigger that assists in initiating the flashover between the SG electrodes 1224, 1226. The trigger circuit 1250 permits a minimum separation distance WI2 between the electrodes 1224, 1226 that is large enough to prevent melting and soldering of the electrodes 1224, 1226 during surges. Because the trigger circuit 1250 is provided, the threshold flashover voltage of the gap 1230 is less than the voltage that would be required to initiate the flashover across the gap 1230 in the absence of the trigger circuit 1250 and the semiconductive trigger member 1254. By reducing the minimum required flashover voltage, the trigger circuit 1250 and the semiconductive trigger member 1254 lower the protection level of the SPD electrical circuit 1201.

The horn shape of the spark gap 1230 facilitates the path of the arc AM. The geometry of the SG electrodes guides the arc AM from the trigger region 1232T to the extinguishing region 1232E. The containment walls 1228 firmly restrict or contain the path of the arcing in the lateral directions.

The MOV 1268 and GDT 1267 are provided in front of the trigger member 1254 because the trigger member 1254 has some resistance and thus will conduct the current on nominal voltage. By including MOV 1268 and GDT 1267, the OPC 110 is made leakage current free (and, thus, the SPD module 1200 is leakage free).

Additionally, the MOV 1268 and GDT 1267 prevent and cut off any continuation currents through or along the semiconductive trigger member 1254 after the surge arc AM is initiated.

While the trigger circuit 1250 has been described including a trigger MOV 1268 and a trigger GDT 1267, in other embodiments the trigger circuit may include other voltage-switching/limiting components. For example, the alternative trigger circuit may include the trigger MOV 1268 without a trigger GDT or may include the trigger GDT 1267 without a trigger MOV.

The groove 1229 ensures that the flashover AT1 always occurs on the front end or side (i.e., on or proximate face 1229E) since the electrical path is longer on the back side of the trigger member 1254. Also, the groove 1229 prevents the movement of the trigger member 1254 in the "front" or forward direction (i.e., in the direction toward the ignition region 1232I).

The cross-over pattern of the slots 1245A, 1245B of the deion plates 1242A, 1242B influences the movement or path of the individual arcs AD between the adjacent plates 1242A, 1242B so that it forces the arcs AD into a spiral "tornado" or helical path. The arc AD between the first two plates 1242A, 1242B goes left, the arc AD between the second and third plates 1242B, 1242A goes right, the arc AD between the third and fourth plates 1242A, 1242B goes left, and so forth. As a result, the paths of the arcs AD and the combined lengths of the arcs AD are made longer. Also, this prevents or inhibits re-ignitions and rebounding of the arc back to the running area 1232R of the spark gap 1230.

The SPD module 1200 also provides management for gases generated by arcing events. As discussed above, the gaps 1244 between the deion plates 1243 are each aligned with a respective set of exhaust slots 1202B in the module housing 1202. At least a portion of the pressurized arc gases generated by the arc AM flows between the deion plates 1242A, 1242B and the out through the exhaust slots 1202B. The arc gases are thereby expelled from the module housing 1202 so that back pressure on the arc gases in the spark gap 1220 is reduced or eliminated. Such back pressure may otherwise impede or interfere with the intended performance of the spark gap 1220.

As discussed above, in some embodiments, all of side and front the edge faces 1247 of the deion plates 1242A, 1242B fit substantially flush or in abutment with the facing surfaces of the plastic module housing 1202. This is needed or beneficial because otherwise an arc could flashover individual plates 1242A, 1242B creating one single long arc. That would diminish the follow through current extinguishing function of the spark gap assembly 1220. Adding insulating walls in tight contact with the plates 1242A, 1242B prevents this and gases are expelled without flashover across the arc chute 1240.

During an arcing event, a portion of the arc gases generated thereby flow from the distal end 1230B of the spark gap 1230 (e.g., in or adjacent the arc chute 1240) back to the ignition region 1232I. More particularly, pressurized gas F (FIG. 25) flows sequentially through the arc gas recirculation port 1202E, the recirculation channel 1202G and the arc gas recirculation port 1202H to the ignition region 1232I. The recirculation can improve the follow through extinguishing behavior of the SPD module 1200.

Ambient air is drawn into the ignition region 1232I through the intake ports 1202H by the negative pressure generated during an arcing event. The inrush of surrounding air into the spark gap can provide a pressure release that improves the follow current extinguishing behavior.

With reference to FIGS. 34-39, an SPD assembly 20 according to some embodiments is shown therein. The SPD assembly 20 includes three of the SPD modules 1200 and a base module 22. In other embodiments, the SPD assembly 20 includes SPD modules of other designs as disclosed herein (e.g., the SPD module 100) in place of the SPD modules 1200.

Figure 35:
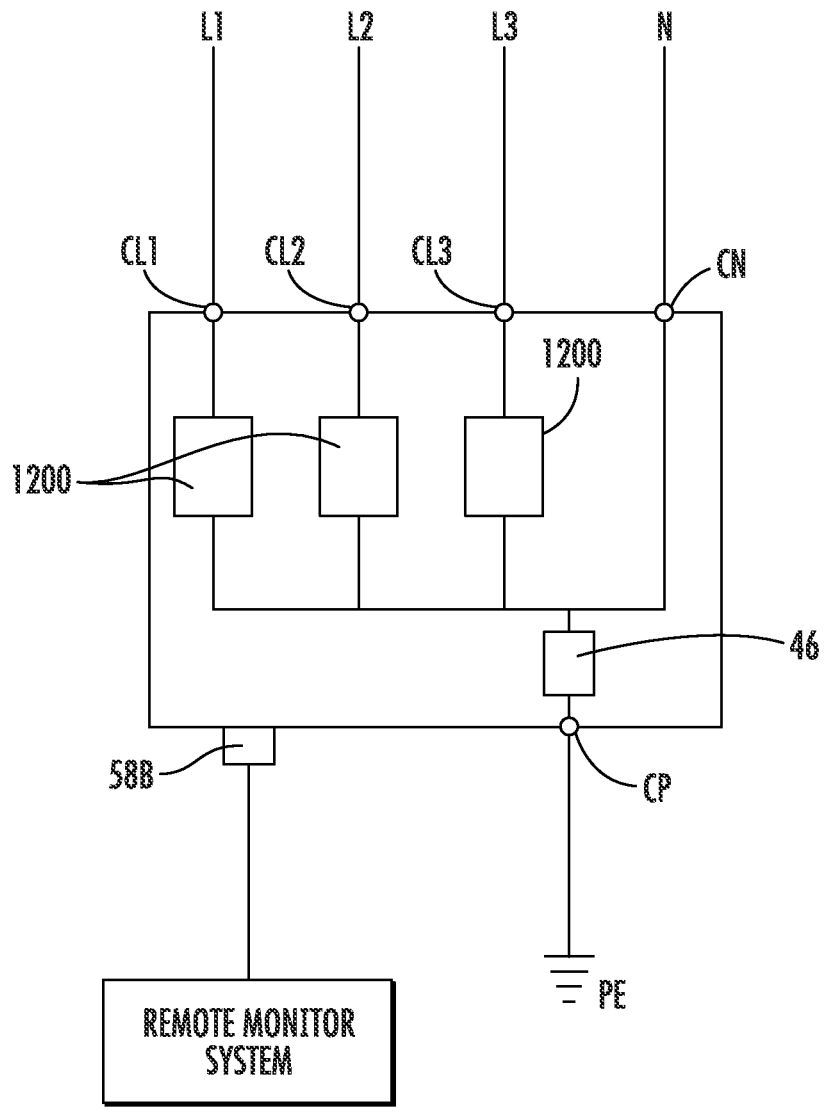
FIG. 35 is a block diagram that illustrates an electrical power supply circuit including the SPD assembly of FIG. 34.

The SPD assembly 20 forms or embodies an SPD assembly circuit 41 as illustrated schematically in FIG. 35. In FIG. 35, the SPD assembly 20 is schematically shown installed in a representative system coupled with three power lines L1, L2, and L3 (corresponding to a three-phase electrical power system), a neutral line N, and ground or protected earth PE.

The illustrated SPD assembly 20 is configured to be mounted on the DIN (Deutsches Institut für Normung e.V.) rail and to protect a three-phase system using a "3+1" protection configuration. However, other mounting and protection configurations may be provided in accordance with some embodiments of the technology. The illustrated SPD assembly 20 is configured to electrically and mechanically connect with electrical cables corresponding to lines L1, L2, L3, N, and PE, respectively.

The base module 22 includes a base housing 30, a thermal indicator mechanism 50, and a base electrical connection system 40.

The base housing 30 includes a base member 32 and a cover 34. The housing parts 32, 34 may be formed of any suitable material or materials. In some embodiments, the housing parts 32, 34 are formed of a rigid polymeric material or metal (e.g., aluminum). Suitable polymeric materials may include polyamide (PA), polypropylene (PP), polyphenylene sulfide (PPS), or ABS, for example.

The base member 32 includes a DIN rail receiver channel 32A, cable ports 32B, and integral partition walls 32P.

The cover 34 includes partition walls 34P and a front window 34A.

Figure 36:
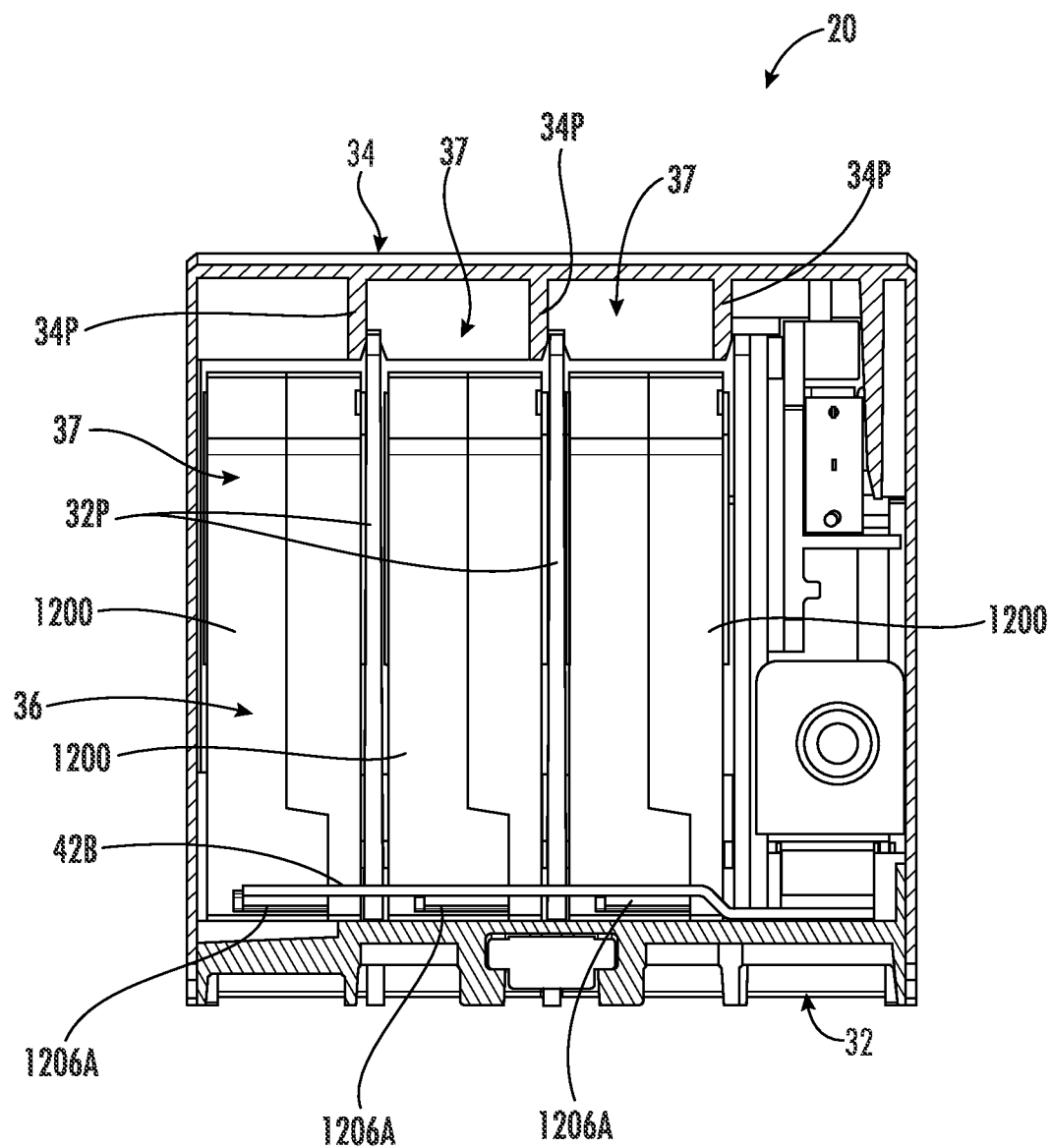
FIG. 36 is a cross-sectional view of the SPD assembly of FIG. 34 taken along the line 36-36 of FIG. 34.
Figure 37:
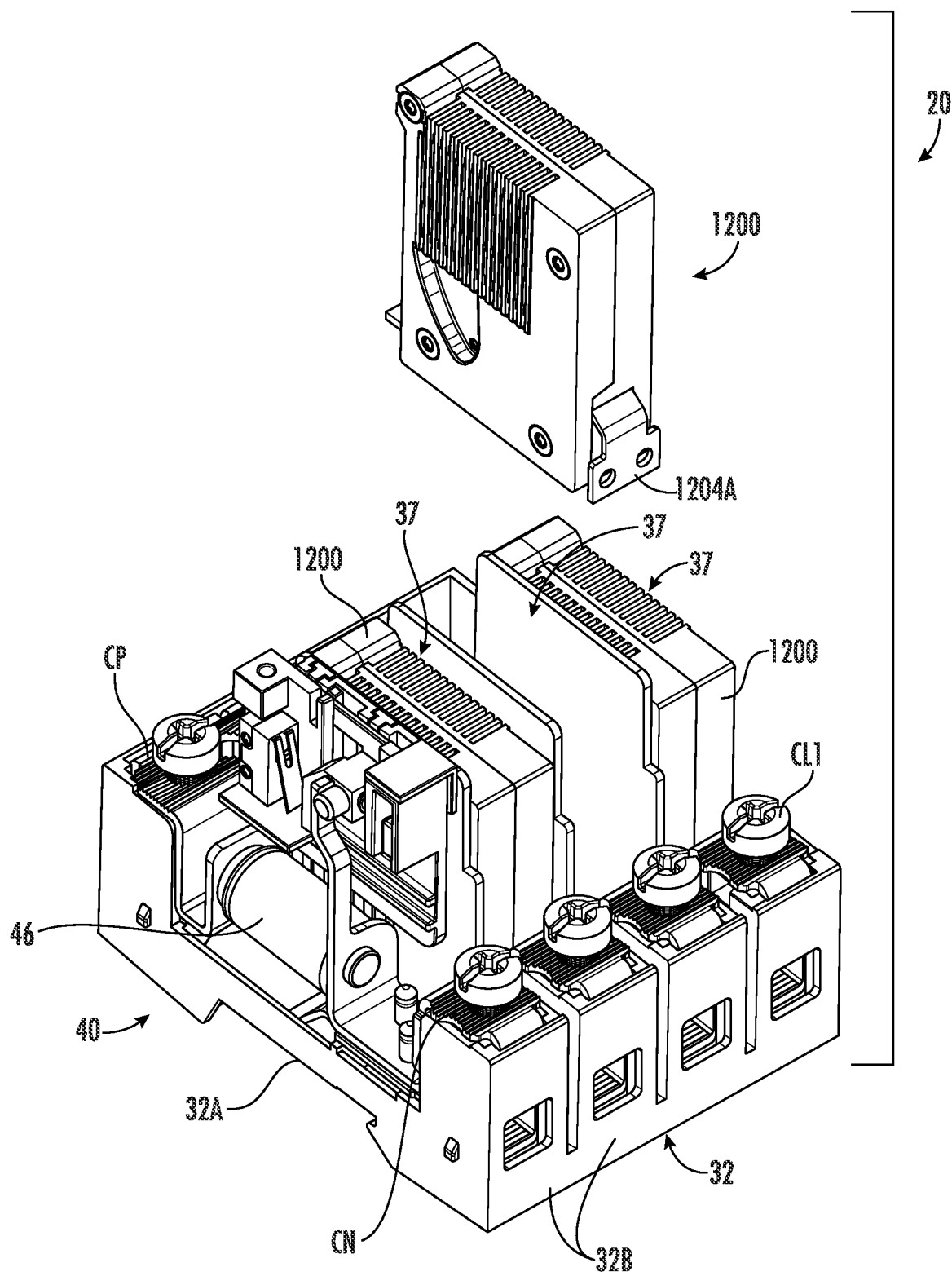
FIG. 37 is an exploded, perspective view of the SPD assembly of FIG. 34.
Figure 38:
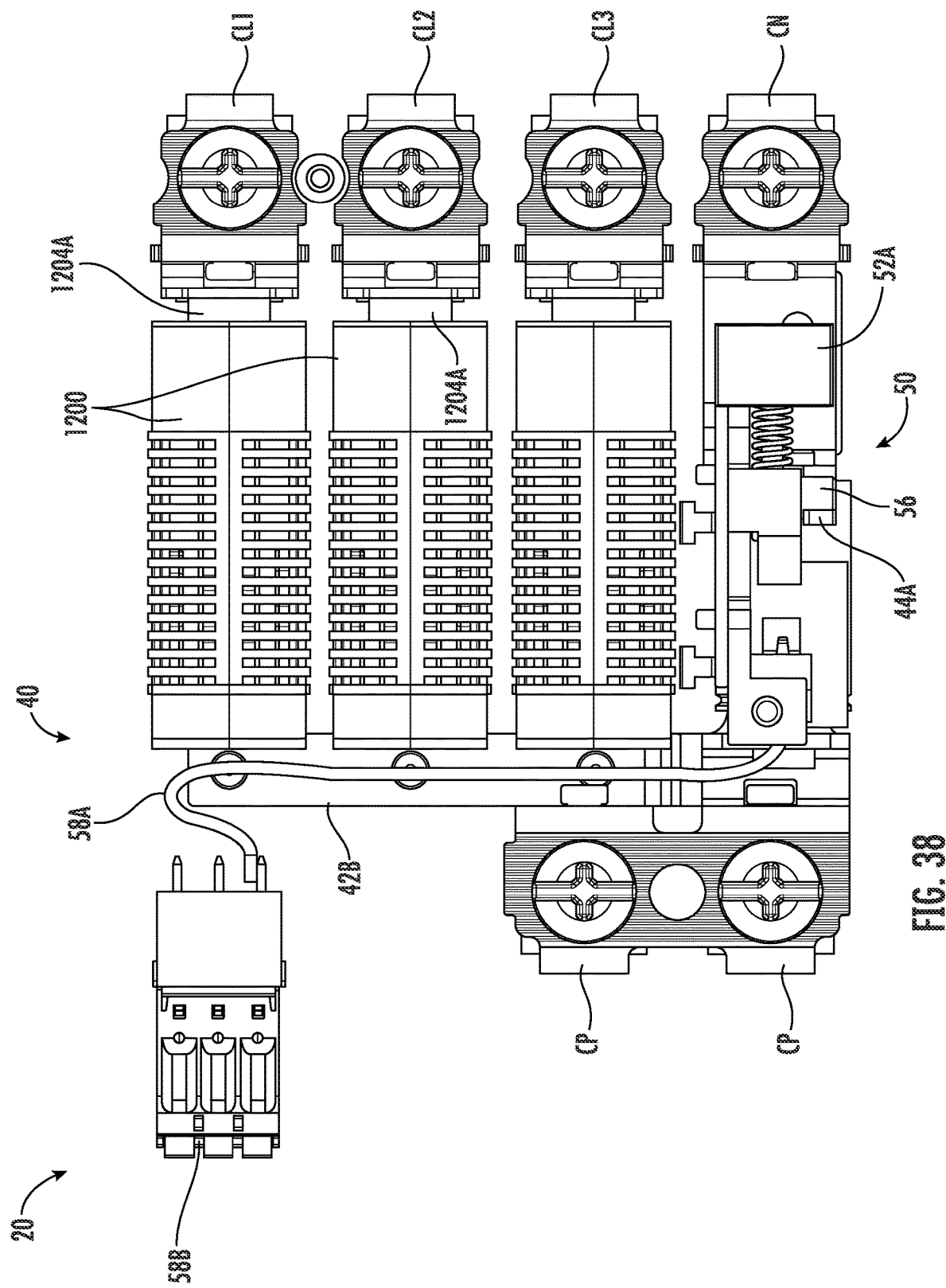
FIG. 38 is a fragmentary, front view of the SPD assembly of FIG. 34.

When the cover 34 is mounted on the base member 32, the parts 32, 34 collectively define an internal cavity 36. The partition walls 32P and 34P mate or align relative to one another to form three module subchambers 37 (FIGS. 36 and 37). Each SPD module 1200 is seated or disposed in a respective one of the subchambers 37 (FIG. 38).

The electrical connection system 40 (FIG. 38) includes cable clamp connectors CL1, CL2, CL3, CN, CP (each positioned at respective cable port 32B), a neutral busbar 42 and the GDT 46. The neutral busbar 42 has a neutral connection end 42A and a module connection section 42B. The connector CN includes an extension leg 44 having a distal section 44A.

The terminals 1204A of the SPD modules 1200 are each connected to a respective one of the connectors CL1, CL2, CL3. The terminals 1206A of the SPD modules 1200 and neutral connector CN are each connected to neutral busbar 42. The PE connector CP is connected to the neutral busbar 42 through the GDT 46.

The thermal indicator mechanism 50 (FIG. 39) includes the extension leg 44, an indicator member or slider 52, an indicator spring 54, a meltable member or peg 56, the window 34A, an electrical switch 58 (e.g., a microswitch), and a remote signal connector 58B. The remote signal connector 58B is connected to the electrical switch 58 by a wire 58A.

Figure 39:
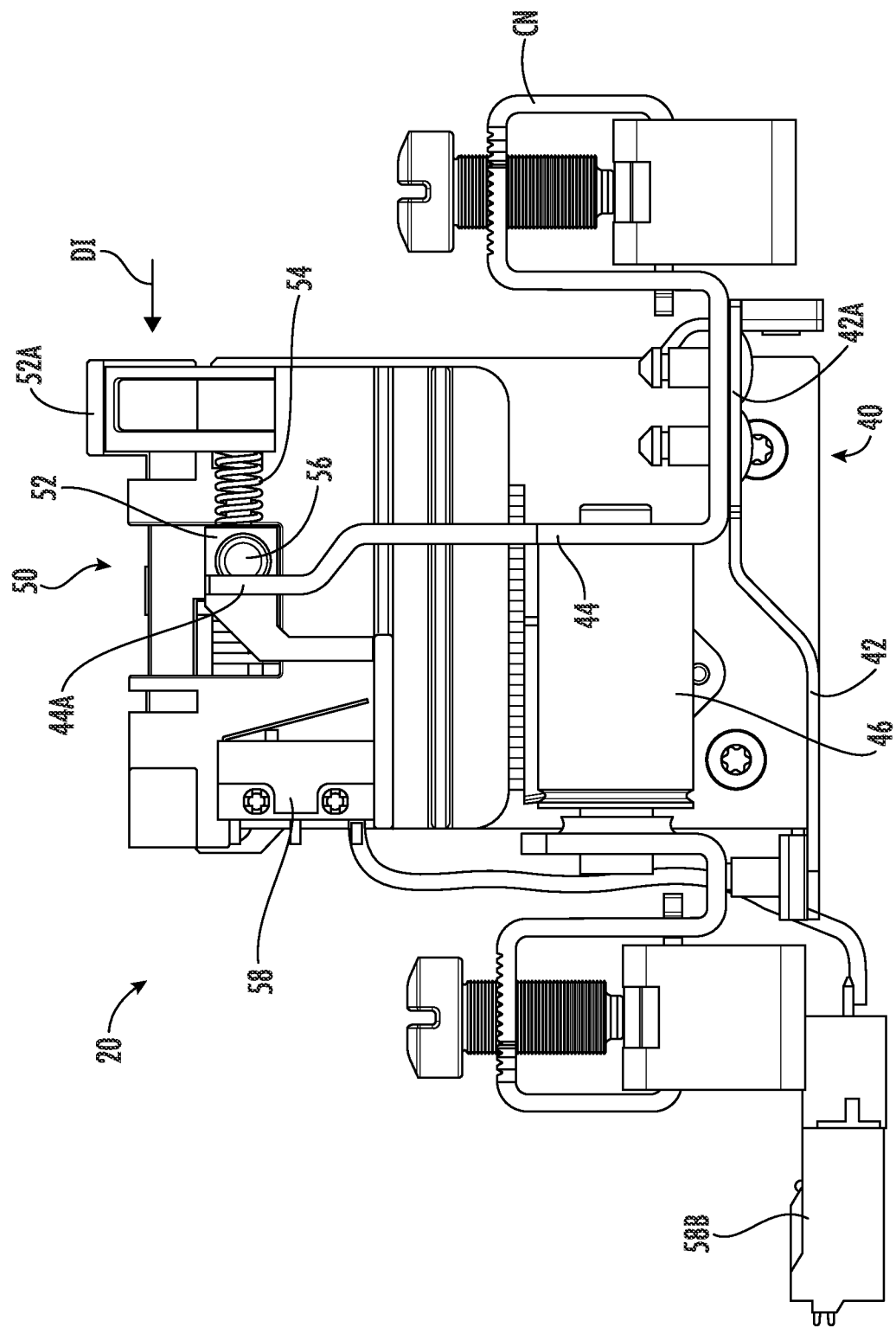
FIG. 39 is a fragmentary, side view of the SPD assembly of FIG. 34

The meltable peg 56 is secured to the slider 52 (e.g., by friction fit). The spring 54 is compressed in a ready position (as shown in FIG. 39) and tends to force the slider 52 in an indication direction DI. The meltable peg 56 bears against the distal section 44A and the extension leg 44 acts as stop that prevents the slider 52 from moving in the direction DI.

The partition walls 32P, 34P partition the SPD modules 1200 in the subchambers 37 from one another. The partition walls 32P, 34P are interposed directly between the vent slots 1202B of adjacent SPD modules 1200. This partitioning prevents the occurrence of undesired short circuits between the electrical phases L1, L2, L3 by hot gases expelled by the SPD modules 1200 during surge and follow current extinguishing events. It will be appreciated that the subchambers 37 may not be fluidly sealed from one another, but that the placement and configuration of the partition walls 32P, 34P will prevent gas flows between the subchambers 37 sufficient to create said undesired short circuits.

The thermal indicator mechanism 50 serves to provide a local alert and a remote alert in the event the SPD assembly 20 fails or reaches an end-of-life state. A failure of the SPD assembly 20 may occur when one of more of the SPD modules 1200 short-circuits or overheats. In this case, heat from the SPD module(s) 1200 is conducted to the meltable peg 56 through the terminal 1206A, the neutral busbar 42, and the extension leg 44. Once sufficient heat has been transferred to the meltable peg 56, the meltable peg 56 will melt or soften until it is no longer rigid enough to hold the slider 52 against the force of the spring 54. The slider 52 is thereby released to translate in the direction DI from the ready position to an alerting position. The slider 52 presses the switch 58, which generates a corresponding signal to the remote monitor connector 58B. A remote monitoring system may be connected to the remote monitor connector 58B to detect the failure condition. In the ready position, an indicator section 52A of the slider 52 occupies the window 34A. In the alerting position, the indicator section 52A is displaced from the window 34A, thereby providing a local, visual indication that the SPD assembly 20 has failed.

In other embodiments, the SPD module 1200 is modified to further include an active voltage-switching or active voltage-limiting component such as a varistor or GDT in electrical series with the spark gap assembly 1220.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protective device comprising:
   a first electrical terminal;
   a second electrical terminal; and
   an overvoltage protection circuit connected between the first electrical terminal and the second electrical terminal, the overvoltage protection circuit including:
      a spark gap assembly between the first electrical terminal and the second electrical terminal, the spark gap assembly including:
         a first spark gap (SG) electrode and a second SG electrode defining a spark gap therebetween; and
         a trigger circuit operative to ignite a main electric arc between the first and second SG electrodes across the spark gap;
      wherein the trigger circuit includes:
         a groove defined in the second SG electrode; and
         a trigger member disposed in the groove, wherein the trigger member is operative to assist formation of a trigger arc; and
      wherein the spark gap assembly is a horn spark gap assembly.

2. The surge protective device of claim 1 wherein the trigger member is a semiconductive trigger member.

3. The surge protective device of claim 2 wherein the semiconductive trigger member is formed of a semiconductive ceramic.

4. The surge protective device of claim 3 wherein the semiconductive ceramic is selected from the group consisting of zinc oxide, barium titanate, and silicon carbide.

5. The surge protective device of claim 1 wherein the trigger circuit includes a trigger varistor, a trigger gas discharge tube, and/or a trigger resistive element in electrical series with the trigger member and in electrical parallel with the spark gap.

6. The surge protective device of claim 1 wherein the trigger circuit includes a trigger electrode in electrical contact with the trigger member and connecting the trigger member in electrical parallel with first SG electrode.

7. The surge protective device of claim 6 wherein the trigger circuit includes a trigger varistor, a trigger gas discharge tube, and/or a trigger resistive element in electrical series with the trigger electrode and in electrical parallel with first SG electrode.

8. The surge protective device of claim 1 including an active voltage-switching/limiting component in electrical series with the spark gap assembly.

9. The surge protective device of claim 8 wherein the active voltage-switching/limiting component includes a varistor or a gas discharge tube.

10. The surge protective device of claim 1 wherein the trigger circuit has a trigger threshold flashover voltage for initiating electrical flashover between the first and second SG electrodes that is less that a threshold flashover voltage that would initiate electrical flashover between the first and second SG electrodes in the absence of the trigger circuit.

11. The surge protective device of claim 1 wherein:
    the surge protective device is a surge protective device module including a spark gap module housing; and
    the spark gap assembly is disposed in the spark gap module housing.

12. The surge protective device of claim 11 wherein:
    the trigger member is located at a first end of the spark gap; and
    the spark gap module housing includes an arc gas recirculation channel configured to direct a flow of arc gas from a second end of the spark gap opposite the first end of the spark gap to an ignition region of the spark gap adjacent the trigger member.

13. The surge protective device of claim 11 wherein the spark gap module housing includes an intake port configured to direct a flow ambient air into an ignition region of the spark gap adjacent the trigger member.

14. The surge protective device of claim 1 wherein:
    the spark gap assembly includes an arc chute;
    the arc chute includes a set of deion plates including:
       a plurality of first deion plates each having a first slot having a first profile; and
       a plurality of second deion plates each having a second slot having a second profile different than the first profile; and
    the first and second deion plates are arranged in spaced apart relation and in alternating series along a chute axis such that the first and second deion plates define a series of arc chute spark gaps extending along the chute axis.

15. The surge protective device of claim 1 wherein:
    the overvoltage protection circuit includes an active voltage-switching/limiting component;
    the spark gap assembly is in electrical series with the active voltage-switching/limiting component between the first electrical terminal and the second electrical terminal; and
    the spark gap assembly includes an arc chute.

16. The surge protective device of claim 1 wherein:
    the trigger member is located at a first end of the spark gap; and the spark gap assembly includes an arc chute located at an opposing second end of the spark gap.

17. A surge protective device comprising:
a first electrical terminal;
a second electrical terminal; and
an overvoltage protection circuit connected between the first electrical terminal and the second electrical terminal, the overvoltage protection circuit including a spark gap assembly including:
a horn spark gap assembly; and
an arc chute;
wherein:
the arc chute includes a set of deion plates including:
a plurality of first deion plates each having a first slot having a first profile; and
a plurality of second deion plates each having a second slot having a second profile different than the first profile; and
the first and second deion plates are arranged in spaced apart relation and in alternating series along a chute axis such that the first and second deion plates define a series of arc chute spark gaps extending along the chute axis.

18. A surge protective device comprising:
a first electrical terminal;
a second electrical terminal; and
an overvoltage protection circuit connected between the first electrical terminal and the second electrical terminal, the overvoltage protection circuit including:
a spark gap assembly between the first electrical terminal and the second electrical terminal, the spark gap assembly including:
a first spark gap (SG) electrode and a second SG electrode defining a spark gap therebetween; and
a trigger circuit operative to ignite a main electric arc between the first and second SG electrodes across the spark gap;
wherein the trigger circuit includes:
a groove defined in the second SG electrode; and
a trigger member disposed in the groove, wherein the trigger member is operative to assist formation of a trigger arc; and
wherein the trigger circuit includes a trigger electrode in electrical contact with the trigger member and connecting the trigger member in electrical parallel with first SG electrode.

19. The surge protective device of claim 18 wherein the trigger circuit includes a trigger varistor, a trigger gas discharge tube, and/or a trigger resistive element in electrical series with the trigger electrode and in electrical parallel with first SG electrode.

20. The surge protective device of claim 18 wherein:
the trigger electrode is interposed between the trigger member and the first SG electrode;
the trigger electrode electrically connects the trigger member to the first electrical terminal in electrical parallel with the first SG electrode;
the first SG electrode, the second SG electrode, and the trigger electrode define:
a first trigger spark gap between the second SG electrode and the trigger electrode; and
a second trigger spark gap between the trigger electrode and the first SG electrode; and
the spark gap assembly is configured to, in response to a surge impulse current, initiate a first trigger arc across the first trigger spark gap and thereafter a second trigger arc across the second trigger spark gap.

21. The surge protective device of claim 20 wherein:
the spark gap includes:
an ignition region; and
a trigger region including the first trigger spark gap and the second trigger spark gap and located between the trigger member and the ignition region;
the groove includes a base wall; and
the base wall slopes outwardly relative to the spark gap at an angle in a direction toward the ignition region.

22. A surge protective device comprising:
a first electrical terminal;
a second electrical terminal; and
an overvoltage protection circuit connected between the first electrical terminal and the second electrical terminal, the overvoltage protection circuit including:
a spark gap assembly between the first electrical terminal and the second electrical terminal, the spark gap assembly including:
a first spark gap (SG) electrode and a second SG electrode defining a spark gap therebetween; and
a trigger circuit operative to ignite a main electric arc between the first and second SG electrodes across the spark gap;
wherein the trigger circuit includes:
a groove defined in the second SG electrode; and
a trigger member disposed in the groove, wherein the trigger member is operative to assist formation of a trigger arc; and
wherein:
the surge protective device is a surge protective device module including a spark gap module housing; and
the spark gap assembly is disposed in the spark gap module housing.

23. The surge protective device of claim 22 wherein:
the trigger member is located at a first end of the spark gap; and
the spark gap module housing includes an arc gas recirculation channel configured to direct a flow of arc gas from a second end of the spark gap opposite the first end of the spark gap to an ignition region of the spark gap adjacent the trigger member.

24. The surge protective device of claim 22 wherein the spark gap module housing includes an intake port configured to direct a flow ambient air into an ignition region of the spark gap adjacent the trigger member.

* * * * *